(12) United States Patent
Ishibashi

(10) Patent No.: US 9,873,348 B2
(45) Date of Patent: Jan. 23, 2018

(54) INFORMATION PROCESSING APPARATUS, MOTOR-DRIVEN MOVABLE BODY, AND DISCHARGE CONTROL METHOD

(71) Applicant: Sony Corporation, Tokyo (JP)

(72) Inventor: Yoshihito Ishibashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/926,564

(22) Filed: Oct. 29, 2015

(65) Prior Publication Data

US 2016/0059729 A1    Mar. 3, 2016

Related U.S. Application Data

(63) Continuation of application No. 14/702,302, filed on May 1, 2015, now Pat. No. 9,573,482, which is a
(Continued)

(30) Foreign Application Priority Data

Feb. 18, 2010    (JP) .................................. 2010-033726

(51) Int. Cl.
    B60R 16/03    (2006.01)
    H02J 7/14    (2006.01)
    (Continued)

(52) U.S. Cl.
    CPC ....... B60L 11/1861 (2013.01); B60L 11/1809 (2013.01); B60L 11/1816 (2013.01);
    (Continued)

(58) Field of Classification Search
    USPC .......... 701/22; 320/103, 304, 109; 307/10.1; 191/2, 11; 439/34; 180/65.1, 65.21,
    (Continued)

(56) References Cited

U.S. PATENT DOCUMENTS 5,283,513 A    2/1994    Fujita et al.
5,635,817 A    6/1997    Shiska
(Continued)

FOREIGN PATENT DOCUMENTS

JP    2001-231103    8/2001
JP    2004-254483    9/2004
(Continued)

OTHER PUBLICATIONS

Japanese Office Action dated Oct. 22, 2013, in Japan Patent Application No. 2010-033726.
(Continued)

*Primary Examiner* — Adam Tissot
(74) *Attorney, Agent, or Firm* — Oblon, McClelland, Maier & Neustadt, L.L.P.

(57) ABSTRACT

There is provided an information processing apparatus including a travelable information display unit that displays before a discharge, regarding motor-driven movable bodies of a discharge source and a discharge destination driven by using electric power of batteries, information about places to which the motor-driven movable body of the discharge source can move using electric power of the battery left after the discharge by assuming, when information about a discharge amount discharged from the battery of the motor-driven movable body of the discharge source toward the motor-driven movable body of the discharge destination that receives power supply is input, a case in which the discharge amount is discharged from the battery.

17 Claims, 32 Drawing Sheets

Related U.S. Application Data continuation of application No. 14/252,389, filed on Apr. 14, 2014, now Pat. No. 9,045,053, which is a continuation of application No. 12/980,908, filed on Dec. 29, 2010, now Pat. No. 8,774,995.

(51) Int. Cl.
| | | |
|---|---|---|
| *B60L 11/18* | (2006.01) | |
| *G01C 21/34* | (2006.01) | |
| *H02J 7/00* | (2006.01) | |
| *H02J 1/00* | (2006.01) | |

(52) U.S. Cl.
CPC ...... *B60L 11/1846* (2013.01); *G01C 21/3469* (2013.01); *H02J 7/0054* (2013.01); *B60L 2210/20* (2013.01); *B60L 2230/40* (2013.01); *B60L 2240/70* (2013.01); *B60L 2240/72* (2013.01); *B60L 2250/12* (2013.01); *B60L 2250/14* (2013.01); *B60L 2250/16* (2013.01); *B60L 2260/54* (2013.01); *H02J 2001/006* (2013.01); *Y02T 10/7005* (2013.01); *Y02T 10/705* (2013.01); *Y02T 10/7044* (2013.01); *Y02T 10/7088* (2013.01); *Y02T 10/725* (2013.01); *Y02T 10/7258* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/161* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
USPC .................................................. 180/65.29
See application file for complete search history.

(56) References Cited

U.S. PATENT DOCUMENTS

| | | |
|---|---|---|
| 2004/0130292 A1 | 7/2004 | Buchanan et al. |
| 2010/0138098 A1 | 6/2010 | Takahara et al. |
| 2012/0286720 A1 | 11/2012 | Fassnacht et al. |

FOREIGN PATENT DOCUMENTS

| | | |
|---|---|---|
| JP | 2009-27772 | 2/2009 |
| JP | 2009-89596 | 4/2009 |
| JP | 2010-187466 | 8/2010 |
| WO | WO 2009/011393 A1 | 1/2009 |
| WO | WO 2011/026721 A2 | 3/2011 |

OTHER PUBLICATIONS

Combined Office Action and Search Report dated Sep. 2, 2015 in Chinese Patent Application No. 201110037646.3 (with English language translation).

Extended European Search Report dated Feb. 25, 2016 in Patent Application No. 11154407.8.

FIG.7 (INPUT 1 OF INFORMATION ABOUT DISCHARGE AMOUNT)

FIG.28

INPUT OF DISCHARGE AMOUNT

- CURRENT STORAGE AMOUNT: xxxxx kWh

- RECOMMENDED DISCHARGE AMOUNT: yyyyy kWh

- DISCHARGE AMOUNT [    ] kWh ( AUTO-INPUT OF RECOMMENDED VALUE )    ( OK )    ( Cancel )

FLOW OF MUTUAL AUTHENTICATION

INFORMATION PROCESSING APPARATUS, MOTOR-DRIVEN MOVABLE BODY, AND DISCHARGE CONTROL METHOD

CROSS-REFERENCE TO RELATED APPLICATIONS

This application is a Continuation of U.S. application Ser. No. 14/702,302, filed on May 1, 2015, which is a Continuation of U.S. application Ser. No. 14/252,389, filed on Apr. 14, 2014, which is a Continuation of U.S. application Ser. No. 12/980,908, filed on Dec. 29, 2010, and claims priority to Japanese Patent Application No. 2010-033726, filed on Feb. 18, 2010, the entire contents of each of which are incorporated herein by reference.

BACKGROUND OF THE INVENTION

Field of the Invention

The present invention relates to an information processing apparatus, a motor-driven movable body, and a discharge control method.

Description of the Related Art

In recent years, a technology called a smart grid has gained attention. The smart grid is a technical framework to realize efficient power usage by constructing a new transmission network having a communication channel along with a transmission network and using the intelligent transmission network. As a background to the smart grid initiative, there is a desire to realize efficient management of power usage, swift handling of an incident when such an incident occurs, remote control of power usage, distributed power generation using power generation facilities outside the control of a power company, or charging management of a motor-driven movable body. Particularly, effective utilization of in-house power generating stations using renewable energy by ordinary households or operators other than power companies and charging management of various motor-driven movable bodies including electric vehicles have attracted considerable attention. Incidentally, renewable energy is energy generated without using fossil fuel.

Power generated by an ordinary household or an operator other than power companies is used by the power generation operator. Excessive power after power is used by the power generation operator is currently purchased by power companies. However, purchasing power supplied from power generation facilities outside the control of a power company is a heavy burden for the power company. For example, electric energy supplied from photovoltaic power generation facilities depends on the weather. Moreover, electric energy supplied from in-house power generating stations of ordinary households depends on power usage of ordinary households that changes considerably day by day. Thus, it is difficult for power companies to receive stable power supply from power generation facilities outside the control of power companies. For the above reasons, it may become difficult for power companies to purchase power in the future.

Thus, a home battery initiative that uses power generated by power generation facilities outside the control of power companies after being temporarily stored in batteries has recently gained attention. For example, a method of using power generated by photovoltaic power generation facilities by storing such power in batteries and making up for shortages from the batteries in the night or when the weather is bad is considered. Further, methods of limiting electric energy received from a power company in accordance with the battery storage amount and using power stored in batteries during the daytime when power rates are higher by storing power in batteries supplied by a power company in the night when power rates are lower can be considered. Batteries can directly store power as DC, which eliminates the need for DC/AC conversion or AC/DC conversion made for power transmission so that losses during conversion can be reduced.

Thus, various expectations regarding power management mingle with one another amid the smart grid initiative. To realize such power management, the smart grid initiative is premised on having a communication channel along with a transmission network. That is, exchanging information about power management by using the intelligent transmission network is assumed. However, in a region where a communication infrastructure has been built, instead of using a transmission network as a communication channel, information about power management may be exchanged by using a network constructed by the deployed communication infrastructure. That is, what is important in the smart grid initiative is how efficiently to manage power generation facilities and storage facilities that are not managed in a unified manner.

The power management in the smart grid initiative includes power management concerning motor-driven movable bodies such as electric vehicles and plug-in hybrid vehicles. Regarding power management intended for batteries of a motor-driven movable body, for example, Japanese Patent Application Laid-Open No. 2009-027772 discloses a technology that identifies a reserve capacity of a battery and detects a duration of battery output based on the reserve capacity. Further, Japanese Patent Application Laid-Open No. 2009-027772 discloses a technology that displays information about the detected output enabled time. Japanese Patent Application Laid-Open No. 2004-254483 discloses a technology that displays a time or a distance in which driving of a motor-driven movable body can be continued based on a battery residual quantity. Further, Japanese Patent Application Laid-Open No. 2001-231103 discloses a technology that displays forecast information of a travelable time and forecast information of a travelable distance based on a power consumption pattern and a power supply pattern in motion in a hybrid vehicle.

SUMMARY OF THE INVENTION

Technologies described in the above documents concern technologies that calculate a travelable time or distance based on a residual quantity of a battery consumed by traveling of a motor-driven movable body or display the calculation results. However, such technologies have been invented by assuming current hybrid vehicles and do not take an idea of exchanging electric power between motor-driven movable bodies into consideration at all. Current hybrid vehicles have an internal combustion engine mounted thereon. Further, current hybrid vehicles have a mechanism mounted thereon that regenerates electric power to a battery when driven by using fossil fuel. Thus, current hybrid vehicles can be driven by using fossil fuel such as gasoline even if the battery residual quantity becomes 0.

By contrast, motor-driven movable bodies driven by electric power of batteries are unable to travel on their own at all if the battery residual quantity becomes 0. In such a situation, it is necessary to tow away a motor-driven movable body that is unable to travel on its own or to charge a motor-driven movable body that is unable to travel on its own by some method on the spot. In such a case, in consideration of convenience and costs, charging a motor-driven movable body that is unable to travel on its own from another motor-driven movable body is preferable to towing away such a motor-driven movable body. However, unlike charging facilities such as charging stations with sufficient chargeable electric power, electric power to be used for driving a motor-driven movable body is supplied to another motor-driven movable body and thus, cautious feeding control is demanded to avoid entering states in which the motor-driven movable body is unable to travel on its own.

However, it is very difficult for a user to correctly decide appropriate electric energy of electric power to be exchanged between motor-driven movable bodies. Thus, a mechanism to make the amount of electric energy to be transferred easily recognizable so that both a discharging vehicle and a charged vehicle can travel a necessary and sufficient travelable distance is demanded. The present invention has been made in view of the above demand and it is desirable to provide a novel and improved information processing apparatus, motor-driven movable body, and discharge control method capable of enabling the user to easily decide suitable electric energy to be transferred between motor-driven movable bodies.

While technologies described in the above documents assume only vehicles as motor-driven movable bodies, motor-driven movable bodies assumed in the present invention are not limited to vehicles. In addition to electric vehicles, for example, motor-driven bicycles, electric buses, motor-driven freight cars, motor-driven ships, and motor-driven planes can also be considered as motor-driven movable bodies. The above battery means any unit capable of accumulating energy in some form and discharging energy again. Typical examples thereof are accumulators and capacitors.

For example, a lithium-ion battery, nickel-metal hydride battery, lead storage battery, and NAS battery are known as accumulators currently available. On the other hand, for example, a field-effect capacitor, ceramic capacitor, and electric double layer capacitor are known as capacitors currently available. Also, a pumped-storage generation system can be considered as a kind of battery. The pumped-storage generation system is an example of a storage system that converts electrical energy into potential energy for storage. For example, a hydroelectric power generation system that carries out hydroelectric power generation by pumping up water to a higher place using electrical energy and using falling motion energy of the water is a typical example of the pumped-storage generation system.

Further, a storage system using electrolysis of water can be considered as a kind of battery. The storage system stores electric power by carrying out electrolysis of water using electrical energy and storing generated hydrogen. Then, the storage system generates electric power by burning the stored hydrogen or generates electric power from the stored hydrogen using fuel cells to regenerate electrical energy. Thus, mechanisms that can use electrical energy again after temporarily storing the electrical energy by some method can all be considered as a kind of battery.

An information processing apparatus include a travelable information splay unit that displays before a discharge, regarding motor-driven movable bodies of a discharge source and a discharge destination driven by using electric power of batteries, information about places to which the motor-driven movable body of the discharge source can move using electric power of the battery left after the discharge by assuming, when information about a discharge amount discharged from the battery of the motor-driven movable body of the discharge source toward the motor-driven movable body of the discharge destination that receives power supply is input, a case in which the discharge amount is discharged from the battery.

The information about the places to which the motor-driven movable body can move may be one or a combination of a plurality of a travelable distance, a travelable time when the travelable distance is traveled at a predetermined speed, travelable areas, and reachable charging places.

The charging places may be places where feeding facilities are installed or a destination.

The information about the discharge amount may be a first charging place reachable by the motor-driven movable body of the discharge source after the discharge, a second charging place reachable by the motor-driven movable body of the discharge destination, or a set of the first charging place and the second charging place.

The information processing apparatus may further include an operation processing unit that calculates the discharge amount when the first charging place is input as the information about the discharge amount, based on a distance from a current location to the first charging place and the distance which the motor-driven movable body of the discharge source can move per unit electric power. The operation processing unit may calculate the discharge amount so that electric power allowing the motor-driven movable body of the discharge source to reach at least the first charging place is left in the battery.

The operation processing unit may calculate the discharge amount so that electric power allowing the motor-driven movable body of the discharge source to reach at least the first charging place is left in the battery and the motor-driven movable body of the discharge destination can reach at least the nearest charging place.

The travelable information display unit may display the areas to which the motor-driven movable body of the discharge source can move and the areas to which the motor-driven movable body of the discharge destination can move in a distinguishable form on a map based on the discharge amount calculated by the operation processing unit.

The travelable information display unit may display the charging places contained in the areas to which the motor-driven movable body of the discharge source can move and the charging places contained in the areas to which the motor-driven movable body of the discharge destination can move in a distinguishable form on a map based on the discharge amount calculated by the operation processing unit.

The information processing apparatus may further include a user input unit to input the information about the discharge amount. The user input unit may restrict user input so that a third charging place not reachable by the motor-driven movable body of the discharge source before the discharge or a fourth charging place not reachable by the motor-driven movable body of the discharge destination before the discharge is not selected.

The information processing apparatus may further include an operation processing unit that calculates the discharge amount when the second charging place is input as the information about the discharge amount, based on a distance from a current location to the second charging place and the distance which the motor-driven movable body of the discharge destination can move per unit electric power. The operation processing unit may calculate the discharge amount so that the motor-driven movable body of the discharge destination can reach at least the second charging place.

The information processing apparatus may further include a range presentation unit that presents to a user a range of the discharge amount so that at least one charging place is contained in areas to which the motor-driven movable body of the discharge source can move after the discharge and at least one charging place is contained in areas to which the motor-driven movable body of the discharge destination can move after the discharge.

The range presentation unit may present to the user the range of the discharge amount so that the motor-driven movable body of the discharge source can reach the nearest charging place after the discharge and the motor-driven movable body of the discharge destination can reach at least the nearest charging place after the discharge or the range of the discharge amount so that the motor-driven movable body of the discharge source can reach at least the nearest charging place after the discharge and the motor-driven movable body of the discharge destination can reach the nearest charging place after the discharge.

The information processing apparatus may further include an identity verification unit that verifies a user who has permission of an operation related to discharging. The identity verification unit may verify the user by one or a combination of a plurality of password authentication, fingerprint authentication, vein authentication, and iris authentication.

The information processing apparatus may further include an attribute specifying unit to specify which motor-driven movable body of two connected motor-driven movable bodies to become the charge source or the charge destination.

The attribute specifying unit may compare electric energy left in the batteries of the two motor-driven movable bodies and specifies the motor-driven movable body with more electric energy as the motor-driven movable body of the charge source and the motor-driven movable body with less electric energy as the motor-driven movable body of the charge destination.

A motor-driven movable body include a battery to store electric power for driving; and an information processing apparatus having a travelable information display unit that displays, before a discharge, information about places to which the motor-driven movable body can move by using electric power of the battery left after the discharge when information about electric energy discharged from the battery toward the motor-driven movable body of a discharge destination is input, assuming a case in which the electric energy based on the input information about the electric energy is discharged from the battery.

A motor-driven movable body include a battery to store electric power for driving; and an information processing apparatus having a travelable information display unit that displays, before a discharge, information about places to which the motor-driven movable body can move by using electric power stored in the battery after a supply and information about places to which the motor-driven movable body of a discharge source can move after the supply when information about electric energy supplied to the battery from the motor-driven movable body of the discharge source is input, assuming a case in which the electric energy based on the input information about the electric energy is supplied from the battery.

A discharge control method, including the steps of inputting information about electric energy discharged from a battery toward a second motor-driven movable body connected to a first motor-driven movable body via a power line by an input means of an information processing apparatus connected to the first motor-driven movable body having the battery; and displaying information about places to which the first motor-driven movable body can move by using electric power of the battery left after a discharge in a display means of the information processing apparatus based on the information input in the input step.

A discharge control method, including the steps of inputting information about electric energy supplied to a second battery from a first motor-driven movable body connected to a second motor-driven movable body via a power line by an input means of an information processing apparatus connected to the second motor-driven movable body having the second battery; and displaying information about places to which the first motor-driven movable body can move by using electric power left in a first battery held by the first motor-driven movable body after the electric power is supplied to the second motor-driven movable body in a display means of the information processing apparatus connected to the first motor-driven movable body based on the information input in the input step.

Information about places to which the first motor-driven movable body can move may be further displayed in the display means of the information processing apparatus connected to the second motor-driven movable body in the display step.

According to the embodiments of the present invention described above, the user can easily decide suitable electric energy to be transferred between motor-driven movable bodies.

BRIEF DESCRIPTION OF THE DRAWINGS

FIG. 28 is an explanatory view illustrating a configuration of a screen displayed in the operation flow (when discharging (recommendation of discharge amount)) of the information processing apparatus according to the modification (Modification 3) of the embodiment;

DETAILED DESCRIPTION OF THE EMBODIMENTS

Figure 1:
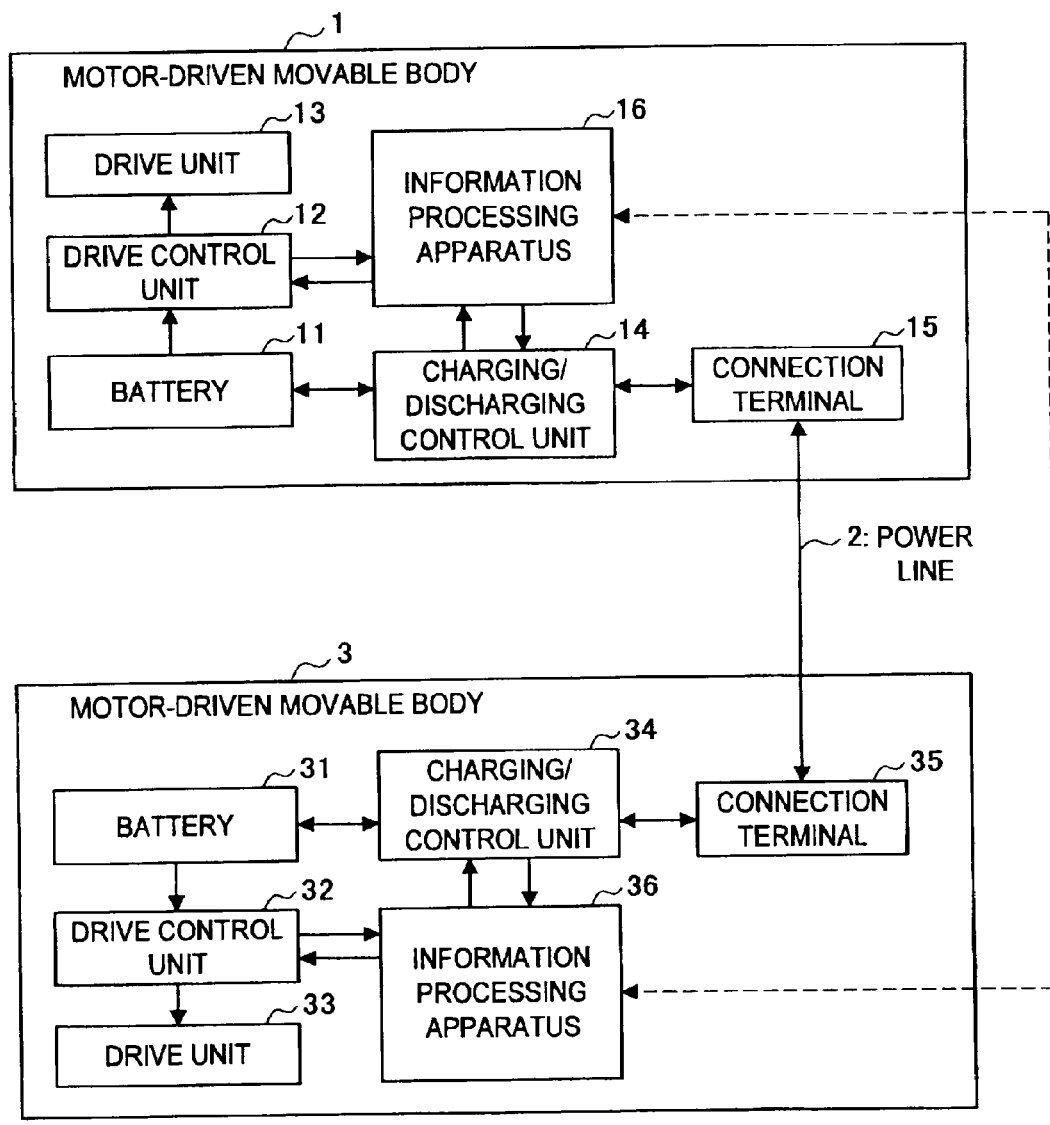
FIG. 1 is an explanatory view illustrating a function configuration of motor-driven movable bodies according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Description Flow]

The flow of description about embodiments of the present invention described below will briefly be described. First, the configuration of motor-driven movable bodies 1 and 3 according to the present embodiment will be described with reference to FIGS. 1 and 2. Next, the configuration of an information processing apparatus 16 according to the present embodiment will be described with reference to FIG. 3. Next, the operation flow of the information processing apparatus 16 according to the present embodiment at the time of discharging will be described with reference to FIGS. 4 and 5. Also, the screen configuration displayed in the operation flow will be concretely described with reference to FIGS. 6 to 11.

Next, the operation flow of the information processing apparatus 16 according to a modification (Modification 1) of the present embodiment at the time of discharging will be described with reference to FIGS. 12 to 15. The screen configuration displayed in the operation flow will be concretely described with reference to FIGS. 16 to 21. Next, the operation flow when a charging/discharging control unit 34 according to a modification (Modification 2) of the present embodiment decides the charging/discharging side will be described with reference to FIG. 22.

Next, the operation flow of the information processing apparatus 16 according to a modification (Modification 3) of the present embodiment at the time of discharging will be described with reference to FIGS. 23 to 27. The screen configuration displayed in the operation flow will be concretely described with reference to FIGS. 28 and 29. Next, the processing flow of mutual authentication performed by the motor-driven movable bodies 1 and 3 according to the present embodiment will be described with reference to FIG. 30. Next, the hardware configuration capable of realizing functions of the information processing apparatus 16 and an information processing apparatus 36 according to the present embodiment will be described with reference to FIG. 31. Lastly, technical ideas of the embodiment will be summarized and operation effects obtained from the technical ideas will briefly be described.

(Explanatory Items)
1: Introduction
2: Embodiment
   2-1: Configuration of the Motor-Driven Movable Bodies 1 and 3
   2-2: Configuration of the Information Processing Apparatus 16
      2-2-1: Function Configuration
      2-2-2: Operation Flow at the time of Discharging
   2-4: Modification 1 (Bilateral Information Display)
      2-4-1: Operation Flow at the time of Discharging
   2-5: Modification 2 (Automatic Decision of Charging/Discharging Side)
      2-5-1: Operation Flow when the Charging/Discharging Side is Decided
   2-6: Modification 3 (Recommendation of Discharge amount)
      2-6-1: Operation Flow at the time of Discharging
   2-7: Processing Flow for Mutual Authentication
   2-8: Hardware Configuration Example
3: Conclusion

1: INTRODUCTION

Technology related to embodiments described later concerns charging/discharging between motor-driven movable bodies. As described above, there are various kinds of motor-driven movable bodies. There is no specific limit to the kind of motor-driven movable bodies to which technology related to embodiments described later can be applied. To make understanding of technical content easier, an electric vehicle or plug-in hybrid vehicle of which a concrete image can easily be evoked will be assumed for the description below. Electric vehicles and plug-in hybrid vehicles are present in an actually travelable state and are expected to replace gasoline cars in the near future.

A motor-driven movable body is driven by using electric power stored in a battery. The battery is charged by charging equipment provided at a charging station, home, retail store or the like. Thus, it is necessary for the motor-driven movable body to travel on its own to a place where charging equipment (hereinafter, referred to as a charging place) is located. For a gasoline car, there are many gas stations in an urban area. Moreover, gasoline, which is liquid fuel, can be carried in a tank or the like and a fuel tank itself is large enough to provide sufficient gasoline to travel several hundred kilometers. Thus, it is rare for a gasoline car to run out of gasoline, making the gasoline car incapable of traveling on its own. For a motor-driven movable body, on the other hand, there are only a small number of charging places in an urban area and in contrast to liquid fuel, gasoline, it is difficult to carry electric power enough to drive the motor-driven movable body. Moreover, the battery capacity of the motor-driven movable body is limited and characterized by a relatively short distance over which the motor-driven movable body can travel.

For the above reasons, the danger of a motor-driven movable body becoming incapable of traveling on its own due to insufficient electric power can be considered significantly higher than a gasoline car. Such a danger can also be considered to be delaying widespread use of motor-driven movable bodies. Thus, the inventors of the present invention devised a method of enabling an exchange of electric power between motor-driven movable bodies as a method of helping a motor-driven movable body that has become incapable of traveling on its own. When exchanging electric power between motor-driven movable bodies, it is necessary to decide the charged/discharge amount to allow both motor-driven movable bodies to travel at least to the nearest charging place on their own. However, as an actual issue, it is very difficult for the user to decide an appropriate charged/discharge amount. In view of such difficulties, the inventors of the present invention devised a mechanism to allow the user to decide an appropriate charged/discharge amount easily.

2: EMBODIMENT

An embodiment of the present invention will be described below, but the present embodiment is devised to overcome the above difficulties and provides a mechanism to allow the user to decide an appropriate charged/discharge amount easily at the time of exchanging electric power between motor-driven movable bodies.

[2-1: Configuration of the Motor-Driven Movable Bodies 1 and 3]

Figure 2:
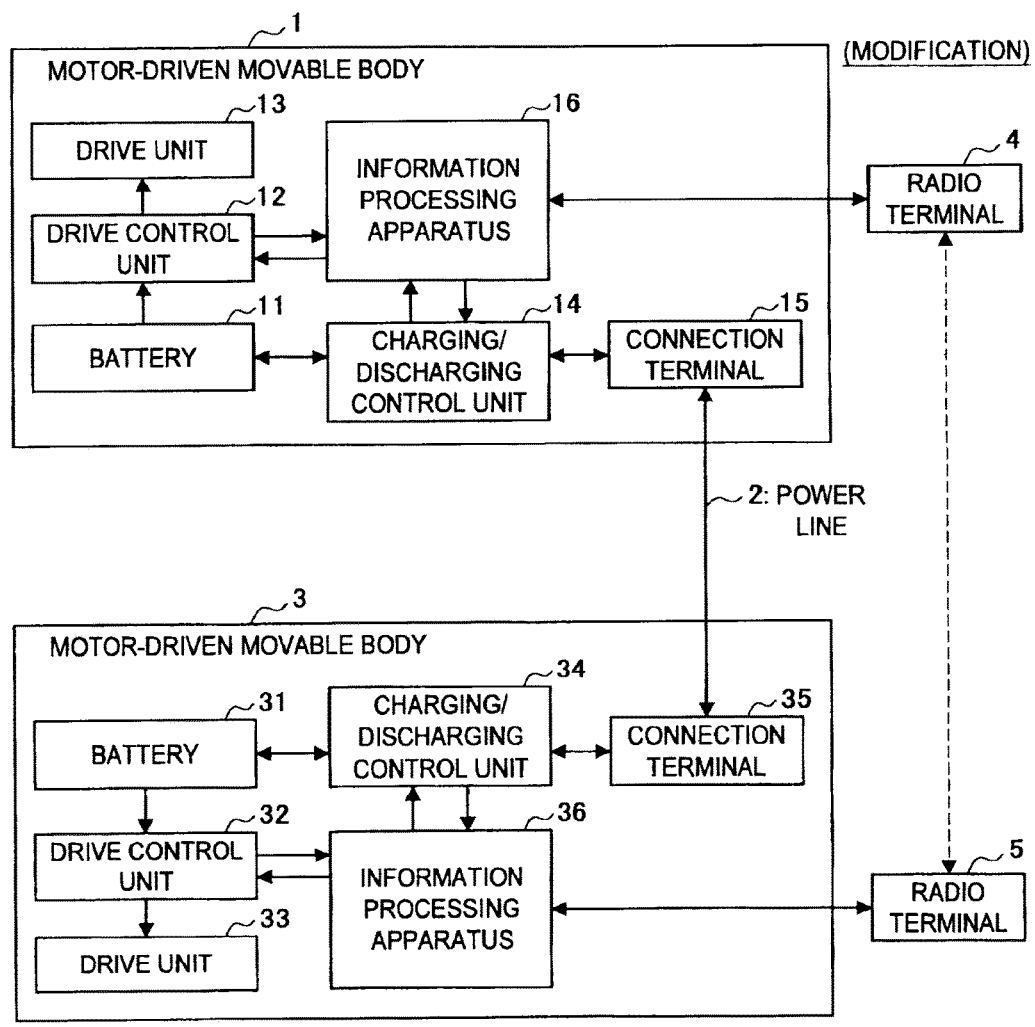
FIG. 2 is an explanatory view illustrating the function configuration of the motor-driven movable bodies according to the embodiment.

First, the configuration of the motor-driven movable bodies 1 and 3 according to the present embodiment will be described with reference to FIGS. 1 and 2. FIG. 1 is an explanatory view illustrating the configuration of the motor-driven movable bodies 1 and 3 according to the present embodiment. FIG. 2, on the other hand, is a modification of the motor-driven movable bodies 1 and 3 shown in FIG. 1. FIGS. 1 and 2 schematically show how electric power is exchanged between the motor-driven movable bodies 1 and 3. For convenience of description, it is assumed below that the motor-driven movable body 1 is on the discharging side and the motor-driven movable body 3 on the charging side. The discharging side and charging side are specified automatically or manually.

First, FIG. 1 is referred to. As shown in FIG. 1, the motor-driven movable body 1 includes a battery 11, a drive control unit 12, a drive unit 13, a charging/discharging control unit 14, a connection terminal 15, and the information processing apparatus 16. Similarly, the motor-driven movable body 3 includes a battery 31, a drive control unit 32, a drive unit 33, a charging/discharging control unit 34, a connection terminal 35, and the information processing apparatus 36. The motor-driven movable bodies 1 and 3 are connected to a power line 2. The power line 2 may also have, in addition to the function as a power supply line, the function as a transmission path.

(Function of Components Related to Driving)

The motor-driven movable body 1 is driven by using electric power stored in the battery 11. Driving of the motor-driven movable body 1 is controlled by the drive control unit 12. The drive control unit 12 drives the motor-driven movable body 1 by supplying electric power stored in the battery 11 to the drive unit 13. Then, the drive control unit 12 stops driving of the motor-driven movable body 1 by stopping power supply from the battery 11 to the drive unit 13. The drive unit 13 includes a motor or the like. The drive unit 13 that has received electric power supplied from the battery 11 transmits power to a drive system by operating the motor with the received electric power. When power is transmitted to the drive system, the motor-driven movable body 1 starts to travel. In the explanatory view in FIG. 1, the depiction of a steering means and the like of the motor-driven movable body 1 is omitted.

Similarly, the motor-driven movable body 3 is driven by using electric power stored in the battery 31. Driving of the motor-driven movable body 3 is controlled by the drive control unit 32. The drive control unit 32 drives the motor-driven movable body 3 by supplying electric power stored in the battery 31 to the drive unit 33. Then, the drive control unit 32 stops driving of the motor-driven movable body 3 by stopping power supply from the battery 31 to the drive unit 33. The drive unit 33 includes a motor or the like. The drive unit 33 that has received electric power supplied from the battery 31 transmits power to a drive system by operating the motor with the received electric power. When power is transmitted to the drive system, the motor-driven movable body 3 starts to travel. In the explanatory view in FIG. 1, the depiction of a steering means and the like of the motor-driven movable body 3 is omitted.

(Function of Components Related to Charging/Discharging)

The battery 11 needs to be charged to drive the motor-driven movable body 1. Charging of the battery 11 is controlled by the charging/discharging control unit 14. The charging/discharging control unit 14 charges the battery 11 with electric power supplied through the power line 2 connected to the connection terminal 15 or supplies electric power to the power line 2 connected to the connection terminal 15 by discharging electric power stored in the battery 11.

If, for example, the power line 2 of charging facilities is connected to the connection terminal 15 in a charging place, the charging/discharging control unit 14 charges the battery 11 with electric power supplied through the power line 2. If the power line 2 connected to the connection terminal 35 of the motor-driven movable body 3 is connected to the connection terminal 15, the charging/discharging control unit 14 supplies electric power to the power line 2 connected to the connection terminal 15 by discharging electric power stored in the battery 11.

The charging/discharging control unit 14 also exchanges information with the information processing apparatus 16. For example, the charging/discharging control unit 14 inputs a residual quantity of electric power stored in the battery 11 (hereinafter, referred to as a battery residual quantity) into the information processing apparatus 16. The information processing apparatus 16, on the other hand, inputs a control signal to control the discharge amount of the battery 11 into the charging/discharging control unit 14. The charging/discharging control unit 14 into which the control signal has been input supplies electric power to the power line 2 connected to the connection terminal 15 by discharging electric power of the discharge amount indicated by the input control signal from the battery 11.

The discharge amount is manually input by the user or automatically calculated by the information processing apparatus 16. However, as described above, it is difficult for the user to decide the discharge amount appropriately. Thus, the information processing apparatus 16 presents supplementary information to decide an appropriate discharge amount to the user. At this point, the information processing apparatus 16 calculates the supplementary information based on the battery residual quantity of the battery 11 and the battery residual quantity of the battery 31 mounted on the motor-driven movable body 3. Content of the supplementary information, the calculation method of the supplementary information, and the display method of the supplementary information will be described later.

Like the motor-driven movable body 1, the battery 31 needs to be charged to drive the motor-driven movable body 3. Charging of the battery 31 is controlled by the charging/discharging control unit 34. The charging/discharging control unit 34 charges the battery 31 with electric power supplied through the power line 2 connected to the connection terminal 35. If, for example, the power line 2 of charging facilities is connected to the connection terminal 35 in a charging place, the charging/discharging control unit 34 charges the battery 31 with electric power supplied through the power line 2. If the power line 2 connected to the connection terminal 15 of the motor-driven movable body 1 is connected to the connection terminal 35, the charging/discharging control unit 34 charges the battery 31 with electric power supplied from the motor-driven movable body 1 through the power line 2 connected to the connection terminal 35.

The charging/discharging control unit 34 inputs information into the information processing apparatus 36. For example, the charging/discharging control unit 34 inputs a residual quantity of electric power stored in the battery 31 into the information processing apparatus 36. The information processing apparatus 36 also presents the same information as supplementary information displayed in the information processing apparatus 16 or a portion of the supplementary information to the user. At this point, the information processing apparatus 36 acquires the same information as the supplementary information or a portion thereof from the information processing apparatus 16. Content of the supplementary information and the display method of the supplementary information will be described later.

(Communication Method Between the Information Processing Apparatuses 16 and 36)

If the power line 2 functions as a communication path, the information processing apparatuses 16 and 36 can mutually exchange information through the power line 2. If the information processing apparatuses 16 and 36 have a radio communication function, the information processing apparatuses 16 and 36 can use the radio communication function to mutually exchange information. Further, if the information processing apparatuses 16 and 36 are connected by a communication cable indicated by a broken line in FIG. 1 that is different from the power line 2, the information processing apparatuses 16 and 36 can use the communication cable to mutually exchange information.

If, however, the information processing apparatuses 16 and 36 do not have a communication function to mutually exchange information, as shown in FIG. 2, external radio terminals 4 and 5 can be used to realize exchange of information. In the example in FIG. 2, the information processing apparatus 16 is connected to the radio terminal 4 and the information processing apparatus 36 is connected to the radio terminal 5 to realize exchange of information between the information processing apparatuses 16 and 36 via the radio terminals 4 and 5.

As the radio terminals 4 and 5, for example, mobile phones, mobile information terminals, notebook PCs, and mobile game machines can be exemplified. Instead of the radio terminals 4 and 5, wire terminals or communication adapters that mutually exchange information by using a communication cable may be used. In the description that follows, it is assumed that information is mutually exchanged through the power line 2 that connects the motor-driven movable bodies 1 and 3. In such a case, information is transmitted via the charging/discharging control units 14 and 34, the connection terminals 15 and 35, and the power line 2.

The configuration of the motor-driven movable bodies 1 and 3 will briefly be described below.

[2-2: Configuration of the Information Processing Apparatus 16]

Next, the method that allows the user to appropriately decide electric energy exchanged between the motor-driven movable bodies 1 and 3 will be described. Processing according to the method is realized by the information processing apparatuses 16 and 36. The function configuration and the operation flow of the information processing apparatus 16 will be described below.

(2-2-1: Function Configuration)

Figure 3:
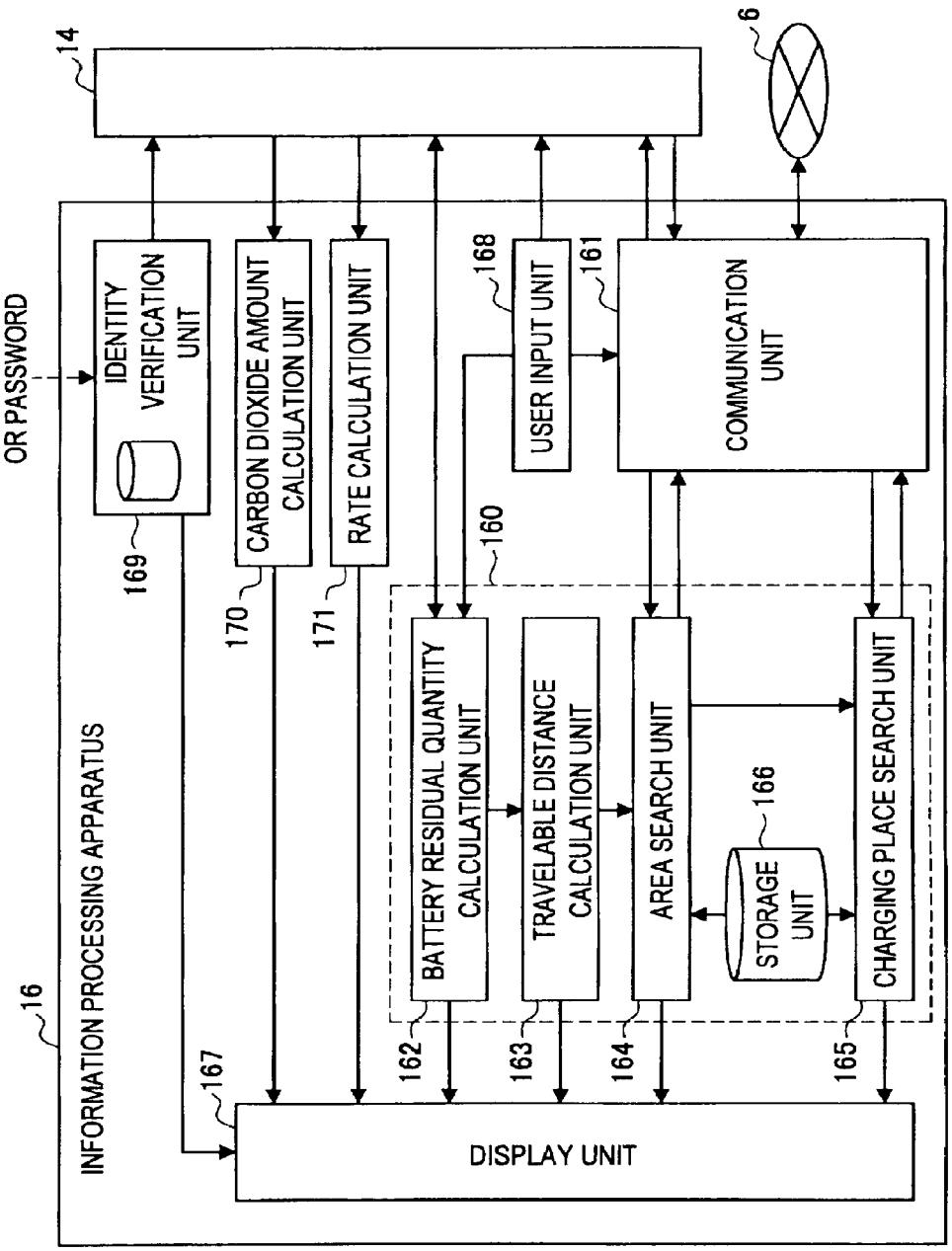
FIG. 3 is an explanatory view illustrating the function configuration of an information processing apparatus according to the embodiment.

First, the function configuration of the information processing apparatus 16 according to the present embodiment will be described in detail with reference to FIG. 3. FIG. 3 is an explanatory view illustrating in detail the function configuration of the information processing apparatus 16 according to the present embodiment. Since the function configuration of the information processing apparatus 36 is substantially the same as that of the information processing apparatus 16, a detailed description thereof is omitted. However, if there is any difference in the function configuration between the information processing apparatuses 16 and 36, such a difference will supplementarily be described.

As shown in FIG. 3, the information processing apparatus 16 includes a communication unit 161, a battery residual quantity calculation unit 162, a travelable distance calculation unit 163, an area search unit 164, a charging place search unit 165, a storage unit 166, a display unit 167, and a user input unit 168. Further, the information processing apparatus 16 includes an identity verification unit 169, a carbon dioxide amount calculation unit 170, and a rate calculation unit 171. The information processing apparatus 16 may have a biometric authentication sensor (not shown) mounted thereon. Further, the battery residual quantity calculation unit 162, the travelable distance calculation unit 163, the area search unit 164, the charging place search unit 165, and the storage unit 166 constitute an operation unit 160.

When electric power is exchanged between the motor-driven movable bodies 1 and 3, as shown in FIGS. 1 and 2, the power line 2 is connected to the connection terminal 15 of the motor-driven movable body 1 and the connection terminal 35 of the motor-driven movable body 3. If the power line 2 is connected to the connection terminal 15, the charging/discharging control unit 14 detects the connection and notifies the information processing apparatus 16 that the power line 2 is connected to the connection terminal 15 (hereinafter, called a connection notification). Similarly, if the power line 2 is connected to the connection terminal 35, the charging/discharging control unit 34 detects the connection and notifies the information processing apparatus 36 that the power line 2 is connected to the connection terminal 35.

Then, mutual authentication described later is performed between the motor-driven movable bodies 1 and 3. The mutual authentication may be performed by the charging/discharging control units 14 and 34 or the information processing apparatuses 16 and 36. In the description that follows, it is assumed that the information processing apparatuses 16 and 36 perform the mutual authentication. If the mutual authentication is successful, the connection notification is input into the battery residual quantity calculation unit 162. The battery residual quantity calculation unit 162 into which the connection notification has been input acquires the battery residual quantity (hereinafter, referred to as a pre-discharge battery residual quantity) of the battery 11 from the charging/discharging control unit 14. The battery residual quantity calculation unit 162 that has acquired the pre-discharge battery residual quantity displays the acquired pre-discharge battery residual quantity in the display unit 167. Further, the battery residual quantity calculation unit 162 inputs the pre-discharge battery residual quantity into the travelable distance calculation unit 163.

The travelable distance calculation unit 163 into which the pre-discharge battery residual quantity has been input calculates a travelable distance (hereinafter, referred to as a pre-discharge travelable distance) of the motor-driven movable body 1 at the present time based on the input pre-discharge battery residual quantity. For example, the travelable distance calculation unit 163 calculates the pre-discharge travelable distance based on information about fuel consumption (average travelable distance per unit of electric power) of the motor-driven movable body 1 held in advance. The travelable distance calculation unit 163 that has calculated the pre-discharge travelable distance displays the calculated pre-discharge travelable distance in the display unit 167. Further, the travelable distance calculation unit 163 inputs the calculated pre-discharge travelable distance into the area search unit 164. Incidentally, the travelable distance calculation unit 163 may calculate a travelable time from the calculated pre-discharge travelable distance and an average travel speed of the motor-driven movable body 1 held in advance to display the travelable time in the display unit 167.

The area search unit 164 into which the pre-discharge travelable distance has been input searches for areas that can be reached with the pre-discharge battery residual quantity of the motor-driven movable body 1 based on the input pre-discharge travelable distance. For example, the area search unit 164 searches for areas as reachable areas within a circle having the current location as the center and the travelable distance as the radius thereof on a map. At this point, the area search unit 164 uses information of a map prerecorded in the storage unit 166 or information of a map acquired from a map server or the like in a wide area network 6 via the communication unit 161.

If information of a more detailed map can be acquired, the area search unit 164 searches for areas that can be reached when the pre-discharge travelable distance is traveled along passable roads from the current location. If, at this point, road attributes (for example, the road width, one-way traffic, speed limit, suspension of traffic, and school-commuting road) can be acquired as information of the map, the area search unit 164 searches for areas that can be reached by the motor-driven movable body 1 by considering road attributes. If a search engine (search server) capable of searching for reachable areas by inputting the current location and the travelable distance is present in the wide area network 6, the area search unit 164 may search for areas that can be reached by the motor-driven movable body 1 by using the search engine.

Areas (hereinafter, referred to as pre-discharge reachable areas) reachable by the motor-driven movable body 1 obtained by the search of the area search unit 164 are displayed in the display unit 167 by the area search unit 164. The area search unit 164 inputs the pre-discharge reachable areas of the motor-driven movable body 1 into the charging place search unit 165. The charging place search unit 165 into which the pre-discharge reachable areas of the motor-driven movable body 1 have been input searches for charging places contained in the input pre-discharge reachable areas. At this point, the charging place search unit 165 uses information of a map prerecorded in the storage unit 166 or information of a map acquired from a map server or the like in the wide area network 6 via the communication unit 161.

If a search engine (search server) capable of searching for charging places present inside reachable areas by inputting the current location and the travelable distance is present in the wide area network 6, the charging place search unit 165 may search for charging places by using the search engine. Charging places (hereinafter, referred to as pre-discharge charging places) obtained by the search of the charging place search unit 165 are displayed in the display unity 167 by the charging place search unit 165.

Thus, after the power line 2 is connected and mutual authentication is successfully performed, information (hereinafter, referred to as pre-discharge information) about the battery residual quantity of the motor-driven movable body 1 at the current location, travelable distance (time), reachable areas, and charging places inside the reachable areas is displayed in the display unit 167. Needless to say, information displayed here may contain information about the destination set in the motor-driven movable body 1 from the start or information about surrounding areas (for example, information about restaurants, convenience stores, and parking lots) (hereinafter, similarly). Such pre-discharge information is information indicating the status of the motor-driven movable body 1 before power supply from the motor-driven movable body 1 to the motor-driven movable body 3 is started. A portion or all of pre-discharge information of the motor-driven movable body 1 or information necessary to generate pre-discharge information may be displayed in a display unit (not shown) of the information processing apparatus 36 after being sent to the motor-driven movable body 3 via the communication unit 161 and generation processing being performed on the pre-discharge information if necessary.

Next, the identity verification unit 169 verifies the identity of the user. For example, the identity verification unit 169 requests input of the user's password. After the password is input by the user, the identity verification unit 169 verifies the identity of the user by checking the password input by the user against a pre-registered password. If a biometric authentication sensor that reads information about fingerprints, finger veins, retina or the like (hereinafter, referred to as a body site) is mounted on the information processing apparatus 16 or connected thereto, the identity verification unit 169 requests the user to allow the biometric authentication sensor to read a body site. After the body site of the user is read by the biometric authentication sensor, the identity verification unit 169 verifies the identity of the user by checking the read information about the body site against pre-registered information about the body site.

If the identity verification fails, the identity verification unit 169 notifies the charging/discharging control unit 14 of the failure of identity verification and also displays a warning (or displays an error) in the display unit 167. On the other hand, if the identity verification is successful, the identity verification unit 169 notifies the charging/discharging control unit 14 of the successful identity verification. The identity verification unit 169 also requests input of the discharge amount from the user. The user who has received the request inputs the discharge amount using the user input unit 168. After the discharge amount is input using the user input unit 168, the discharge amount is input into the battery residual quantity calculation unit 162 and the charging/discharging control unit 14. The discharge amount may also be input into the information processing apparatus 36 of the motor-driven movable body 3 via the communication unit 161.

The battery residual quantity calculation unit 162 into which the discharge amount has been input calculates a battery residual quantity after the discharge (hereinafter, referred to as a post-discharge battery residual quantity) obtained by subtracting the discharge amount from the current battery residual quantity (pre-discharge battery residual quantity). Then, the battery residual quantity calculation unit 162 displays the post-discharge battery residual quantity in the display unit 167. Further, the battery residual quantity calculation unit 162 inputs the post-discharge battery residual quantity into the travelable distance calculation unit 163.

The travelable distance calculation unit 163 into which the post-discharge battery residual quantity has been input calculates a travelable distance after the discharge of the motor-driven movable body 1 (hereinafter, referred to as a post-discharge travelable distance) based on the input post-discharge battery residual quantity. For example, the travelable distance calculation unit 163 calculates the post-discharge travelable distance based on fuel consumption information of the motor-driven movable body 1 held in advance. The travelable distance calculation unit 163 that has calculated the post-discharge travelable distance displays the calculated post-discharge travelable distance in the display unit 167. Further, the travelable distance calculation unit 163 inputs the calculated post-discharge travelable distance into the area search unit 164. The travelable distance calculation unit 163 may calculate a travelable time from the calculated post-discharge travelable distance to display the travelable time in the display unit 167.

The area search unit 164 into which the post-discharge travelable distance has been input searches for areas reachable with the post-discharge battery residual quantity of the motor-driven movable body 1 based on the input post-discharge travelable distance. For example, the area search unit 164 searches for areas within a circle having the current location as the center and the post-discharge travelable distance as the radius thereof on a map. At this point, the area search unit 164 uses information of a map prerecorded in the storage unit 166 or information of a map acquired from a map server or the like in the wide area network 6 via the communication unit 161.

If information of a more detailed map can be acquired, the area search unit 164 searches for areas that can be reached when the post-discharge travelable distance is traveled along passable roads from the current location. If, at this point, road attributes can be acquired as information of the map, the area search unit 164 searches for areas that can be reached by the motor-driven movable body 1 by considering road attributes. If a search engine (search server) capable of searching for reachable areas by inputting the current location and the travelable distance is present in the wide area network 6, the area search unit 164 may search for areas that can be reached by the motor-driven movable body 1 by using the search engine.

Areas (hereinafter, referred to as post-discharge reachable areas) reachable by the motor-driven movable body 1 obtained by the search of the area search unit 164 are displayed in the display unit 167 by the area search unit 164. The area search unit 164 inputs the post-discharge reachable areas of the motor-driven movable body 1 into the charging place search unit 165. The charging place search unit 165 into which the post-discharge reachable areas of the motor-driven movable body 1 have been input searches for charging places contained in the input post-discharge reachable areas. At this point, the charging place search unit 165 uses information of a map prerecorded in the storage unit 166 or information of a map acquired from a map server or the like in the wide area network 6 via the communication unit 161.

If a search engine (search server) capable of searching for charging places present inside reachable areas by inputting the current location and the travelable distance is present in the wide area network 6, the charging place search unit 165 may search for charging places by using the search engine. Charging places (hereinafter, referred to as post-discharge charging places) obtained by the search of the charging place search unit 165 are displayed in the display unity 167 by the charging place search unit 165.

Thus, after mutual authentication is successfully performed, information (hereinafter, referred to as post-discharge information) about the battery residual quantity of the motor-driven movable body 1 after the discharge, travelable distance (time), reachable areas, and charging places inside the reachable areas is displayed in the display unit 167. The post-discharge information is information indicating the status of the motor-driven movable body 1 after the motor-driven movable body 1 has completed the supply of electric power to the motor-driven movable body 3. A portion or all of post-discharge information of the motor-driven movable body 1 or information necessary to generate post-discharge information may be displayed in the display unit (not shown) of the information processing apparatus 36 after being sent to the motor-driven movable body 3 via the communication unit 161 and generation processing being performed on the post-discharge information if necessary.

In this stage, pre-discharge information and post-discharge information are displayed in the display unit 167. The display unit 167 also displays a message to cause the user to make a selection whether to start the discharge. The user who has received this message issues instructions to start or stop the discharge using the user input unit 168. If the start of the discharge is instructed, the user input unit 168 inputs a control signal providing notification of the start of discharge (hereinafter, referred to as a discharge start signal) into the charging/discharging control unit 14. The charging/discharging control unit 14 into which the discharge start signal has been input outputs electric power of the discharge amount input in advance from the battery 11. The output electric power is supplied to the motor-driven movable body 3 via the connection terminal 15 and the power line 2.

When the supply of electric power is completed, the charging/discharging control unit 14 inputs the discharge amount into the carbon dioxide amount calculation unit 170 and the rate calculation unit 171. The carbon dioxide amount calculation unit 170 into which the discharge amount has been input calculates the amount of carbon dioxide necessary to generate electric power of the input discharge amount. Then, the carbon dioxide amount calculation unit 170 displays the calculated amount of carbon dioxide in the display unit 167. The rate calculation unit 171 into which the discharge amount has been input, on the other hand, calculates the power rate corresponding to the input discharge amount. Then, the rate calculation unit 171 displays the calculated power rate in the display unit 167. The rate calculation unit 171 may also calculate the amount of taxation imposed on electric power of the input discharge amount to display the amount of taxation in the display unit 167 separately from the power rate.

According to the above method, an identity verification is first performed and then, pre-discharge information and post-discharge information are displayed. However, after the user is caused to confirm the situation by displaying pre-discharge information and post-discharge information in advance, the identity verification may be performed only if the user issues instructions to start the discharge using the user input unit 168 to perform discharge processing after the successful identity verification.

In the foregoing, the function configuration of the information processing apparatus 16 according to the present embodiment has been described. In the above description, the configuration in which pre-discharge information and post-discharge information of the motor-driven movable body 1 are presented to the user has been exemplified. However, a configuration in which, in addition to pre-discharge information and post-discharge information of the motor-driven movable body 1, pre-discharge information and post-discharge information of the motor-driven movable body 3 are presented to the user may be adopted. Adopting such a configuration enables a decision of an appropriate discharge amount that takes the status of the motor-driven movable bodies 1 and 3 into consideration.

In such a case, the information processing apparatus 16 needs to acquire the battery residual quantity of the battery 31 from the motor-driven movable body 3. Discharging from the motor-driven movable body 1 corresponds to charging of the motor-driven movable body 3 and thus, the calculation method of the battery residual quantity after the charge/discharge is different between the motor-driven movable bodies 1 and 3. By considering these points, pre-discharge information and post-discharge information of the motor-driven movable body 3 are obtained in the same manner as pre-discharge information and post-discharge information of the motor-driven movable body 1. Such modifications will be described later.

(2-2-2: Operation Flow at the Time of Discharging)

Figure 4:
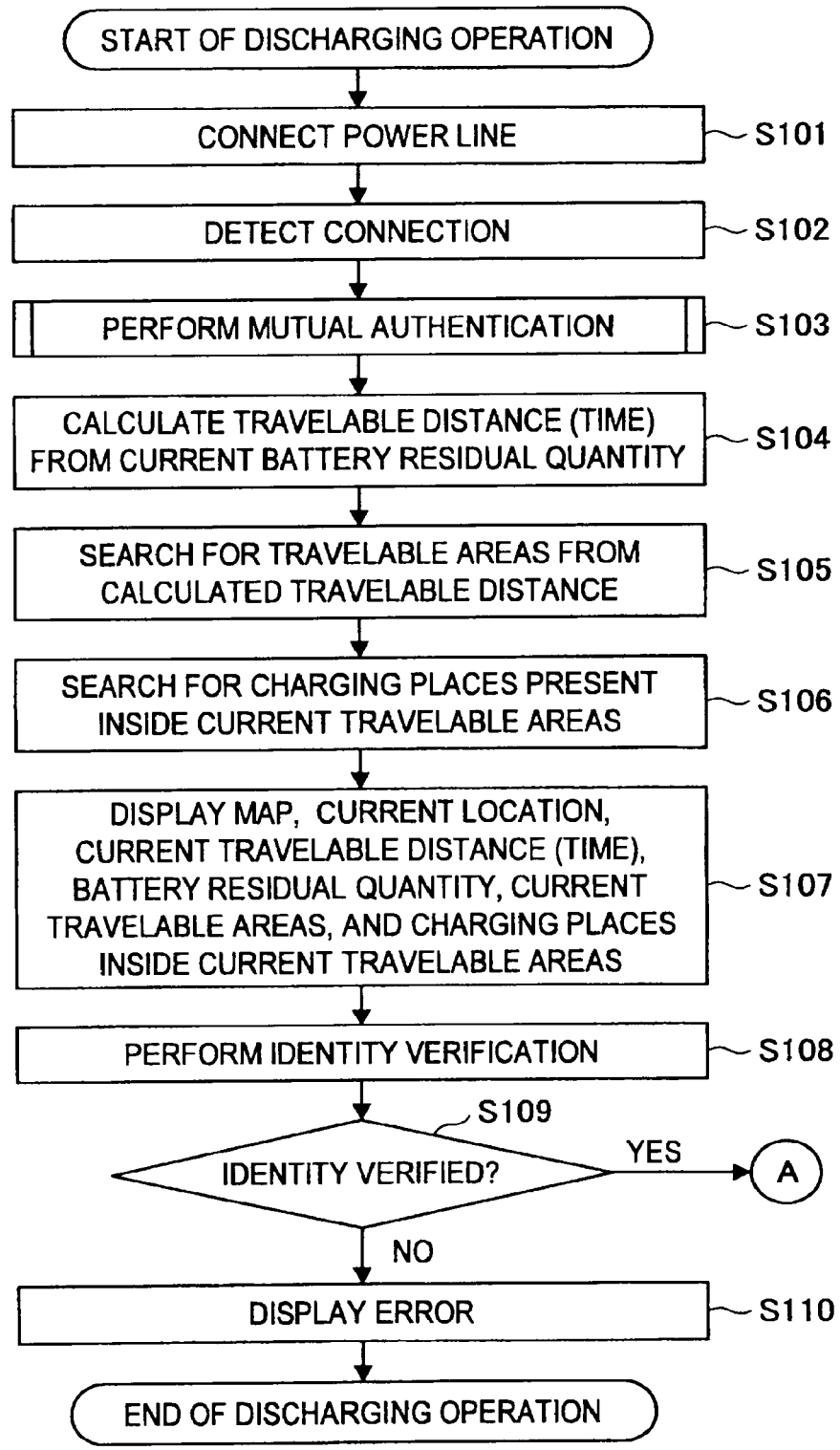
FIG. 4 is an explanatory view illustrating an operation flow (when discharging) of the information processing apparatus according to the embodiment.
Figure 5:
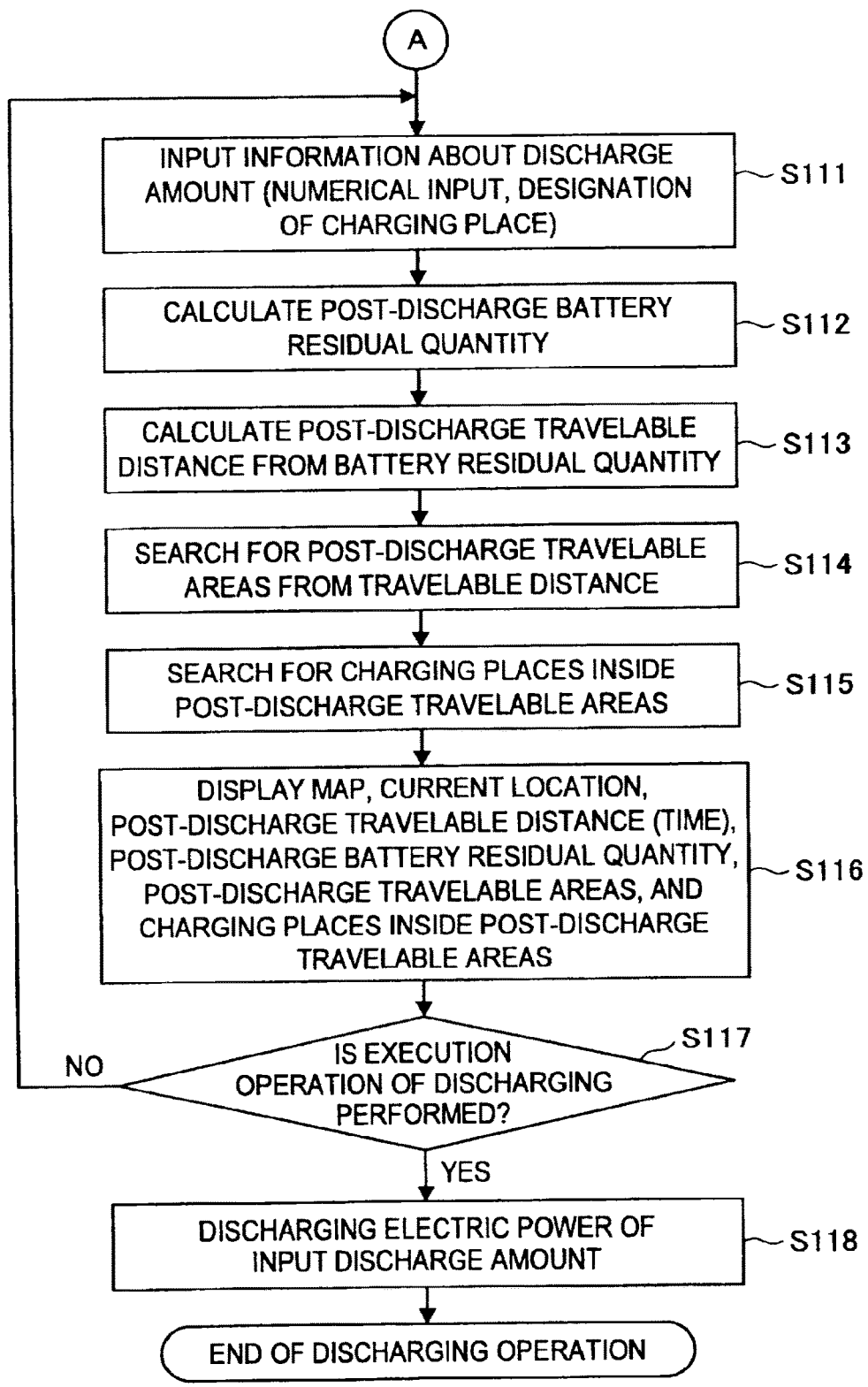
FIG. 5 is an explanatory view illustrating an operation flow (when discharging) of the information processing apparatus according to the embodiment.
Figure 6:
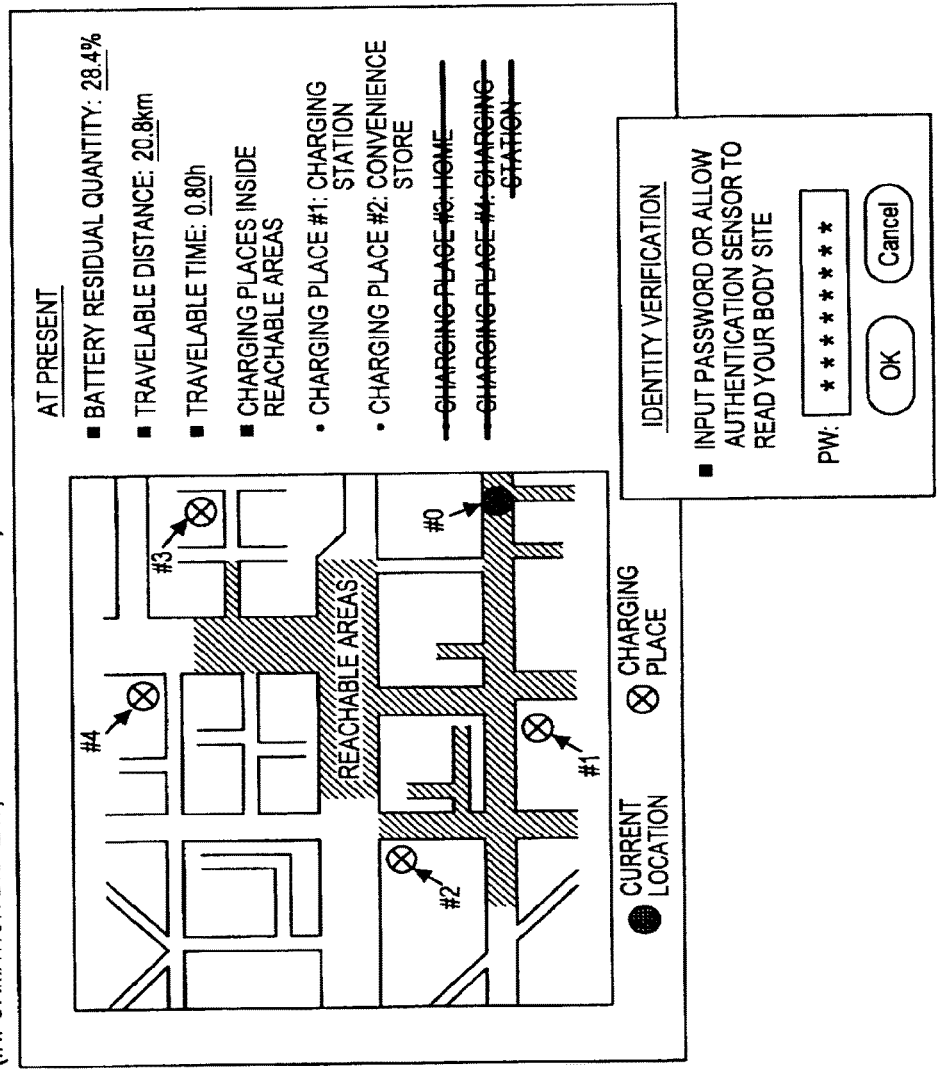
FIG. 6 is an explanatory view illustrating the configuration of a screen displayed in an operation flow (when discharging) of the information processing apparatus according to the embodiment.
Figure 10:
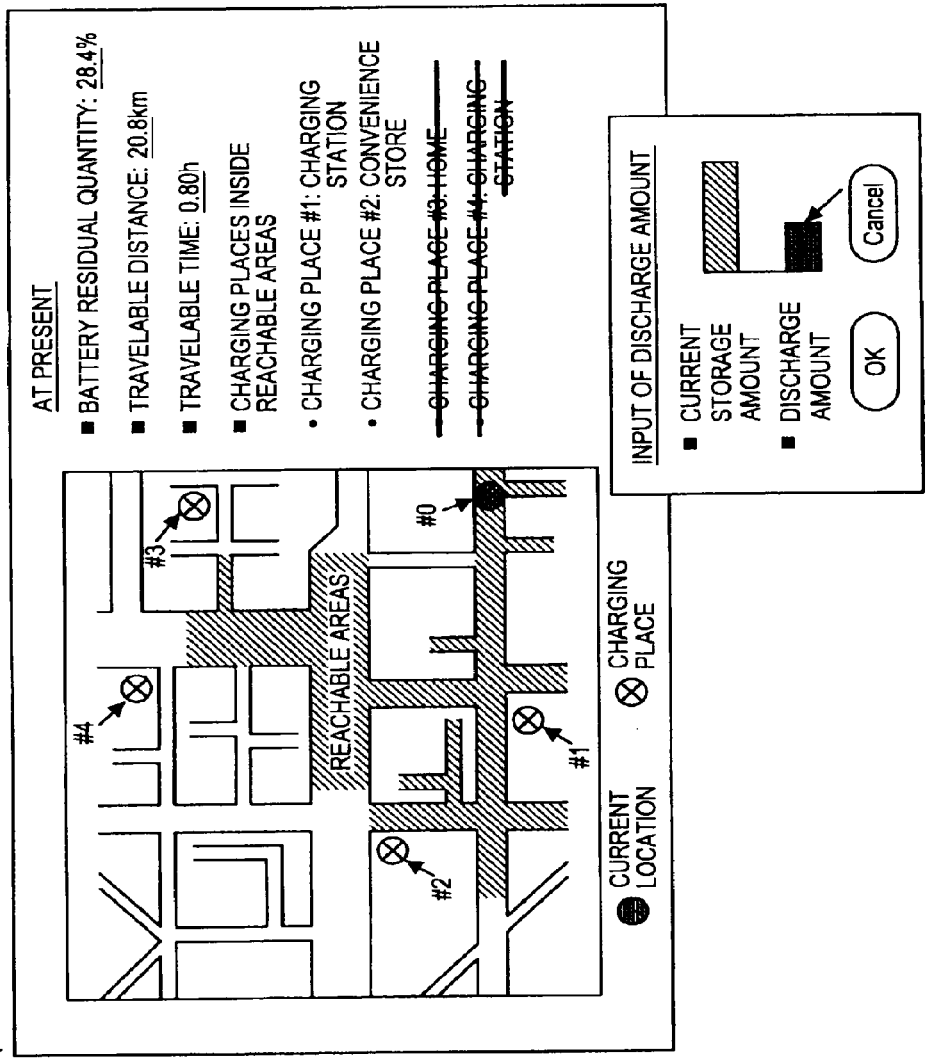
FIG. 10 is an explanatory view illustrating the configuration of a screen displayed in an operation flow (when discharging) of the information processing apparatus according to the embodiment.
Figure 11:
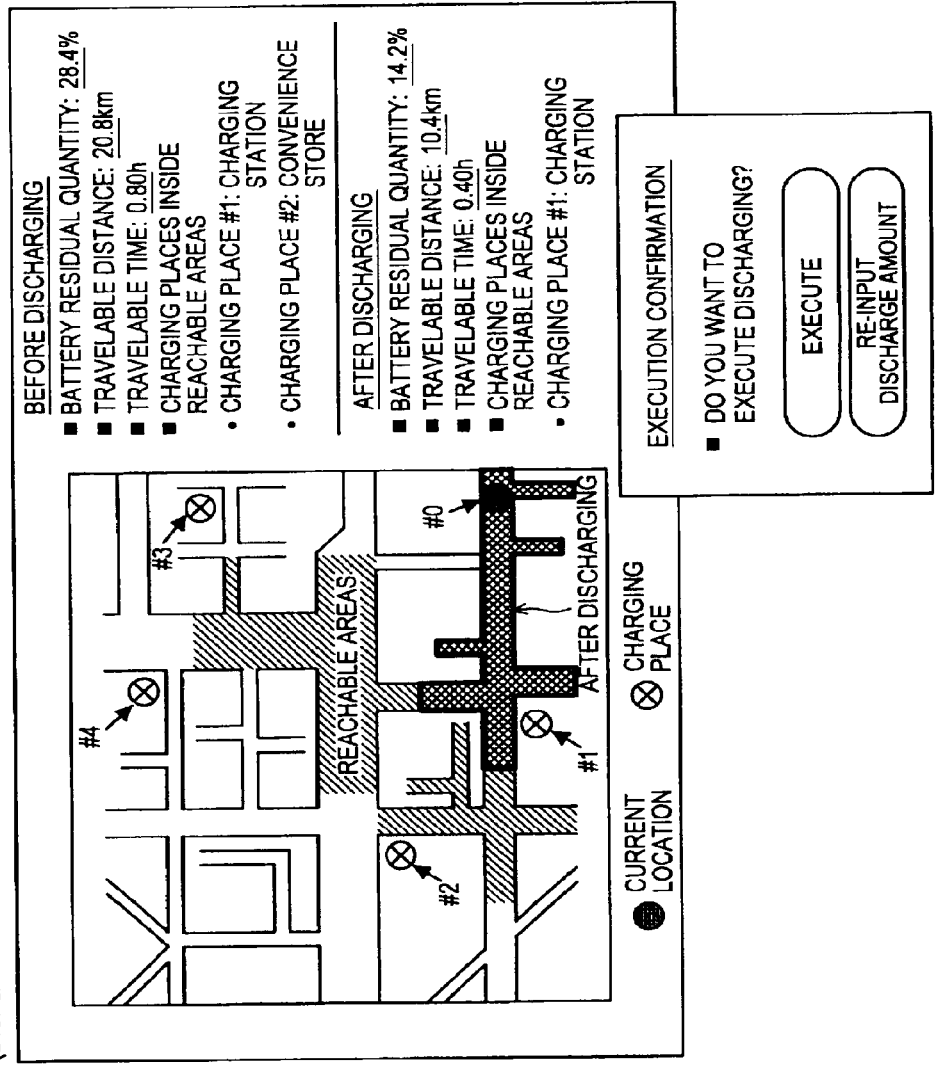
FIG. 11 is an explanatory view illustrating the configuration of a screen displayed in an operation flow (when discharging) of the information processing apparatus according to the embodiment.

Next, the operation flow of the information processing apparatus 16 at the time of discharging according to the present embodiment will be described with reference to FIGS. 4 and 5. Therein, concrete examples of the screen displayed in the operation flow of the information processing apparatus 16 at the time of discharging will be described with reference to FIGS. 6 to 11. FIGS. 4 and 5 are explanatory views illustrating the operation flow of the information processing apparatus 16 at the time of discharging according to the present embodiment. FIGS. 6 and 11 are explanatory views illustrating concrete examples of the screen displayed in the operation flow of the information processing apparatus 16 at the time of discharging.

As shown in FIG. 4, when the power line 2 is first connected to the connection terminal 15 (S101) and the connection is detected by the charging/discharging control unit 14 (S102), the information processing apparatuses 16 and 36 perform mutual authentication (S103). The processing flow of the mutual authentication will be described later. If the mutual authentication is successful, the information processing apparatus 16 acquires the current battery residual quantity from the charging/discharging control unit 14 and calculates the current travelable distance (pre-discharge travelable distance) by using the function of the travelable distance calculation unit 163 (S104). At this point, the information processing apparatus 16 may calculate the travelable time from the pre-discharge travelable distance by using the function of the travelable distance calculation unit 163.

Next, the information processing apparatus 16 searches for current travelable areas (pre-discharge reachable areas) from the calculated pre-discharge travelable distance by using the function of the area search unit 164 (S105). At this point, the information processing apparatus 16 searches for pre-discharge reachable areas by using information of a map prerecorded in the storage unit 166 or information sources such as a map server or a search server in the wide area network 6 via the communication unit 161.

The information processing apparatus 16 that has detected pre-discharge reachable areas searches for charging places present in the detected pre-discharge reachable areas by using the function of the charging place search unit 165 (S106). At this point, the information processing apparatus 16 searches for charging places present in the pre-discharge reachable areas by using information of a map prerecorded in the storage unit 166 or information sources such as a map server or a search server in the wide area network 6 via the communication unit 161.

The information processing apparatus 16 that has detected charging places present in the pre-discharge reachable areas displays a map using the current location as a reference point, current location, pre-discharge travelable distance (travelable time), pre-discharge battery residual quantity, pre-discharge reachable areas, and charging places present in the pre-discharge reachable areas in the display unit 167 (S107). At this point, in the screen configuration exemplified in FIG. 6, the map, current location, pre-discharge travelable distance, pre-discharge battery residual quantity, pre-discharge reachable areas, and charging places are displayed in the display unit 167. The screen configuration exemplified in FIG. 6 will briefly be described. FIG. 6 is an explanatory view showing an example of display content displayed in the display unit 167.

As shown in FIG. 6, the information processing apparatus 16 displays a map containing the current location in the display unit 167. The range of the map to be displayed may be decided by setting the current location in the center or in such a way that the current location and the nearest charging place are contained in the range. The information processing apparatus 16 displays the pre-discharge reachable areas in the display unit 167. In the example in FIG. 6, the hatched range is the pre-discharge reachable areas. It is actually desirable to use a display easier to understand for the user by using, instead of hatching, colors or a flashing display.

In the example in FIG. 6, pre-discharge reachable areas in consideration of road attributes are displayed. That is, the information processing apparatus 16 displays the reachable range from the current location as a starting point as pre-discharge reachable areas when the motor-driven movable body 1 can travel only the pre-discharge travelable distance using roads on which the motor-driven movable body 1 can travel as a reference point. For example, roads that will be in the wrong direction due to one-way traffic when the current location is set as the starting point are not contained in the pre-discharge reachable areas if not reachable by traveling in the correct direction of one-way roads. If a road that is closed depending on time zones such as a school-commuting road or a bus lane is present, the information processing apparatus 16 displays pre-discharge reachable areas by excluding such a road in time zones when the road is closed for traffic.

In the example in FIG. 6, the pre-discharge battery residual quantity is displayed in a percentage in which 100% is set when fully charged. However, the display method of the pre-discharge battery residual quantity is not limited to this. For example, the pre-discharge battery residual quantity may be expressed in units such as watts (W), watt-hours (Wh), Joule (J), and calorie (cal). Instead of expressing the pre-discharge battery residual quantity as a numerical value, the pre-discharge battery residual quantity may be expressed by using a bar display in which the level of residual quantity is expressed by the length of a bar, a pie chart in which the level of residual quantity is expressed by the area occupied in a pie chart, or an indicator display in which the level of residual quantity is expressed by the position of an indicator. The pre-discharge battery residual quantity displayed here may not indicate an exact residual quantity. For example, the pre-discharge battery residual quantity may be expressed by two levels of "sufficient" and "insufficient" or level displays of three to 10 levels.

In the example in FIG. 6, the pre-discharge travelable distance is displayed in the display unit 167. Further in the example in FIG. 6, the travelable time corresponding to the pre-discharge travelable distance is displayed. The pre-discharge travelable distance and the travelable time corresponding thereto displayed here are numerical values obtained when, for example, the motor-driven movable body 1 travels according to a predetermined traveling pattern (for example, a traveling pattern to be criteria for calculating 10·15 mode fuel consumption or JC08 mode fuel consumption). The calculation method of the pre-discharge travelable distance and the travelable time corresponding thereto displayed here may be made freely settable by the user. In such a case, the user can make settings so that the pre-discharge travelable distance and the travelable time corresponding thereto when the traveling pattern is traveling on a flatland at a constant speed and the constant speed is set to 30 km are displayed.

In the example in FIG. 6, information about charging places (#1 to #4) on the map is displayed as text information. In the text information, information about charging places outside the pre-discharge reachable areas is crossed out so that the user can distinguish charging places inside the pre-discharge reachable areas. Text information about charging places inside the pre-discharge reachable areas and text information about charging places outside the pre-discharge reachable areas may be represented in different colors. Further, text information about charging places outside the pre-discharge reachable areas may be represented in different colors in accordance with the distance from the current location. Text information about charging places outside the pre-discharge reachable areas may not be represented.

In the example in FIG. 6, objects indicating the charging places (#1 to #4) are displayed on the map. While all objects have the same shape in this example, for example, objects of charging places inside the pre-discharge reachable areas and objects of charging places outside the pre-discharge reachable areas may be represented in different colors or different shapes. Further, objects of charging places inside the pre-discharge reachable areas may be caused to flash or objects of charging places outside the pre-discharge reachable areas may be made to display translucently. By using such representations, the user can easily recognize charging places inside the pre-discharge reachable areas.

In the foregoing, the display method in step S107 has been described concretely. While text information indicating the pre-discharge battery residual quantity, pre-discharge travelable distance, travelable time, and charging places inside reachable areas is displayed in the example in FIG. 6, the display of such text information may partially or wholly be omitted when appropriate. On the other hand, it is desirable to constantly display the current location, pre-discharge reachable areas, and objects of charging places displayed on the map.

FIG. 4 is referred to again. The information processing apparatus 16 that has proceeded to step S108 after completing the display processing in step S107 performs an identity verification of the user by using the function of the identity verification unit 169 (step S108). At this point, as shown in FIG. 6, the information processing apparatus 16 prompts the user to input the password or to allow a biometric authentication sensor to read a body site. The information processing apparatus 16 into which the password or biological information has been input makes sure that the user who has input the password or biological information is the correct user (hereinafter, referred to as a registered user) by checking the input password or biological information against a password or biological information registered in advance.

If identity of the registered user is verified by the identity verification in step S108, the information processing apparatus 16 proceeds to step S111 (FIG. 5) (S109). On the other hand, if identity of the registered user is not verified by the identity verification in step S108, the information processing apparatus 16 proceeds to step S110 (S109). The information processing apparatus 16 that has proceeded to step S110 displays an error (or a warning) indicating that the identity verification failed in the display unit 167 (S110) before terminating a series of operations related to processing for discharging.

Figure 7:
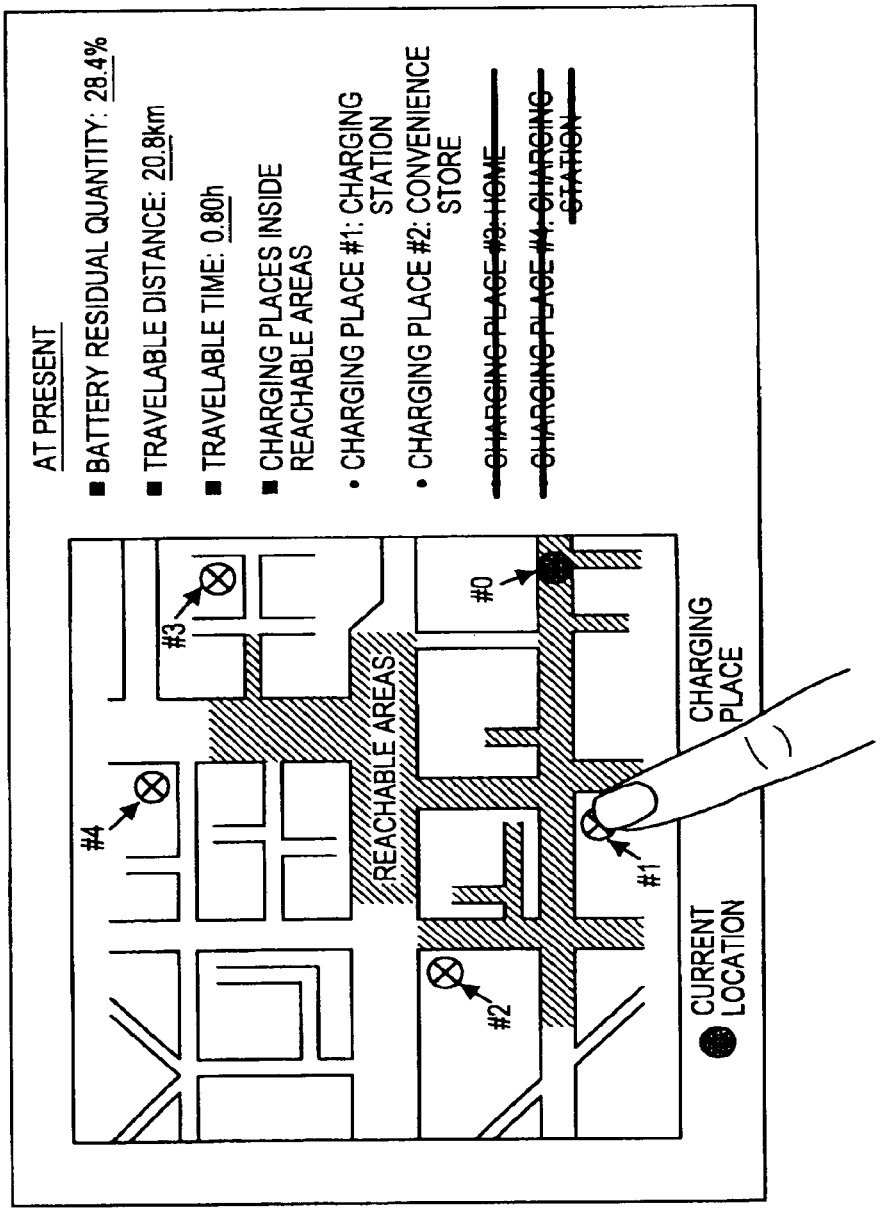
FIG. 7 is an explanatory view illustrating the configuration of a screen displayed in an operation flow (when discharging) of the information processing apparatus according to the embodiment.
Figure 8:
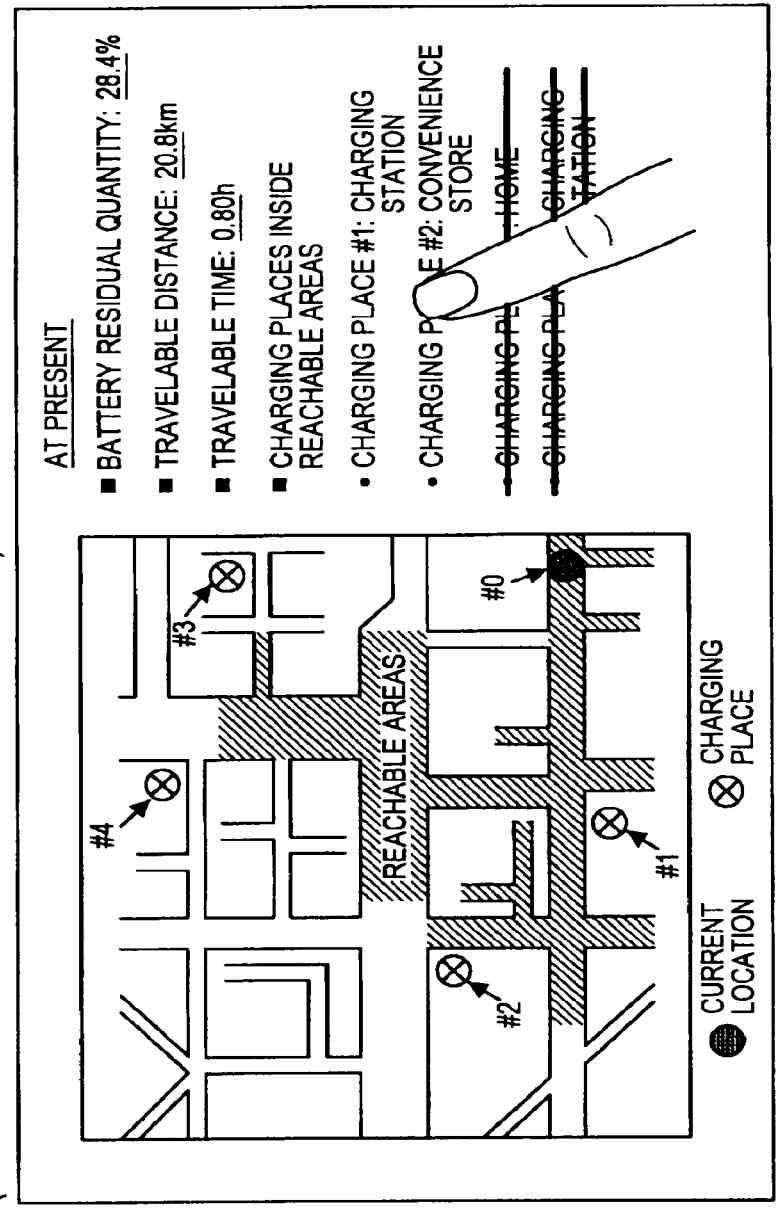
FIG. 8 is an explanatory view illustrating the configuration of a screen displayed in an operation flow (when discharging) of the information processing apparatus according to the embodiment.

The information processing apparatus 16 that has proceeded to step S111 (see FIG. 5), on the other hand, prompts the user to input information about the discharge amount (S111). The user inputs the desired discharge amount. However, input of the discharge amount is not necessarily numerical input (see FIG. 9). For example, as shown in FIGS. 7 and 8, the information processing apparatus 16 may be configured so that the discharge amount is input by specifying a charging place that can at least be reached by the motor-driven movable body 1 after the discharge. In the examples in FIGS. 7 and 8, the user input unit 168 is assumed to be a touch panel. Needless to say, the charging place may be made specifiable by using an input device other than the touch panel.

The input method of the discharge amount specifying a charging place (hereinafter, referred to as a charging place specifying input) will be described with reference to FIGS. 7 and 8. As described above, it is difficult for the user to input an appropriate discharge amount. The information processing apparatus 16 according to the present embodiment displays various kinds of pre-discharge information in step S107 and the user can decide an appropriate discharge amount with reference to such information. However, it is necessary for the user to consider how far the motor-driven movable body 1 can travel with the battery residual quantity after the desired discharge amount is subtracted or which area the motor-driven movable body 1 can reach with the battery residual quantity. Thus, more realistically, a method of deciding an appropriate discharge amount more intuitively is desired. The method devised here is the charging place specifying input.

For the charging place specifying input, the user only needs to specify a charging place the motor-driven movable body 1 should be able to reach after the discharge. In the example in FIG. 7, the input operation of the user is completed only by touching the object of a charging place displayed on the map. However, the motor-driven movable body 1 is the discharging side and thus, the user needs to touch the object of a charging place inside pre-discharge reachable areas. Thus, if the object of a charging place outside pre-discharge reachable areas should be touched, the information processing apparatus 16 prevents the charging place from being specified. In the example in FIG. 8, the input operation of the user is completed only by touching text information of a charging place.

After the charging place is specified by the user, the information processing apparatus 16 calculates electric energy necessary for the motor-driven movable body 1 to reach the specified charging place by using the function of the battery residual quantity calculation unit 162. Next, the information processing apparatus 16 calculates the maximum discharge amount by subtracting the calculated electric energy from the pre-discharge battery residual quantity. The information processing apparatus 16 that has calculated the maximum discharge amount calculates the discharge amount by subtracting predetermined electric energy (hereinafter, referred to as an electric energy margin) from the maximum discharge amount.

The reason for subtracting the electric energy margin is to avoid a situation in which the motor-driven movable body 1 is unable to reach the charging place after the discharge because the condition of road or traveling pattern from the current location to the specified charging place is different from the assumed condition of road or traveling pattern. The electric energy margin may be made freely settable by the user or may be automatically set by the information processing apparatus 16 in consideration of the average traveling pattern of the user or the condition of road acquired from map information.

Figure 9:
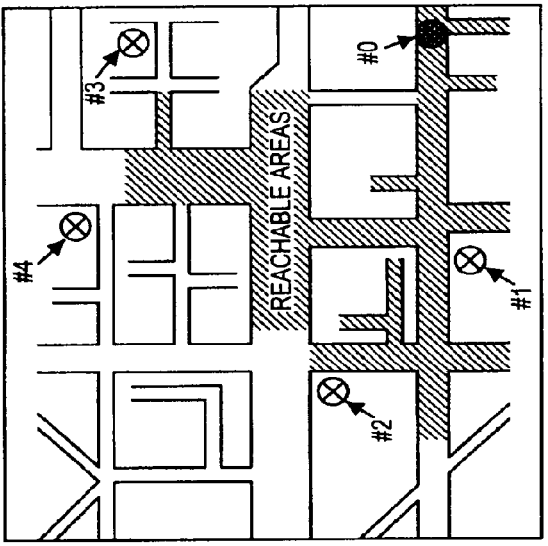
FIG. 9 is an explanatory view illustrating the configuration of a screen displayed in an operation flow (when discharging) of the information processing apparatus according to the embodiment.

In the foregoing, the input method of information about the discharge amount in step S111 has been described. However, the input method of information about the discharge amount is not limited to this. For example, the input method of information about the discharge amount may be, as shown in FIG. 9, a method by which the user directly inputs a numerical value or, as shown in FIG. 10, a method by which the discharge amount is specified by a bar display. For the bar display exemplified in FIG. 10, the discharge amount can be specified by expanding or contracting the length of the bar by placing the cursor on the bar of the discharge amount. If the touch panel can be used, the discharge amount can of course be specified by expanding or contracting the bar of the discharge amount using a finger or the like.

FIG. 5 is referred to again. The information processing apparatus 16 into which information about the discharge amount has been input by the user in step S111 to have the discharge amount specified calculates the battery residual quantity after the discharge (post-discharge battery residual quantity) by using the function of the battery residual quantity calculation unit 162 (step S112). The post-discharge battery residual quantity is obtained by subtracting the discharge amount from the pre-discharge battery residual quantity. The information processing apparatus 16 that has calculated the post-discharge battery residual quantity calculates the distance that the motor-driven movable body 1 can travel after the discharge (post-discharge travelable distance) by using the function of the travelable distance calculation unit 163 (S113). The information processing apparatus 16 may also calculate the travelable time corresponding to the post-discharge travelable distance.

The information processing apparatus 16 that has calculated the post-discharge travelable distance searches for areas that can be reached by the motor-driven movable body 1 after the discharge (post-discharge reachable areas) by using the function of the area search unit 164 (S114). The information processing apparatus 16 that has detected post-discharge reachable areas searches for charging places present in the post-discharge reachable areas by using the function of the charging place search unit 165 (S115). The calculation method of the post-discharge travelable distance and the search method of post-discharge reachable areas and charging places inside the post-discharge reachable areas are the same as the calculation method of the pre-discharge travelable distance and the search method of pre-discharge reachable areas and charging places inside the pre-discharge reachable areas, respectively.

The information processing apparatus 16 that has detected charging places present inside the post-discharge reachable areas displays a map using the current location as a reference point, current location, post-discharge travelable distance (travelable time), post-discharge battery residual quantity, post-discharge reachable areas, and charging places present in the post-discharge reachable areas in the display unit 167 (S116). At this point, in the screen configuration exemplified in FIG. 11, the map, current location, post-discharge travelable distance, post-discharge battery residual quantity, post-discharge reachable areas, and charging places are displayed in the display unit 167. In the display unit 167, the pre-discharge travelable distance, pre-discharge battery residual quantity, pre-discharge reachable areas are also displayed. Thus, with pre-discharge information and post-discharge information is displayed together, the condition of the motor-driven movable body 1 before and after the discharge can easily be grasped.

The display configuration exemplified in FIG. 11 will briefly be described. FIG. 11 is an explanatory view showing an example of display content displayed in the display unit 167. The display configuration exemplified in FIG. 11 is obtained by adding post-discharge information to the display configuration of pre-discharge information shown in FIG. 6. Thus, a detailed description of overlapped components with FIG. 6 is omitted.

As shown in FIG. 11, the information processing apparatus 16 displays pre-discharge information and post-discharge information together as text information. The pre-discharge information is the same as the pre-discharge information exemplified in FIG. 6. The post-discharge information, on the other hand, is information about the post-discharge battery residual quantity, post-discharge travelable distance, travelable time corresponding to the post-discharge travelable distance, and charging places present inside post-discharge reachable areas obtained in steps S112 to S115 described above. On the map, on the other hand, in addition to pre-discharge information shown in FIG. 6, post-discharge reachable areas are displayed with dense hatching. Actually, it is desirable to make a display that is easily understood by the user by using colors, instead of hatching, or a flashing display. Particularly, a display that allows the user to easily distinguish pre-discharge reachable areas and post-discharge reachable areas is desired.

In the example in FIG. 11, objects in the same shape indicating the charging places (#1 to #4) are displayed on the map. While all objects have the same shape in this example, for example, objects of charging places inside the pre-discharge reachable areas and objects of charging places inside the post-discharge reachable areas may be represented in different colors or different shapes. Further, objects of charging places inside the post-discharge reachable areas may be caused to flash or objects of charging places outside the pre-discharge reachable areas or outside the post-discharge reachable areas may be made to display translucently. By using such representations, the user will be able to easily recognize differences between the pre-discharge reachable areas and post-discharge reachable areas and which charging places the motor-driven movable body 1 can reach after the discharge.

In the foregoing, the display method in step S116 has been described concretely. In the example in FIG. 11, while text information showing the pre-discharge battery residual quantity, pre-discharge travelable distance, travelable time, charging places inside pre-discharge reachable areas, post-discharge battery residual quantity, post-discharge travelable distance, travelable time, and charging places inside post-discharge reachable areas is displayed, the display of such text information may partially or wholly be omitted when appropriate. On the other hand, it is desirable to constantly display the current location, pre-discharge reachable areas, post-discharge reachable areas, and objects of charging places displayed on the map.

FIG. 5 is referred to again. As shown in FIG. 11, the information processing apparatus 16 that has proceeded to step S117 after completing the display processing in step S116 prompts the user to execute discharging (S117). If the user performs an execution operation of discharging, the information processing apparatus 16 proceeds to step S118. On the other hand, if the user does not perform an execution operation of discharging, the information processing apparatus 16 returns to step S111 to perform processing in step S111 and thereafter again. The information processing apparatus 16 that has proceeded to step S118 controls the charging/discharging control unit 14 to discharge electric power of the discharge amount specified in step S111 from the battery 11 (S118).

Electric power discharged in this manner is supplied to the motor-driven movable body 3 through the power line 2 to charge the battery 31 of the motor-driven movable body 3.

The operation flow of the information processing apparatus 16 at the time of discharging has been described in detail. In the above description, the configuration in which the information processing apparatus 16 on the discharging side specifies the discharge amount and performs an execution operation of discharging by assuming that the motor-driven movable body 1 is on the discharging side and the motor-driven movable body 3 on the charging side. However, modifications may be made such as displaying display content displayed in the display unit 167 on the charging side or specifying the discharge amount and performing an execution operation of discharging on the charging side. Moreover, modifications may be made so that operation processing and communication processing performed by the information processing apparatus 16 are performed by the information processing apparatus 36. Further, the flow from identity verification processing in step S108 to the end of operation at the time of discharging may be moved to after step S117 so that discharging processing in step S118 is actually performed only if identity verification processing in step S109 is successful. Also, modifications may be made so that an external server connected to the wide area network 6 is caused to perform such operation processing and communication processing. Naturally, such modifications are included in the technical scope of the present embodiment.

[2-4: Modification 1 (Bilateral Information Display)]

As one of such modifications, a configuration in which information about both the discharging side and charging side is displayed will be described. That is, the modification described here (Modification 1) concerns the configuration in which pre-discharge information and post-discharge information of the motor-driven movable body 1 and pre-discharge information and post-discharge information of the motor-driven movable body 3 are presented to the user before the motor-driven movable body 1 discharges. In the description below, various pieces of information about the motor-driven movable body 3, which is on the charging side, will also be expressed while classified into pre-discharge information and post-discharge information. Expressions "pre-discharge" and "post-discharge" used in the description that follows mean temporal timing of before and after the motor-driven movable body 1 discharges, respectively.

(2-4-1: Operation Flow at the Time of Discharging)

The operation flow of the information processing apparatus 16 at the time of discharging according to Modification 1 will be described with reference to FIGS. 12 to 15. Therein, concrete examples of the screen displayed in the operation flow of the information processing apparatus 16 at the time of discharging will be described with reference to FIGS. 16 to 21. FIGS. 12 to 15 are explanatory views illustrating the operation flow of the information processing apparatus 16 at the time of discharging according to Modification 1. FIGS. 16 to 21 are explanatory views illustrating concrete examples of the screen displayed in the operation flow of the information processing apparatus 16 at the time of discharging.

Figure 12:
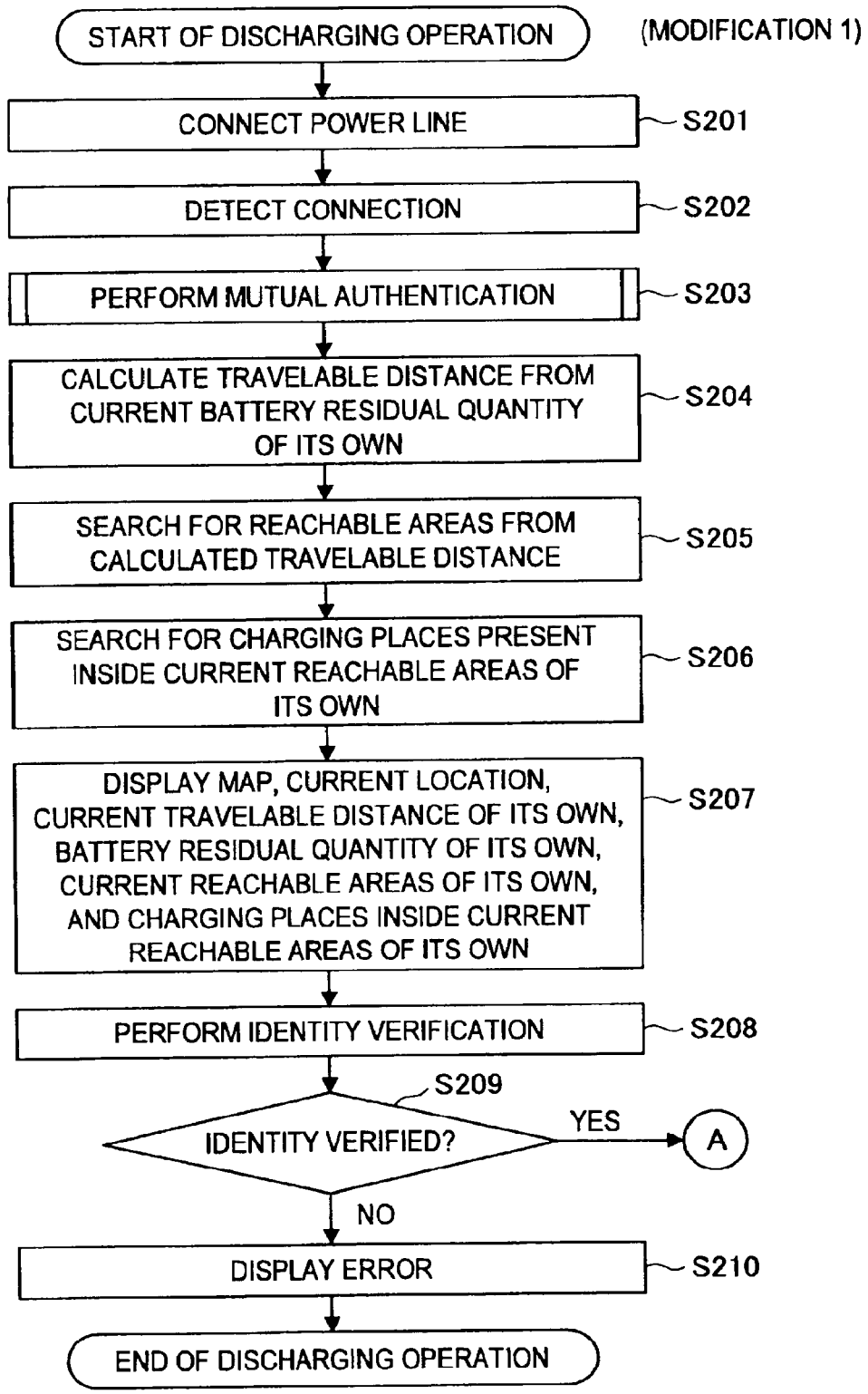
FIG. 12 is an explanatory view illustrating the operation flow (when discharging) of the information processing apparatus according to a modification (Modification 1) of the embodiment.
Figure 13:
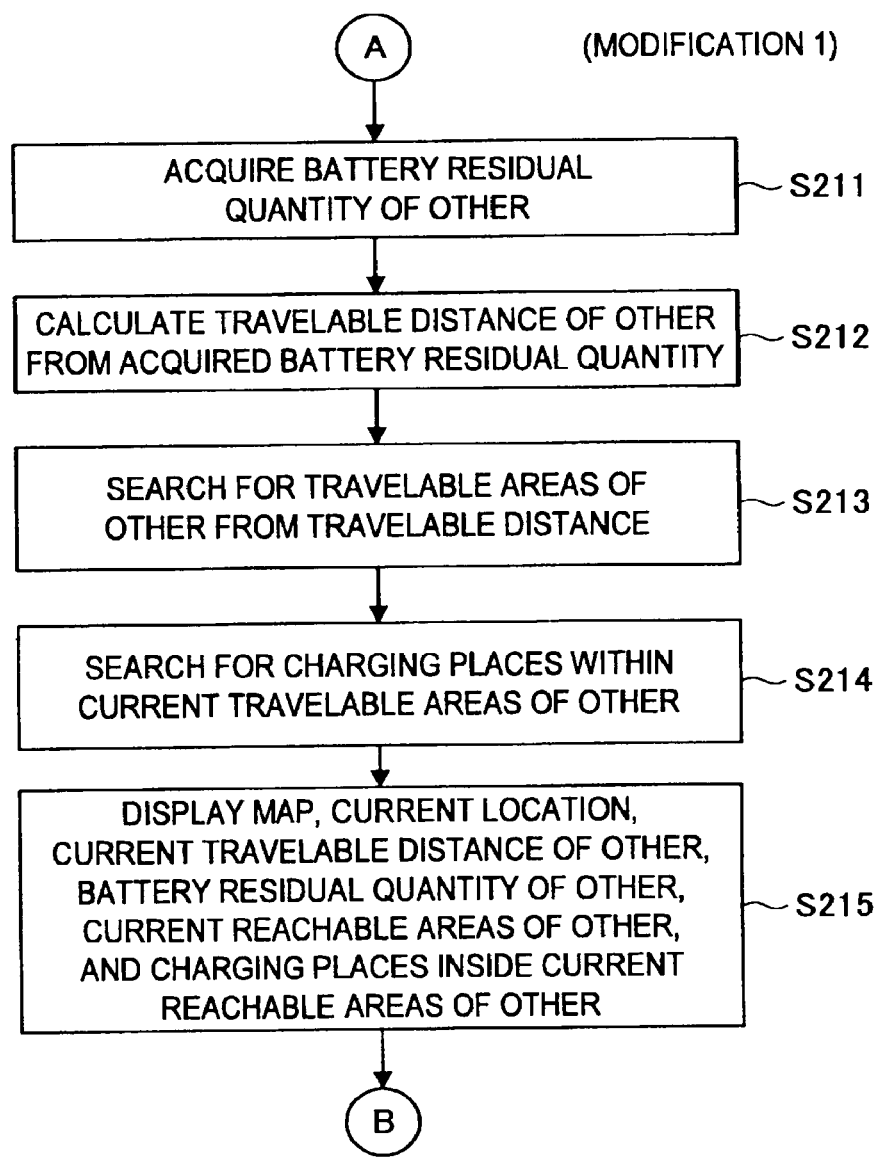
FIG. 13 is an explanatory view illustrating the operation flow (when discharging) of the information processing apparatus according to the modification (Modification 1) of the embodiment.

As shown in FIG. 12, when the power line 2 is first connected to the connection terminal 15 (S201) and the connection is detected by the charging/discharging control unit 14 (S202), the information processing apparatuses 16 and 36 perform mutual authentication (S203). The processing flow of the mutual authentication will be described later. If the mutual authentication is successful, the information processing apparatus 16 acquires the current battery residual quantity from the charging/discharging control unit 14 and calculates the current travelable distance (pre-discharge travelable distance) by using the function of the travelable distance calculation unit 163 (S204). At this point, the information processing apparatus 16 may also calculate the travelable time from the pre-discharge travelable distance by using the function of the travelable distance calculation unit 163.

Next, the information processing apparatus 16 searches for current travelable areas (pre-discharge reachable areas) from the calculated pre-discharge travelable distance by using the function of the area search unit 164 (S205). At this point, the information processing apparatus 16 searches for pre-discharge reachable areas by using information of a map prerecorded in the storage unit 166 or information sources such as a map server or a search server in the wide area network 6 via the communication unit 161.

The information processing apparatus 16 that has detected pre-discharge reachable areas searches for charging places present in the detected pre-discharge reachable areas by using the function of the charging place search unit 165 (S206). At this point, the information processing apparatus 16 searches for charging places present in the pre-discharge reachable areas by using information of a map prerecorded in the storage unit 166 or information sources such as a map server or a search server in the wide area network 6 via the communication unit 161.

Figure 16:
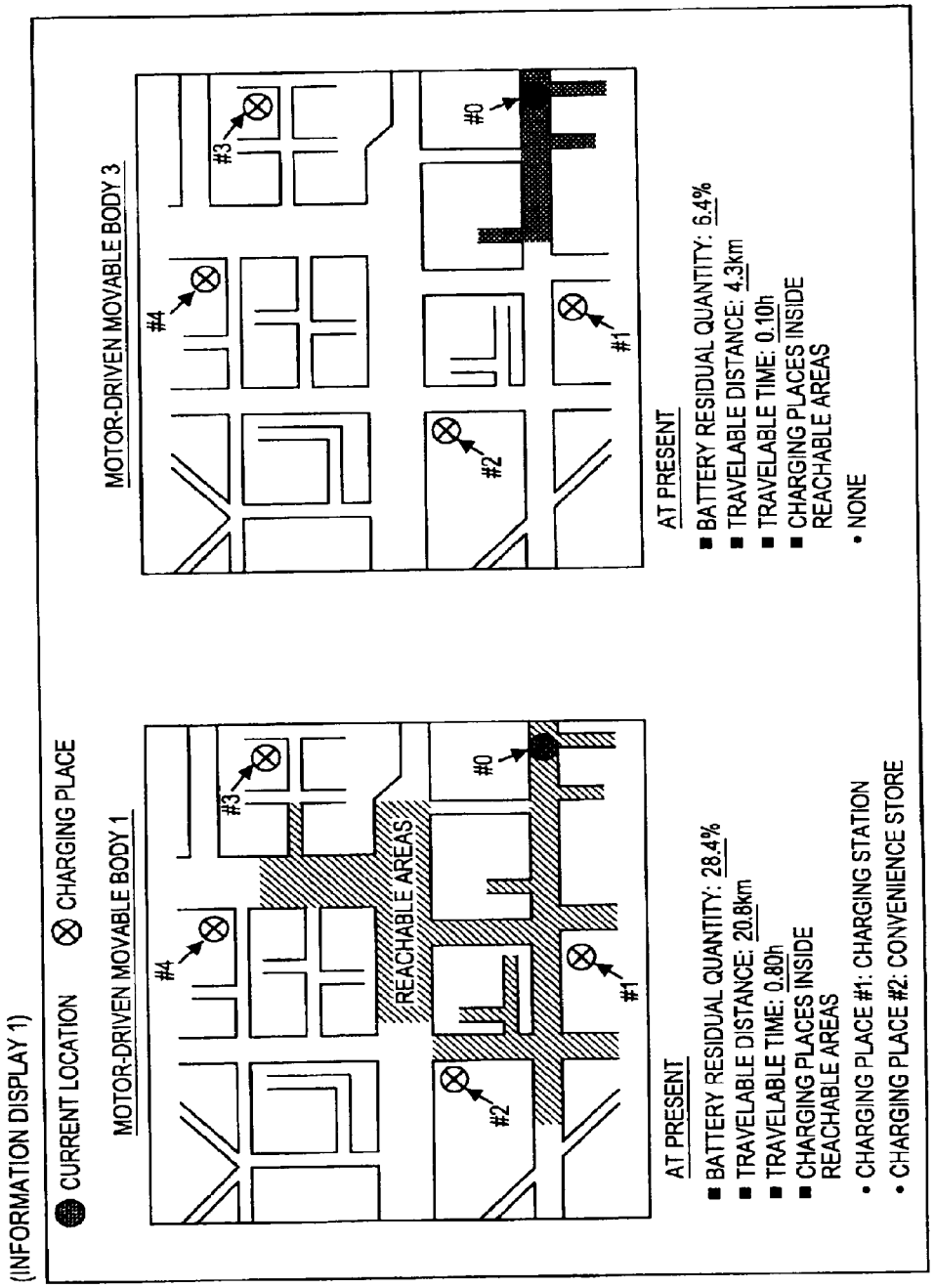
FIG. 16 is an explanatory view illustrating a configuration of a screen displayed in the operation flow (when discharging) of the information processing apparatus according to the modification (Modification 1) of the embodiment.

The information processing apparatus 16 that has detected charging places present in the pre-discharge reachable areas displays a map using the current location as a reference point, current location, pre-discharge travelable distance (travelable time), pre-discharge battery residual quantity, pre-discharge reachable areas, and charging places present in the pre-discharge reachable areas in the display unit 167 (S207). At this point, in the screen configuration exemplified on the left side in FIG. 16, the map, current location, pre-discharge travelable distance, pre-discharge battery residual quantity, pre-discharge reachable areas, and charging places are displayed in the display unit 167. The screen configuration exemplified on the left side in FIG. 16 is substantially the same as the screen configuration shown in FIG. 6.

The information processing apparatus 16 that has proceeded to step S208 after completing the display processing in step S207 performs an identity verification of the user by using the function of the identity verification unit 169 (step S208). At this point, the information processing apparatus 16 prompts the user to input the password or to allow a biometric authentication sensor to read a body site. The information processing apparatus 16 into which the password or biological information has been input makes sure that the user who has input the password or biological information is the correct user (registered user) by checking the input password or biological information against a password or biological information registered in advance.

If identity of the registered user is verified by the identity verification in step S208, the information processing apparatus 16 proceeds to step S211 (FIG. 15) (S209). On the other hand, if identity of the registered user is not verified by the identity verification in step S208, the information processing apparatus 16 proceeds to step S210 (S209). The information processing apparatus 16 that has proceeded to step S210 displays an error (or a warning) indicating that the identity verification failed in the display unit 167 (S210) before terminating a series of operations related to processing for discharging.

The information processing apparatus 16 that has proceeded to step S211 (see FIG. 15), on the other hand, acquires the pre-discharge battery residual quantity of the battery 31 from the charging/discharging control unit 34 or the information processing apparatus 36 of the motor-driven movable body 3 (S211). The information processing apparatus 16 that has acquired the pre-discharge battery residual quantity of the motor-driven movable body 3 calculates the pre-discharge travelable distance of the motor-driven movable body 3 by using the function of the travelable distance calculation unit 163 (S212). At this point, the information processing apparatus 16 may also calculate the travelable time from the pre-discharge travelable distance by using the function of the travelable distance calculation unit 163.

The pre-discharge travelable distance and the travelable time corresponding thereto displayed here are numerical values obtained when, for example, the motor-driven movable body 3 travels according to a predetermined traveling pattern (for example, a traveling pattern to be criteria for calculating 10·15 mode fuel consumption or JC08 mode fuel consumption). Thus, numerical values necessary for calculating the pre-discharge travelable distance and the travelable time corresponding thereto are to be received from the motor-driven movable body 3 in step S211. Instead of carrying out such a calculation by the information processing apparatus 16, a calculation result may be received in step S211 after causing the information processing apparatus 36 to carry out the calculation. The calculation method of the pre-discharge travelable distance and the travelable time corresponding thereto displayed here may be made freely settable by the user. In such a case, the user can make settings so that the pre-discharge travelable distance and the travelable time corresponding thereto when the traveling pattern is traveling on a flatland at a constant speed and the constant speed is set to 30 km are displayed.

Next, the information processing apparatus 16 searches for pre-discharge reachable areas of the motor-driven movable body 3 from the calculated pre-discharge travelable distance by using the function of the area search unit 164 (S213). At this point, the information processing apparatus 16 searches for pre-discharge reachable areas by using information of a map prerecorded in the storage unit 166 or information sources such as a map server or a search server in the wide area network 6 via the communication unit 161.

The information processing apparatus 16 that has detected pre-discharge reachable areas of the motor-driven movable body 3 searches for charging places present in the detected pre-discharge reachable areas by using the function of the charging place search unit 165 (S214). At this point, the information processing apparatus 16 searches for charging places present in the pre-discharge reachable areas of the motor-driven movable body 3 by using information of a map prerecorded in the storage unit 166 or information sources such as a map server or a search server in the wide area network 6 via the communication unit 161.

The information processing apparatus 16 that has detected charging places present in the pre-discharge reachable areas of the motor-driven movable body 3 displays a map using the current location as a reference point, current location, pre-discharge travelable distance (travelable time) of the motor-driven movable body 3, pre-discharge battery residual quantity, pre-discharge reachable areas, and charging places present in the pre-discharge reachable areas in the display unit 167 (S215). At this point, in the screen configuration exemplified on the right side in FIG. 16, the map, current location, pre-discharge travelable distance of the motor-driven movable body 3, pre-discharge battery residual quantity, pre-discharge reachable areas, and charging places are displayed in the display unit 167. The screen configuration exemplified on the right side in FIG. 16 is substantially the same as the screen configuration shown in FIG. 6.

Figure 17:
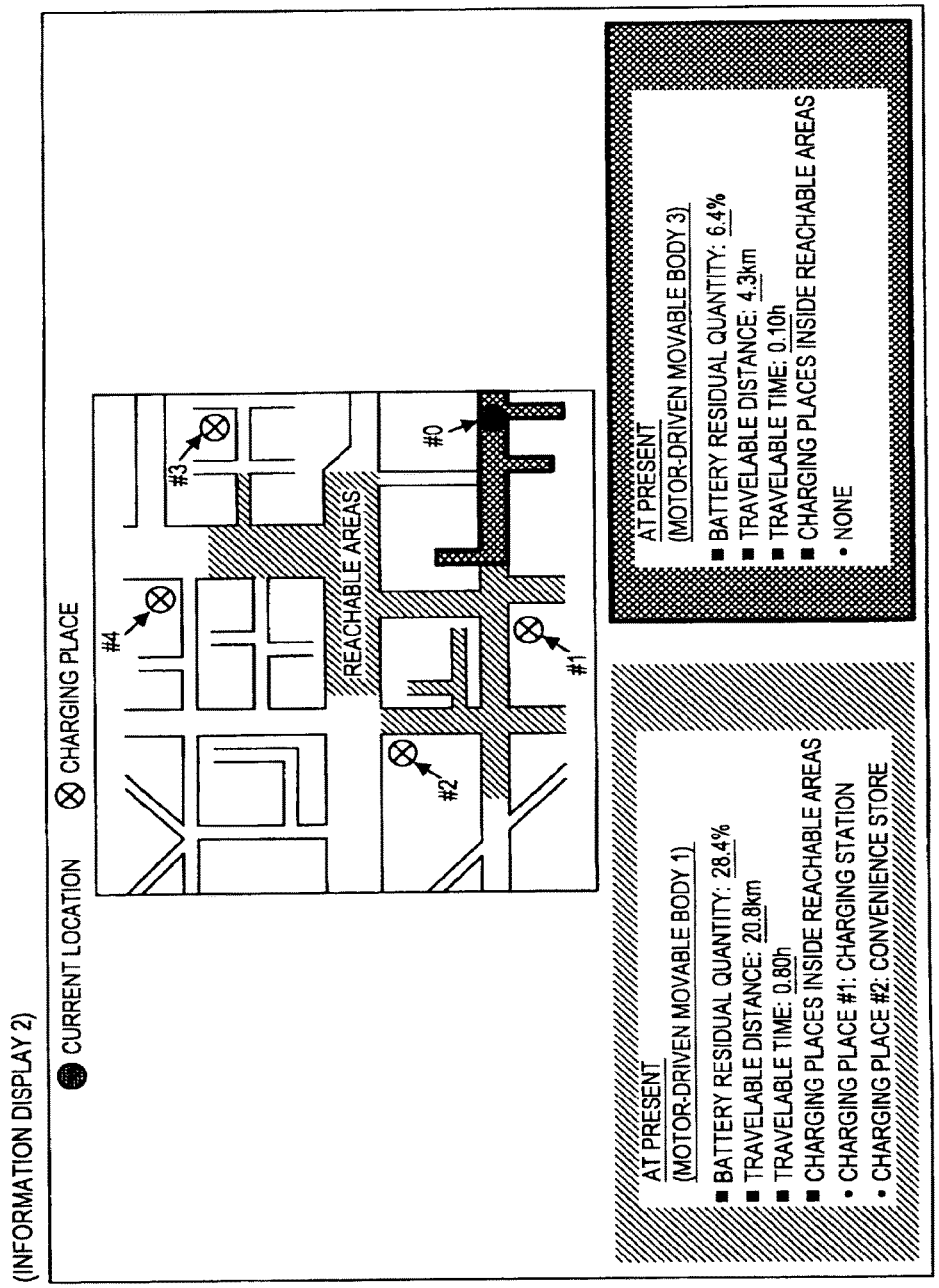
FIG. 17 is an explanatory view illustrating a configuration of a screen displayed in the operation flow (when discharging) of the information processing apparatus according to the modification (Modification 1) of the embodiment.

The display method in steps S207 and 215 will supplementarily be described with reference to FIGS. 16 and 17. As described above, pre-discharge information of the motor-driven movable body 1 and pre-discharge information of the motor-driven movable body 3 are displayed in the display unit 167 by the display processing in steps S207 and 215. In the above description, as shown in FIG. 16, the method of displaying pre-discharge information of the motor-driven movable body 1 and pre-discharge information of the motor-driven movable body 3 side by side is exemplified, but the display method of pre-discharge information according to Modification 1 is not limited to this. For example, as shown in FIG. 17, pre-discharge reachable areas of the motor-driven movable body 1 and pre-discharge reachable areas of the motor-driven movable body 3 may be displayed by being overlapped on a map.

In such a case, pre-discharge reachable areas of the motor-driven movable body 1 and pre-discharge reachable areas of the motor-driven movable body 3 are represented by using different colors or flashing so that the user can easily distinguish. It is also desirable to represent text information about pre-discharge information of the motor-driven movable body 1 and text information about pre-discharge information of the motor-driven movable body 3 by using different colors or flashing so that the user can easily distinguish. In such a case, text information itself may be displayed in different representations or, as shown in FIG. 17, the background of text information may be displayed in different representations. It is also desirable to represent objects of charging places displayed on the map in different representations so that charging places present in pre-discharge reachable areas of the motor-driven movable body 1 and charging places present in pre-discharge reachable areas of the motor-driven movable body 3 can easily be distinguished.

In the foregoing, the display method in steps S207 and 215 has supplementarily been described.

Figure 14:
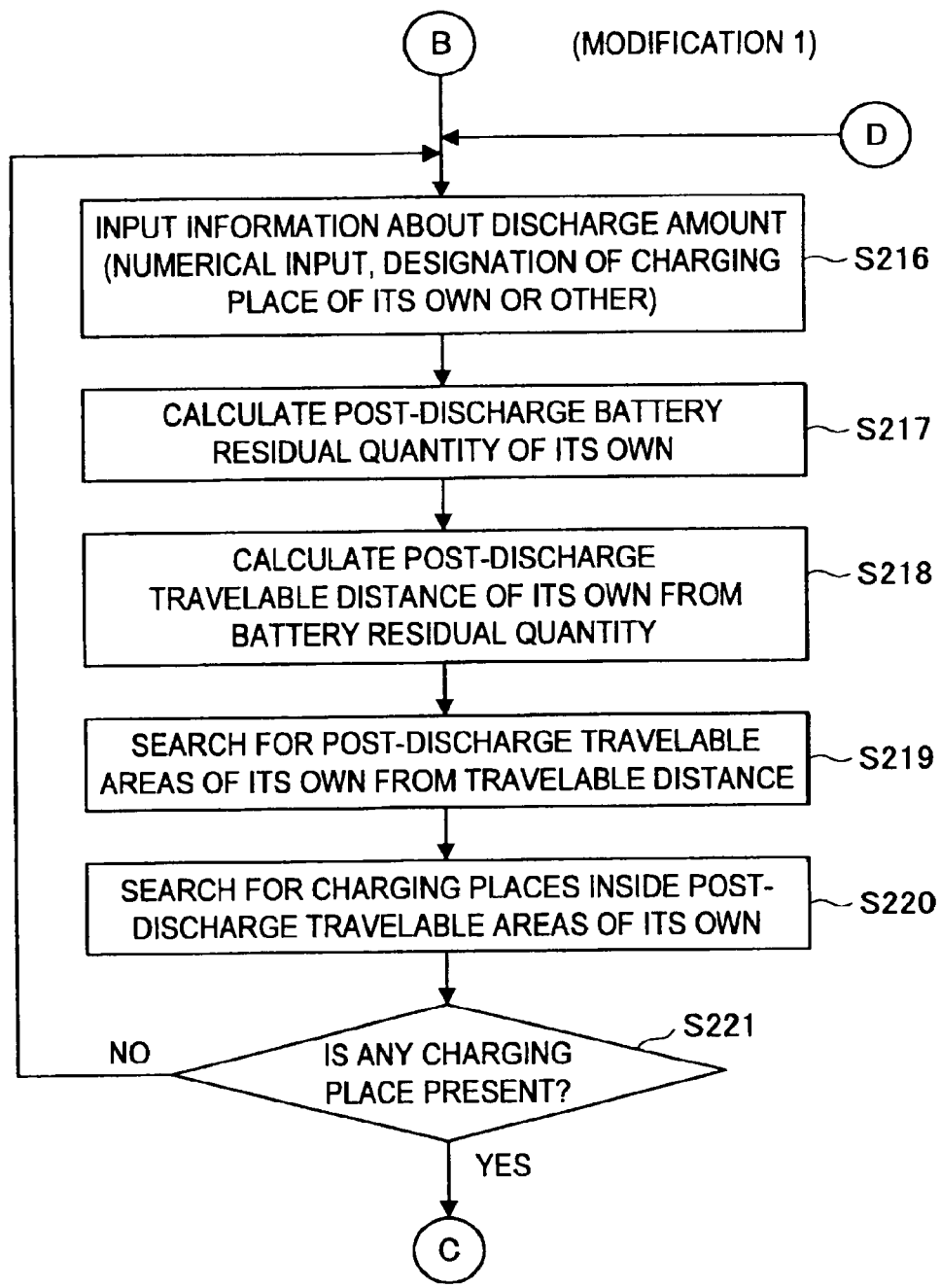
FIG. 14 is an explanatory view illustrating the operation flow (when discharging) of the information processing apparatus according to the modification (Modification 1) of the embodiment.
Figure 15:
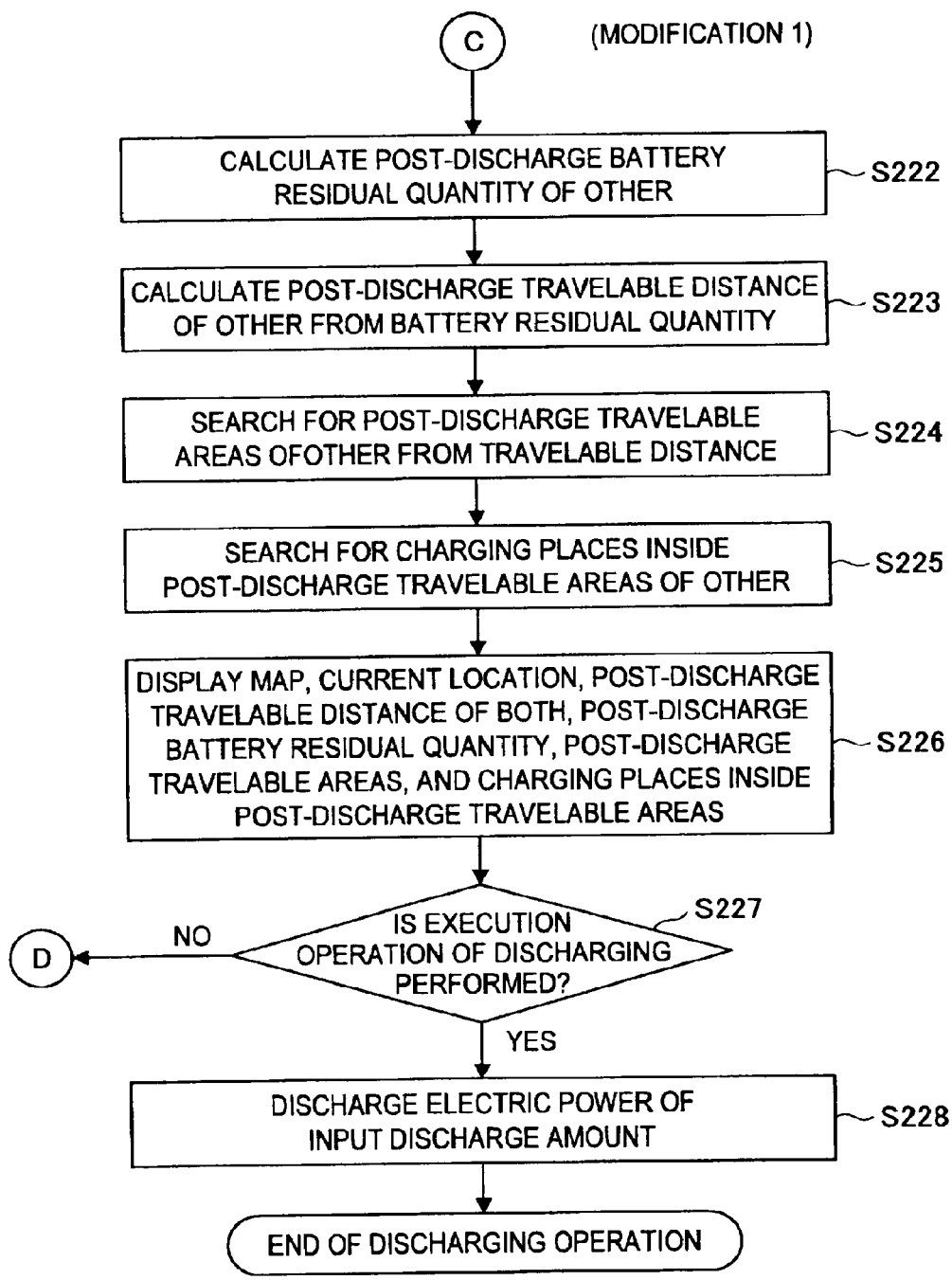
FIG. 15 is an explanatory view illustrating the operation flow (when discharging) of the information processing apparatus according to the modification (Modification 1) of the embodiment.
Figure 18:
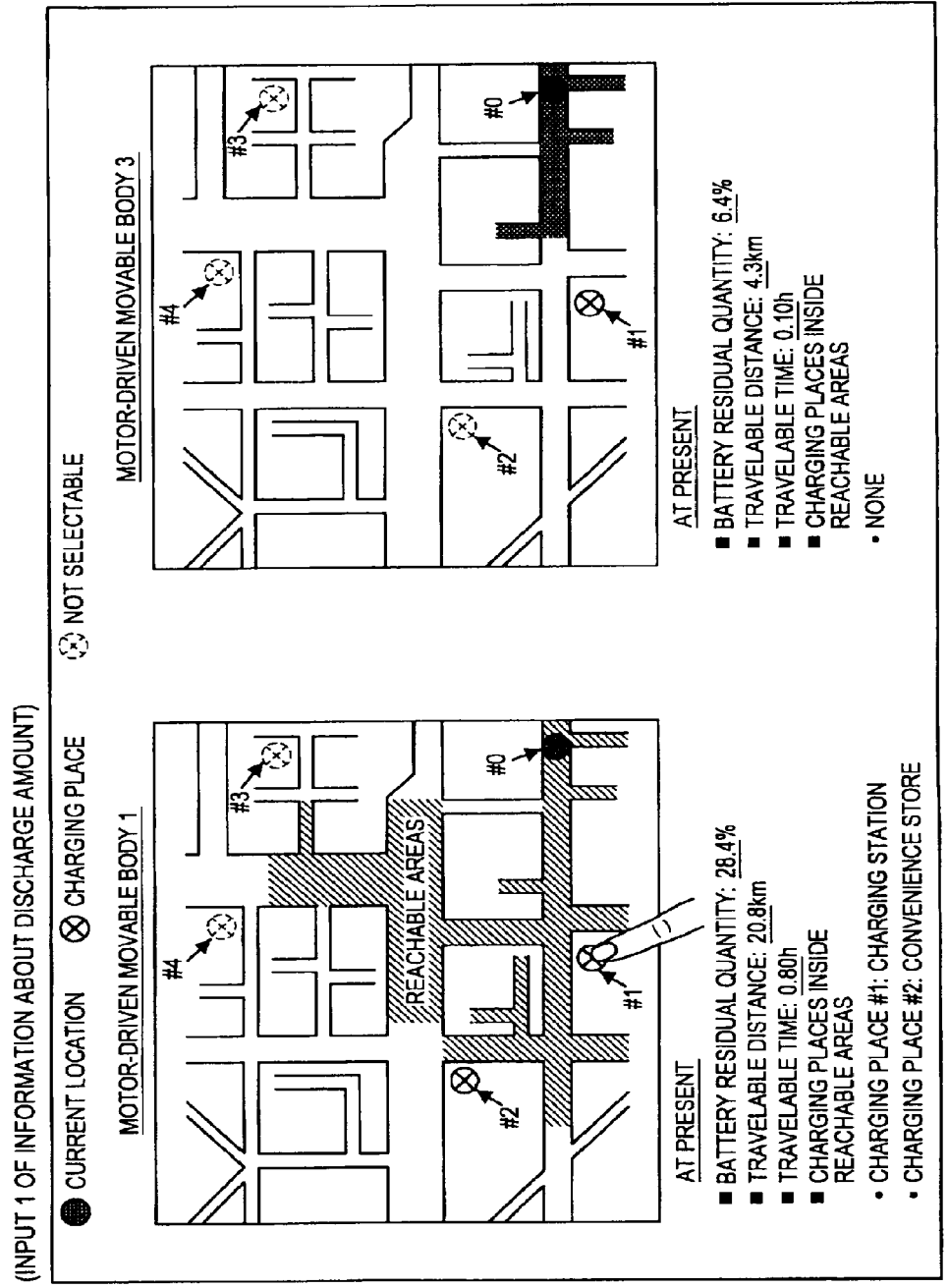
FIG. 18 is an explanatory view illustrating a configuration of a screen displayed in the operation flow (when discharging) of the information processing apparatus according to the modification (Modification 1) of the embodiment.
Figure 19:
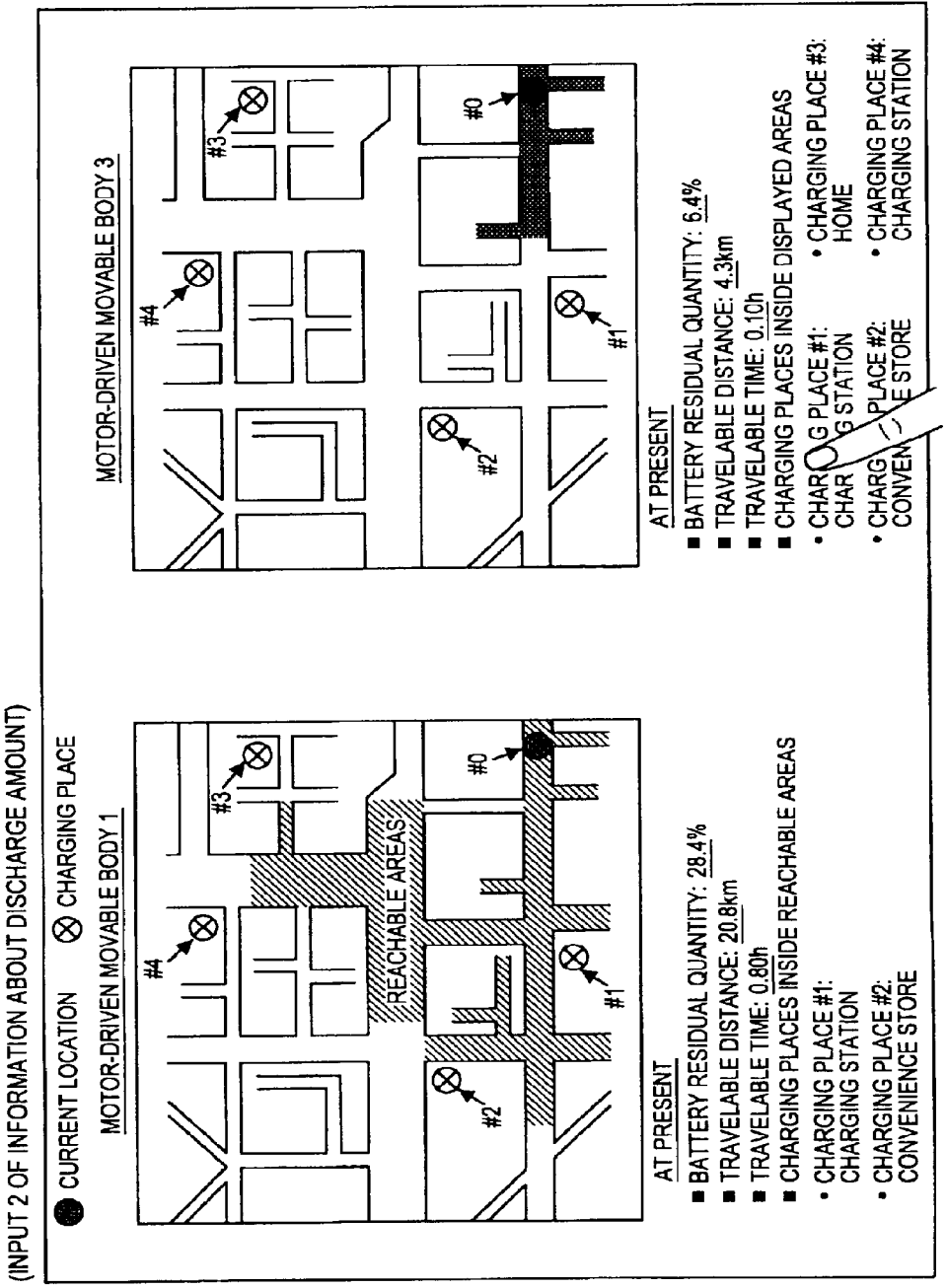
FIG. 19 is an explanatory view illustrating a configuration of a screen displayed in the operation flow (when discharging) of the information processing apparatus according to the modification (Modification 1) of the embodiment.
Figure 20:
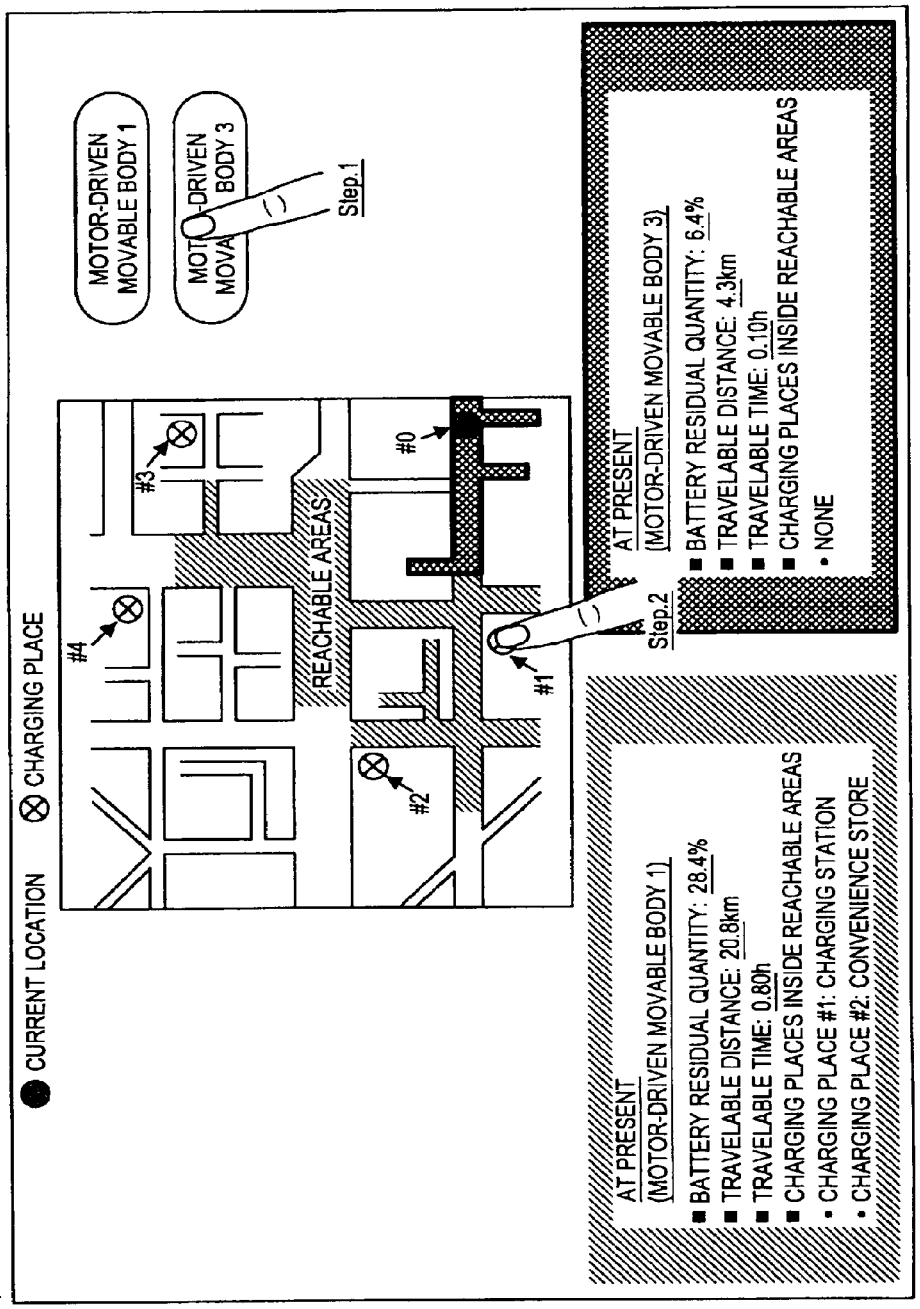
FIG. 20 is an explanatory view illustrating a configuration of a screen displayed in the operation flow (when discharging) of the information processing apparatus according to the modification (Modification 1) of the embodiment.

FIG. 14 is referred to. The information processing apparatus 16 that has completed the display processing in step S215 prompts the user to input information about the discharge amount (S216). The user inputs the desired discharge amount. However, input of the discharge amount is not necessarily numerical input. For example, as shown in FIGS. 18 to 20, the information processing apparatus 16 may be configured so that the discharge amount is input by specifying a charging place that can at least be reached by the motor-driven movable body 1 or a charging place that can at least be reached by the motor-driven movable body 3 after the discharge. In the examples in FIGS. 18 to 20, the user input unit 168 is assumed to be a touch panel. Needless to say, the charging place may be made specifiable by using an input device other than the touch panel.

The input method of the discharge amount specifying a charging place (charging place specifying input) will be described with reference to FIGS. 18 to 20. As described above, it is difficult for the user to input an appropriate discharge amount. The information processing apparatus 16 according to Modification 1 displays various kinds of pre-discharge information in steps S207 and S215 and thus the user can decide an appropriate discharge amount with reference to such information.

However, it is necessary for the user to consider how far the motor-driven movable body 1 can travel with the battery residual quantity after the desired discharge amount is subtracted or which area the motor-driven movable body 1 can reach with the battery residual quantity. At the same time, it is necessary for the user to consider how far the motor-driven movable body 3 can travel with the battery residual quantity after the desired discharge amount is added or which area the motor-driven movable body 3 can reach with the battery residual quantity. Thus, more realistically, a method of deciding an appropriate discharge amount more intuitively is desired. The method devised here is the charging place specifying input according to Modification 1.

For the charging place specifying input, the user only needs to specify a charging place the motor-driven movable body 1 or the motor-driven movable body 3 should be able to reach after the discharge. In the example in FIG. 18, the input operation of the user is completed only by touching the object of a charging place displayed on the map. However, the motor-driven movable body 1 is the discharging side and thus, when the user touches pre-discharge information regarding the motor-driven movable body 1, the user needs to touch the object of a charging place inside pre-discharge reachable areas. Thus, if the object of a charging place outside pre-discharge reachable areas should be touched as to pre-discharge information regarding the motor-driven movable body 1, the information processing apparatus 16 prevents the charging place from being specified.

On the other hand, the motor-driven movable body 3 is the charging side and thus, when pre-discharge information regarding the motor-driven movable body 3 is touched, the user needs to touch the object of a charging place outside pre-discharge reachable areas. Thus, if the object of a charging place inside pre-discharge reachable areas should be touched as to pre-discharge information regarding the motor-driven movable body 3, the information processing apparatus 16 prevents the charging place from being specified. In the example in FIG. 19, the input operation of the user is completed only by touching text information of a charging place. Further, in the example in FIG. 20, the input operation of the user is completed by selecting one of the motor-driven movable body 1 and the motor-driven movable body 3 (Step. 1) and then, touching the object of a charging place on the map (Step. 2).

After the charging place is specified by the user, the information processing apparatus 16 calculates electric energy necessary for the motor-driven movable body 1 or the motor-driven movable body 3 to reach the specified charging place by using the function of the battery residual quantity calculation unit 162. If the charging place is specified from the pre-discharge information of the motor-driven movable body 1, the information processing apparatus 16 calculates the maximum discharge amount by subtracting the calculated electric energy from the pre-discharge battery residual quantity of the motor-driven movable body 1. The information processing apparatus 16 that has calculated the maximum discharge amount calculates the discharge amount by subtracting predetermined electric energy (first electric energy margin) from the maximum discharge amount.

On the other hand, if the charging place is specified from the pre-discharge information of the motor-driven movable body 3, the information processing apparatus 16 calculates electric energy necessary for the motor-driven movable body 3 to reach the specified charging place and then calculates the minimum discharge amount by subtracting the pre-discharge battery residual quantity of the motor-driven movable body 3 from the electric energy. The information processing apparatus 16 that has calculated the minimum discharge amount calculates the discharge amount by adding predetermined electric energy (second electric energy margin) to the minimum discharge amount. The first and second electric energy margins may be set as different values.

In the foregoing, the input method of information about the discharge amount in step S216 has been described. The input method of information about the discharge amount is not limited to this. For example, the input method of information about the discharge amount may be a method by which the user directly inputs a numerical value or a method by which the discharge amount is specified by a bar display.

FIG. 14 is referred to again. The information processing apparatus 16 that has information about the discharge amount input by the user in step S216 and received the specified discharge amount calculates the post-discharge battery residual quantity of the motor-driven movable body 1 by using the function of the battery residual quantity calculation unit 162 (S217). The post-discharge battery residual quantity of the motor-driven movable body 1 can be obtained by subtracting the discharge amount from the pre-discharge battery residual quantity of the motor-driven movable body 1. The information processing apparatus 16 that has calculated the post-discharge battery residual quantity of the motor-driven movable body 1 calculates the post-discharge travelable distance of the motor-driven movable body 1 by using the function of the travelable distance calculation unit 163 (S218). The information processing apparatus 16 may also calculate the travelable time corresponding to the post-discharge travelable distance.

The information processing apparatus 16 that has calculated the post-discharge travelable distance of the motor-driven movable body 1 searches for post-discharge reachable areas of the motor-driven movable body 1 by using the function of the area search unit 164 (S219). The information processing apparatus 16 that has detected post-discharge reachable areas of the motor-driven movable body 1 searches for charging places present in the post-discharge reachable areas of the motor-driven movable body 1 by using the function of the charging place search unit 165 (S220). The calculation method of the post-discharge travelable distance and the search method of post-discharge reachable areas and charging places inside the post-discharge reachable areas are the same as the calculation method of the pre-discharge travelable distance and the search method of pre-discharge reachable areas and charging places inside the pre-discharge reachable areas, respectively.

If there is a charging place inside the post-discharge reachable areas of the motor-driven movable body 1, the information processing apparatus 16 proceeds to step S222 (FIG. 15) (S221). On the other hand, if there is no charging place inside the post-discharge reachable areas of the motor-driven movable body 1, the information processing apparatus 16 returns to step S216 to perform processing in step S216 and thereafter again (S221). If the destination is inside the post-discharge reachable areas, the information processing apparatus 16 may proceed to step S222 or a message may be displayed to check whether the information processing apparatus 16 may proceed to step S211. The information processing apparatus 16 that has proceeded to step S222 (see FIG. 15) calculates the post-discharge battery residual quantity of the motor-driven movable body 3 by using the function of the battery residual quantity calculation unit 162 (S222). The post-discharge battery residual quantity of the motor-driven movable body 3 is calculated by adding the discharge amount to the pre-discharge battery residual quantity of the motor-driven movable body 3.

The information processing apparatus 16 that has calculated the post-discharge battery residual quantity of the motor-driven movable body 3 calculates the post-discharge travelable distance of the motor-driven movable body 3 by using the function of the travelable distance calculation unit 163 (S223). The information processing apparatus 16 may also calculate the travelable time corresponding to the post-discharge travelable distance. The information processing apparatus 16 that has calculated the post-discharge travelable distance of the motor-driven movable body 3 searches for post-discharge reachable areas of the motor-driven movable body 3 by using the function of the area search unit 164 (S224). The information processing apparatus 16 that has detected post-discharge reachable areas of the motor-driven movable body 3 searches for charging places inside the post-discharge reachable areas of the motor-driven movable body 3 by using the function of the charging place search unit 165 (S225).

The calculation method of the post-discharge travelable distance and the search method of post-discharge reachable areas and charging places inside the post-discharge reachable areas are the same as the calculation method of the pre-discharge travelable distance and the search method of pre-discharge reachable areas and charging places inside the pre-discharge reachable areas, respectively. The information processing apparatus 16 that has detected charging places present inside the post-discharge reachable areas of the motor-driven movable body 3 displays a map using the current location as a reference point, current location, post-discharge travelable distance (travelable time), post-discharge battery residual quantity, post-discharge reachable areas, and charging places present in the post-discharge reachable areas for the motor-driven movable bodies 1 and 3 in the display unit 167 (S226).

Figure 21:
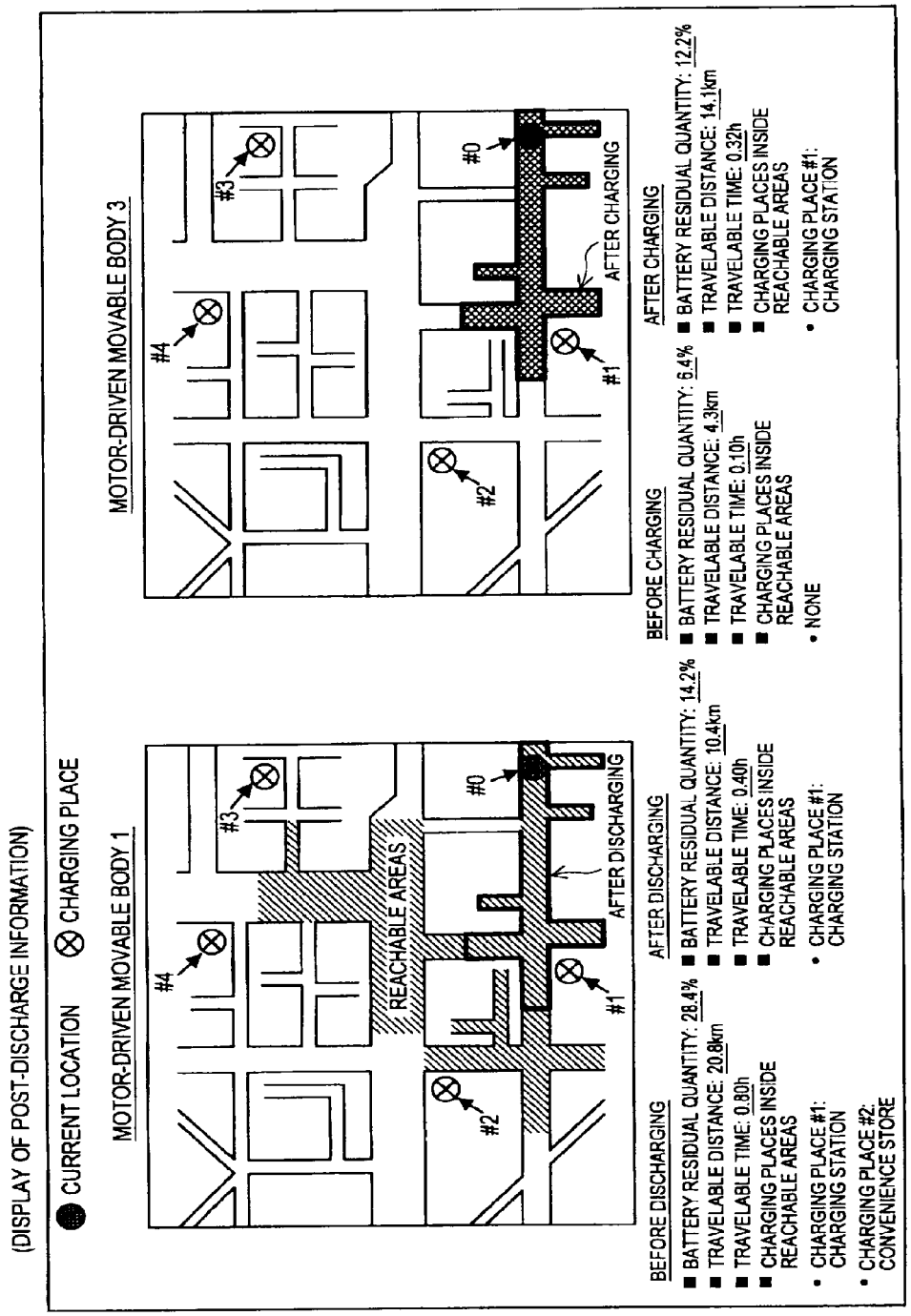
FIG. 21 is an explanatory view illustrating a configuration of a screen displayed in the operation flow (when discharging) of the information processing apparatus according to the modification (Modification 1) of the embodiment.

At this point, for example, with the screen configuration shown in FIG. 21, the map, current location, post-discharge travelable distance, post-discharge battery residual quantity, post-discharge reachable areas, and charging places are displayed in the display unit 167. In the display unit 167, the pre-discharge travelable distance, pre-discharge battery residual quantity, and pre-discharge reachable areas are also displayed. Thus, with pre-discharge information and post-discharge information displayed together, the condition of the motor-driven movable body 1 before and after the discharge can easily be grasped. Moreover, pre-discharge information and post-discharge information are displayed together for both the motor-driven movable bodies 1 and 3 and thus, the discharge amount can be specified by considering the status of the motor-driven movable bodies 1 and 3 before and after the discharge.

The information processing apparatus 16 that has proceeded to step S227 after completing the display processing in step S226 prompts the user to execute discharging (S227). If the user performs an execution operation of discharging, the information processing apparatus 16 proceeds to step S228. On the other hand, if the user does not perform an execution operation of discharging, the information processing apparatus 16 returns to step S216 (FIG. 14) to perform processing in step S216 and thereafter again. The information processing apparatus 16 that has proceeded to step S228 controls the charging/discharging control unit 14 to discharge electric power of the discharge amount specified in step S216 from the battery 11 (S228).

Electric power discharged in this manner is supplied to the motor-driven movable body 3 through the power line 2 to charge the battery 31 of the motor-driven movable body 3.

The operation flow of the information processing apparatus 16 at the time of discharging has been described in detail. In the above description, the configuration has been described in which the information processing apparatus 16 on the discharging side specifies the discharge amount and performs an execution operation of discharging assuming that the motor-driven movable body 1 is on the discharging side and the motor-driven movable body 3 on the charging side. However, modifications may be made such as displaying display content displayed in the display unit 167 on the charging side or specifying the discharge amount and performing an execution operation of discharging on the charging side. Moreover, modifications may be made so that operation processing and communication processing performed by the information processing apparatus 16 are performed by the information processing apparatus 36. Further, modifications may be made so that an external server connected to the wide area network 6 is caused to perform such operation processing and communication processing.

[2-5: Modification 2 (Automatic Decision of Charging/Discharging Side)]

Heretofore, it has been assumed that the motor-driven movable body 1 is on the discharging side and the motor-driven movable body 3 on the charging side. The discharging side and charging side may be set by, for example, changeover switches provided in the motor-driven movable bodies 1 and 3 (for example, near the connection terminals 15 and 35) being operated by the user. In most cases, however, the motor-driven movable body having a larger battery residual quantity will be set as the discharging side and the motor-driven movable body having a smaller battery residual quantity as the charging side. Thus, a configuration in which the discharging side and charging side are automatically decided in accordance with the battery residual quantity will be described.

(2-5-1: Operation Flow When the Charging/Discharging Side is Decided)

Figure 22:
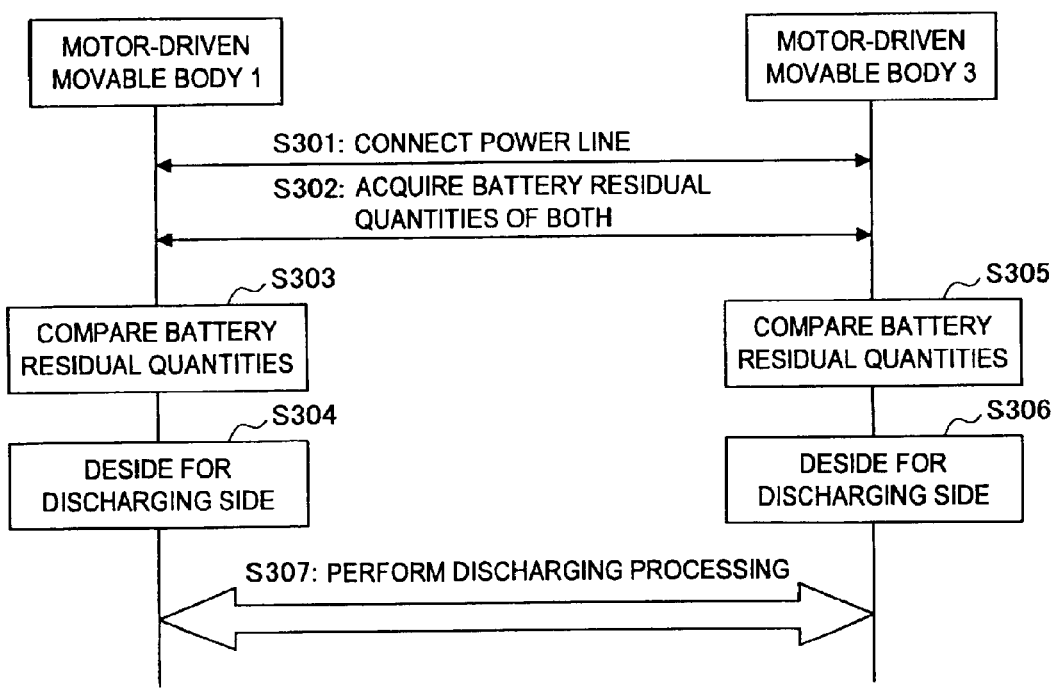
FIG. 22 is an explanatory view illustrating the operation flow (automatic decision of the charging/discharging side) of the information processing apparatus according to a modification (Modification 2) of the embodiment.

The automatic setting of the discharging side and charging side is made by following, for example, the operation flow of the motor-driven movable bodies 1 and 3 shown in FIG. 22. In the example in FIG. 22, it is assumed that the battery residual quantity of the motor-driven movable body 1 is larger than that of the motor-driven movable body 3.

As shown in FIG. 22, the motor-driven movable bodies 1 and 3 are first connected to the power line 2 (S301). Next, the motor-driven movable bodies 1 and 3 each acquire the battery residual quantity of the other (S302). Mutual authentication may naturally be performed before the battery residual quantity is exchanged. Next, the motor-driven movable body 1 compares the battery residual quantity of its own with that of the other (S303). In the example in FIG. 22, the battery residual quantity of the motor-driven movable body 1 is larger than that of the motor-driven movable body 3 and thus, the motor-driven movable body 1 decides attributes of its own for the discharging side (S304). Similarly, the motor-driven movable body 3 compares the battery residual quantity of its own with that of the other (S305). In the example in FIG. 22, the battery residual quantity of the motor-driven movable body 1 is larger than that of the motor-driven movable body 3 and thus, the motor-driven movable body 3 decides attributes of its own for the charging side (S306). Then, the motor-driven movable bodies 1 and 3 execute discharging processing according to respective attributes (S307).

In the foregoing, the method of automatically deciding the discharging side and charging side has been described. User convenience is improved by applying this method because time and effort for the user to set the discharging side and charging side can thereby be reduced. It is desirable to allow the user to make an automatic setting or manual setting of the discharging side and charging side.

[2-6: Modification 3 (Recommendation of Discharge Amount)]

Next, a configuration to automatically calculate a recommended value of the discharge amount will be described as a modification (Modification 3) of the present embodiment. The recommended value of the discharge amount calculated automatically here is referred to when the user decides an appropriate discharge amount or used as an actually used discharge amount. Thus, with a recommended value of the discharge amount calculated automatically, a user who is not familiar with the mechanism of driving the motor-driven movable bodies 1 and 3 and traveling performance can easily decide an appropriate discharge amount.

(2-6-1: Operation Flow at the Time of Discharging)

Figure 29:
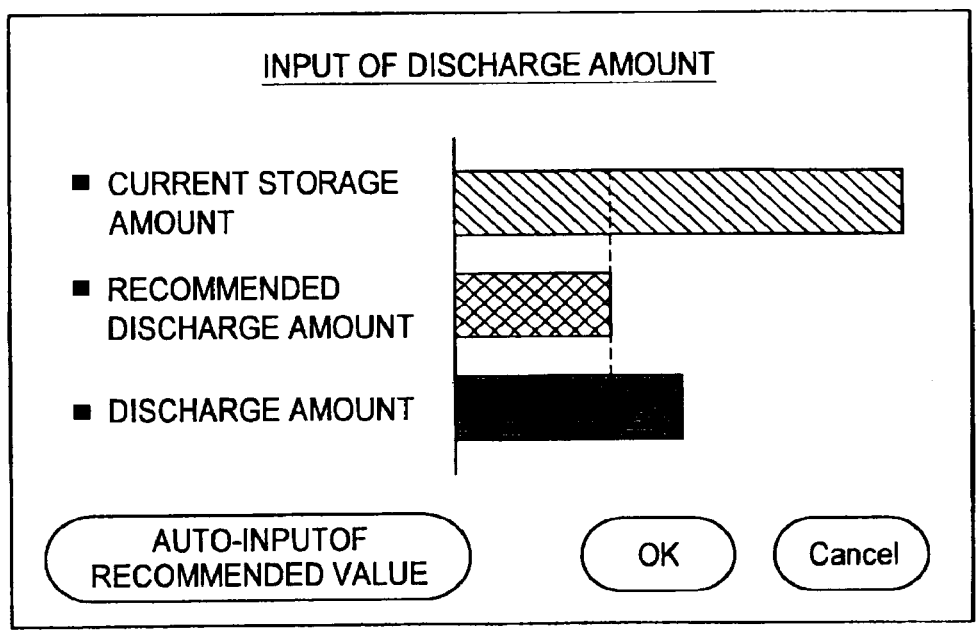
FIG. 29 is an explanatory view illustrating a configuration of a screen displayed in the operation flow (when discharging (recommendation of discharge amount)) of the information processing apparatus according to the modification (Modification 3) of the embodiment.

The operation flow of the information processing apparatus 16 at the time of discharging according to Modification 3 will be described with reference to FIGS. 23 to 27. Therein, concrete examples of the screen displayed in the operation flow of the information processing apparatus 16 at the time of discharging will be described with reference to FIGS. 28 and 29. FIGS. 23 to 27 are explanatory views illustrating the operation flow of the information processing apparatus 16 at the time of discharging according to Modification 3. FIGS. 28 and 29 are explanatory views illustrating concrete examples of the screen displayed in the operation flow of the information processing apparatus 16 at the time of discharging.

Figure 23:
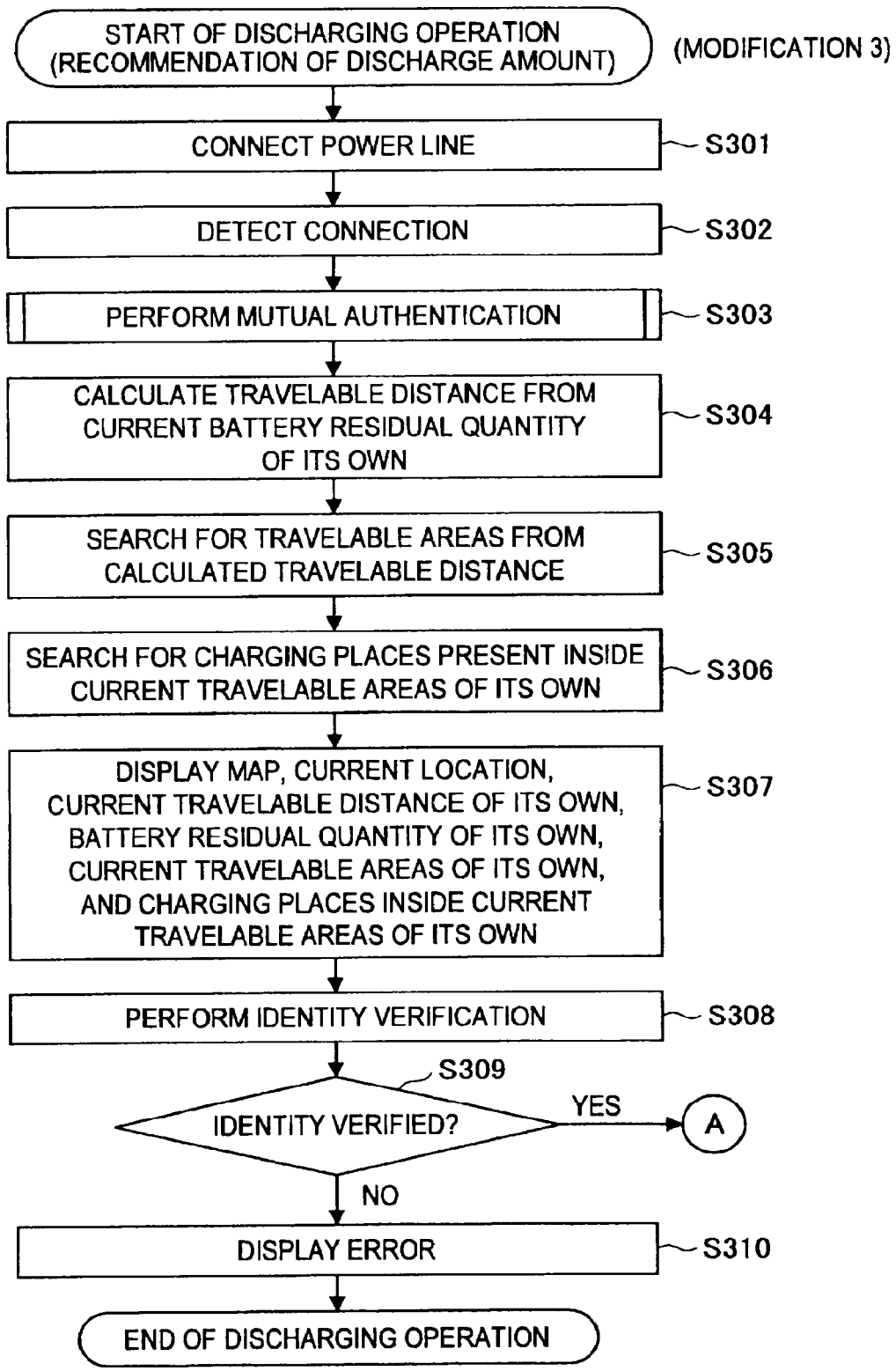
FIG. 23 is an explanatory view illustrating a configuration of a screen displayed in the operation flow (when discharging (recommendation of discharge amount)) of the information processing apparatus according to a modification (Modification 3) of the embodiment.
Figure 24:
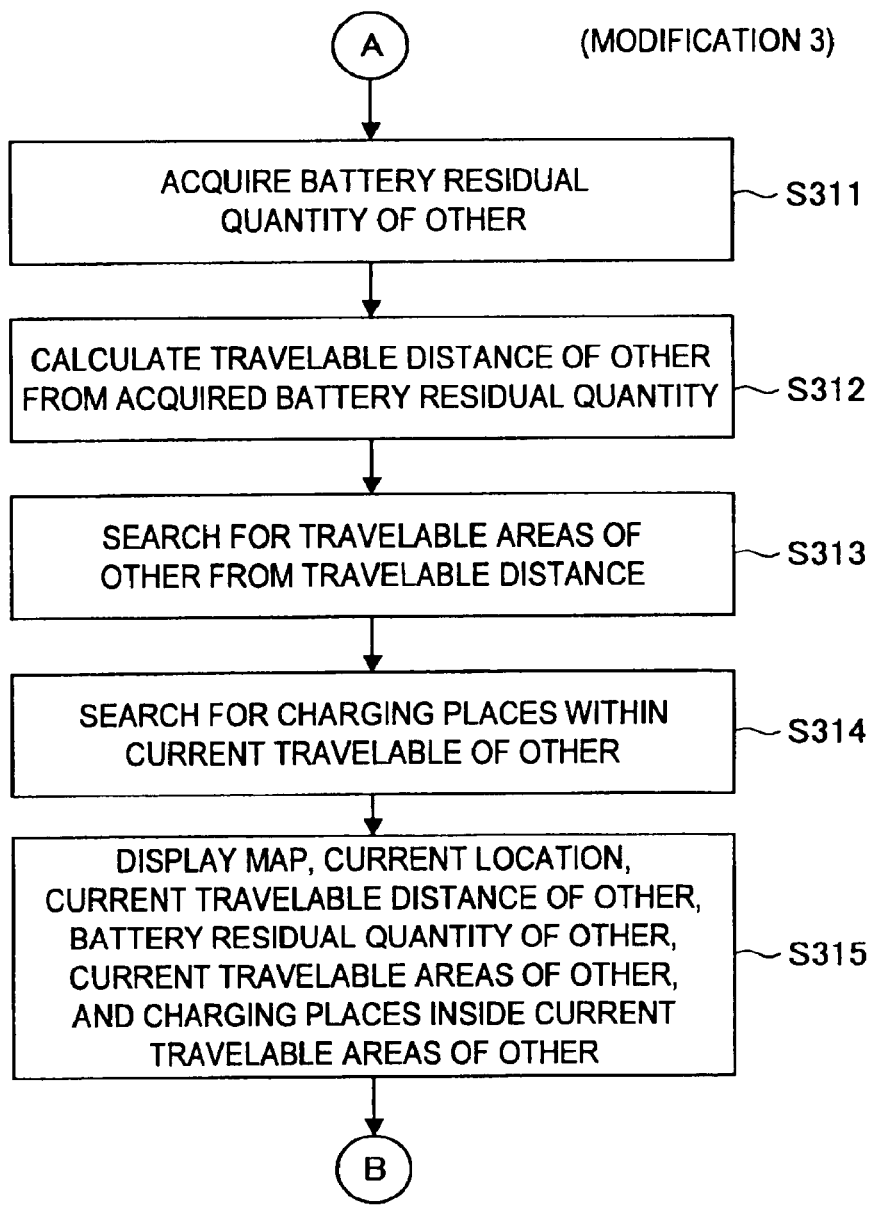
FIG. 24 is an explanatory view illustrating a configuration of a screen displayed in the operation flow (when discharging (recommendation of discharge amount)) of the information processing apparatus according to the modification (Modification 3) of the embodiment.
Figure 25:
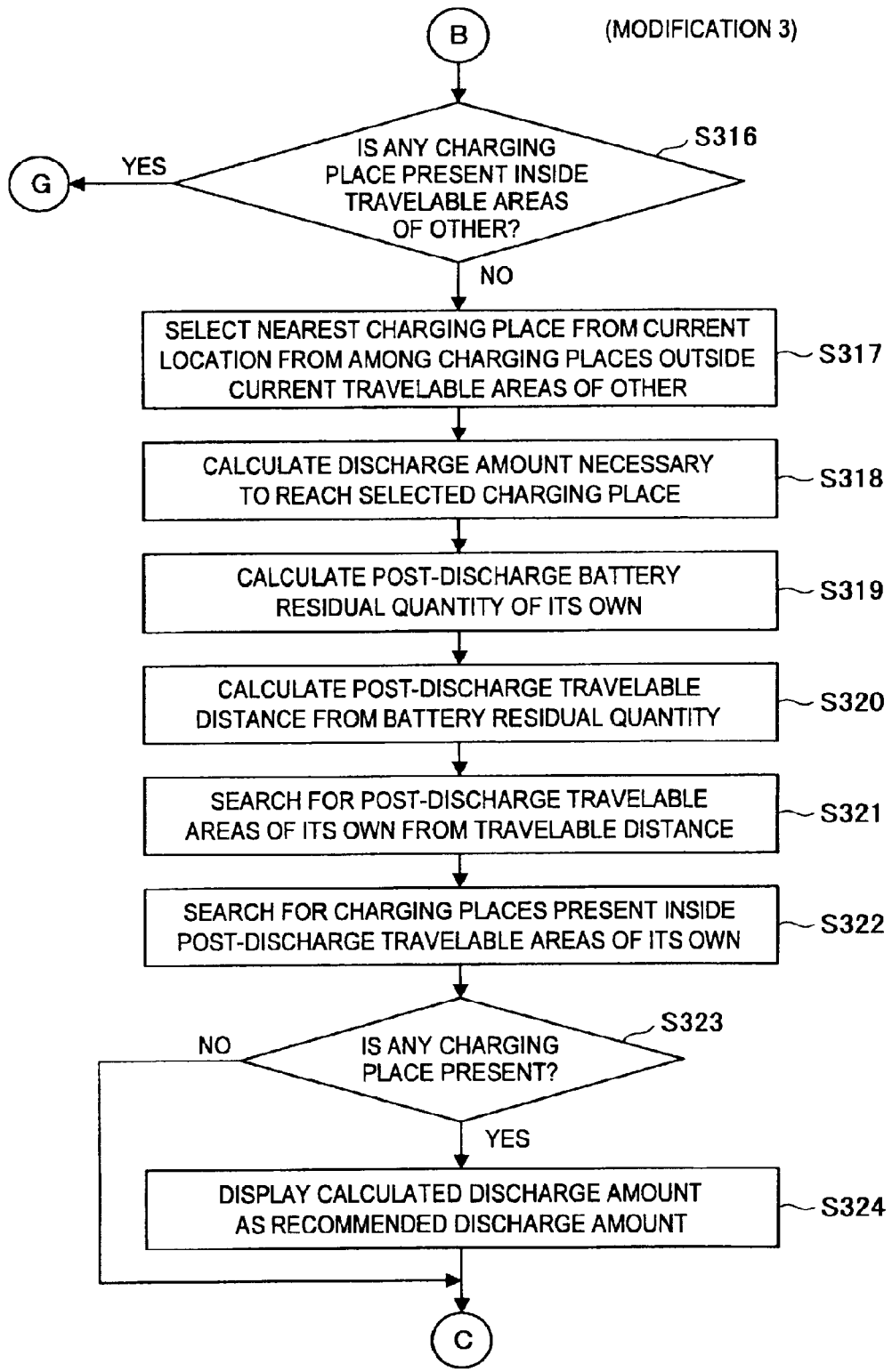
FIG. 25 is an explanatory view illustrating a configuration of a screen displayed in the operation flow (when discharging (recommendation of discharge amount)) of the information processing apparatus according to the modification (Modification 3) of the embodiment.

As shown in FIG. 23, when the power line 2 is first connected to the connection terminal 15 (S301) and the connection is detected by the charging/discharging control unit 14 (S302), the information processing apparatuses 16 and 36 perform mutual authentication (S303). The processing flow of the mutual authentication will be described later. If the mutual authentication is successful, the information processing apparatus 16 acquires the current battery residual quantity from the charging/discharging control unit 14 and calculates the current travelable distance (pre-discharge travelable distance) by using the function of the travelable distance calculation unit 163 (S304). At this point, the information processing apparatus 16 may also calculate the travelable time from the pre-discharge travelable distance by using the function of the travelable distance calculation unit 163.

Next, the information processing apparatus 16 searches for current travelable areas (pre-discharge reachable areas) from the calculated pre-discharge travelable distance by using the function of the area search unit 164 (S305). At this point, the information processing apparatus 16 searches for pre-discharge reachable areas by using information of a map prerecorded in the storage unit 166 or information sources such as a map server or a search server in the wide area network 6 via the communication unit 161.

The information processing apparatus 16 that has detected pre-discharge reachable areas searches for charging places present in the detected pre-discharge reachable areas by using the function of the charging place search unit 165 (S306). At this point, the information processing apparatus 16 searches for charging places present in the pre-discharge reachable areas by using information of a map prerecorded in the storage unit 166 or information sources such as a map server or a search server in the wide area network 6 via the communication unit 161.

The information processing apparatus 16 that has detected charging places present in the pre-discharge reachable areas displays a map using the current location as a reference point, current location, pre-discharge travelable distance (travelable time), pre-discharge battery residual quantity, pre-discharge reachable areas, and charging places present in the pre-discharge reachable areas in the display unit 167 (S307). Next, the information processing apparatus 16 performs an identity verification of the user by using the function of the identity verification unit 169 (step S308). At this point, the information processing apparatus 16 prompts the user to input the password or to allow a biometric authentication sensor to read a body site. The information processing apparatus 16 into which the password or biological information has been input makes sure that the user who has input the password or biological information is the correct user (registered user) by checking the input password or biological information against a password or biological information registered in advance.

If identity of the registered user is verified by the identity verification in step S308, the information processing apparatus 16 proceeds to step S311 (FIG. 24) (S309). On the other hand, if identity of the registered user is not verified by the identity verification in step S308, the information processing apparatus 16 proceeds to step S310 (S309). The information processing apparatus 16 that has proceeded to step S310 displays an error (or a warning) indicating that the identity verification failed in the display unit 167 (S310) before terminating a series of operations related to processing for discharging.

The information processing apparatus 16 that has proceeded to step S311 (see FIG. 24), on the other hand, acquires the pre-discharge battery residual quantity of the battery 31 from the charging/discharging control unit 34 or the information processing apparatus 36 of the motor-driven movable body 3 (S311). The information processing apparatus 16 that has acquired the pre-discharge battery residual quantity of the motor-driven movable body 3 calculates the pre-discharge travelable distance of the motor-driven movable body 3 by using the function of the travelable distance calculation unit 163 (S312). At this point, the information processing apparatus 16 may also calculate the travelable time from the pre-discharge travelable distance by using the function of the travelable distance calculation unit 163.

The pre-discharge travelable distance and the travelable time corresponding thereto displayed here are numerical values obtained when, for example, the motor-driven movable body 3 travels according to a predetermined traveling pattern (for example, a traveling pattern to be criteria for calculating 10·15 mode fuel consumption or JC08 mode fuel consumption). Thus, numerical values necessary for calculating the pre-discharge travelable distance and the travelable time corresponding thereto are to be received from the motor-driven movable body 3 in step S211. Instead of carrying out such a calculation by the information processing apparatus 16, a calculation result may be received in step S211 after causing the information processing apparatus 36 to carry out the calculation. The calculation method of the pre-discharge travelable distance and the travelable time corresponding thereto displayed here may be made freely settable by the user. In such a case, the user can make settings so that the pre-discharge travelable distance and the travelable time corresponding thereto when the traveling pattern is traveling on a flatland at a constant speed and the constant speed is set to 30 km are displayed.

Next, the information processing apparatus 16 searches for pre-discharge reachable areas of the motor-driven movable body 3 from the calculated pre-discharge travelable distance by using the function of the area search unit 164 (S313). At this point, the information processing apparatus 16 searches for pre-discharge reachable areas by using information of a map prerecorded in the storage unit 166 or information sources such as a map server or a search server in the wide area network 6 via the communication unit 161.

The information processing apparatus 16 that has detected pre-discharge reachable areas of the motor-driven movable body 3 searches for charging places present in the detected pre-discharge reachable areas by using the function of the charging place search unit 165 (S314). At this point, the information processing apparatus 16 searches for charging places present in the pre-discharge reachable areas of the motor-driven movable body 3 by using information of a map prerecorded in the storage unit 166 or information sources such as a map server or a search server in the wide area network 6 via the communication unit 161.

The information processing apparatus 16 that has detected charging places present in the pre-discharge reachable areas of the motor-driven movable body 3 displays a map using the current location as a reference point, current location, pre-discharge travelable distance (travelable time) of the motor-driven movable body 3, pre-discharge battery residual quantity, pre-discharge reachable areas, and charging places present in the pre-discharge reachable areas in the display unit 167 (S315).

Next, the information processing apparatus 16 determines whether any charging place is present inside the pre-discharge reachable areas of the motor-driven movable body 3 (S316). If a charging place is present inside the pre-discharge reachable areas of the motor-driven movable body 3, the information processing apparatus 16 terminates a series of operations related to processing for discharging. On the other hand, if no charging place is present inside the pre-discharge reachable areas of the motor-driven movable body 3, the information processing apparatus 16 proceeds to step S317. The information processing apparatus 16 that has proceeded to step S317 selects, among charging places outside the pre-discharge reachable areas of the motor-driven movable body 3, the nearest charging place from the current location (hereinafter, referred to as the nearest charging place) (S317).

The information processing apparatus 16 that has selected the nearest charging place calculates a discharge amount allowing the motor-driven movable body 3 to reach the nearest charging place after the discharge (S318). For example, the information processing apparatus 16 calculates electric energy necessary for the motor-driven movable body 3 to reach the nearest charging place by using the function of the battery residual quantity calculation unit 162. Next, the information processing apparatus 16 calculates the minimum discharge amount by subtracting the pre-discharge battery residual quantity of the motor-driven movable body 3 from the calculated electric energy. The information processing apparatus 16 that has calculated the minimum discharge amount calculates the discharge amount by adding predetermined electric energy (electric energy margin) to the minimum discharge amount.

The information processing apparatus 16 that has calculated the discharge amount calculates the post-discharge battery residual quantity of the motor-driven movable body 1 by using the function of the battery residual quantity calculation unit 162 (S319). The post-discharge battery residual quantity of the motor-driven movable body 1 can be obtained by subtracting the discharge amount from the pre-discharge battery residual quantity of the motor-driven movable body 1. The information processing apparatus 16 that has calculated the post-discharge battery residual quantity of the motor-driven movable body 1 calculates the post-discharge travelable distance of the motor-driven movable body 1 by using the function of the travelable distance calculation unit 163 (S320). The information processing apparatus 16 may also calculate the travelable time corresponding to the post-discharge travelable distance.

The information processing apparatus 16 that has calculated the post-discharge travelable distance of the motor-driven movable body 1 searches for post-discharge reachable areas of the motor-driven movable body 1 by using the function of the area search unit 164 (S321). The information processing apparatus 16 that has detected post-discharge reachable areas of the motor-driven movable body 1 searches for charging places present in the post-discharge reachable areas of the motor-driven movable body 1 by using the function of the charging place search unit 165 (S322). The calculation method of the post-discharge travelable distance and the search method of post-discharge reachable areas and charging places inside the post-discharge reachable areas are the same as the calculation method of the pre-discharge travelable distance and the search method of pre-discharge reachable areas and charging places inside the pre-discharge reachable areas, respectively.

If a charging place is present inside the post-discharge reachable areas of the motor-driven movable body 1, the information processing apparatus 16 proceeds to step S324 (S323). On the other hand, if no charging place is present inside the post-discharge reachable areas of the motor-driven movable body 1, the information processing apparatus 16 proceeds to step S325 (FIG. 26) (S323). Even though no charging place is present inside the post-discharge reachable areas of the motor-driven movable body 1, the information processing apparatus 16 may proceed to step S324 or receive user's instructions by issuing a predetermined warning message if the destination is set inside the post-discharge reachable areas of the motor-driven movable body 1.

The information processing apparatus 16 that has proceeded to step S324 displays, as shown in FIGS. 28 and 29, the discharge amount calculated in step S318 in the display unit 167 to recommend the discharge amount as an appropriate discharge amount to the user (S324). As shown in FIGS. 28 and 29, a button to automatically input the recommended value of the discharge amount into the field of the discharge amount may be provided so that the user can easily set the discharge amount by pressing the button.

Figure 26:
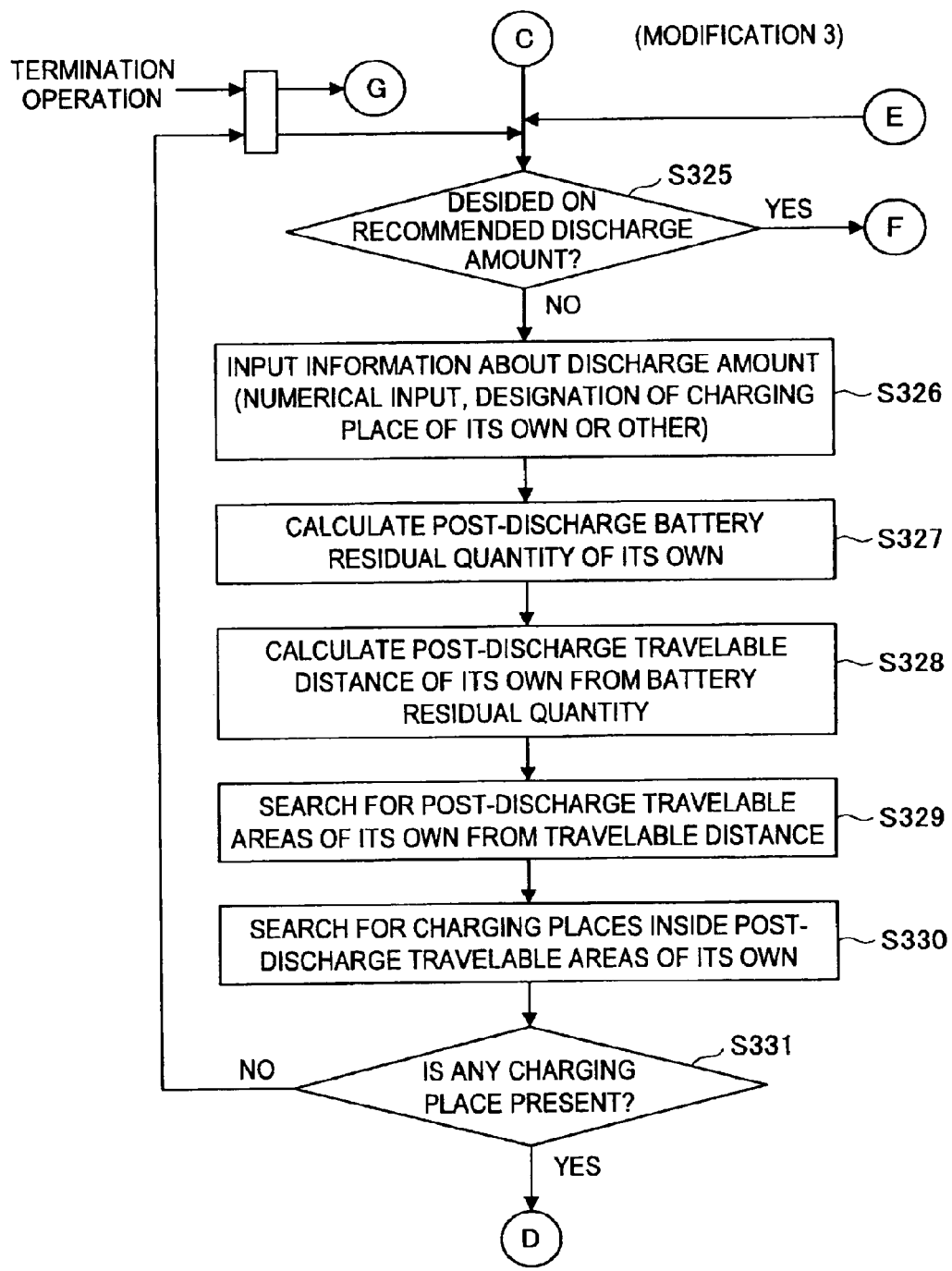
FIG. 26 is an explanatory view illustrating a configuration of a screen displayed in the operation flow (when discharging (recommendation of discharge amount)) of the information processing apparatus according to the modification (Modification 3) of the embodiment.

The information processing apparatus 16 that has recommended the discharge amount proceeds to step S325 (see FIG. 26). The user decides whether to use the recommended discharge amount as the actually used discharge amount and inputs a result of the decision into the information processing apparatus 16. The information processing apparatus 16 that has proceeded to step S325 proceeds to step S336 (FIG. 27) if the user decides to use the recommended discharge amount as the actually used discharge amount in accordance with the result of the decision of the user (S325). On the other hand, if the user does not decide to use the recommended discharge amount as the actually used discharge amount, the information processing apparatus 16 proceeds to step S326 (S325).

The information processing apparatus 16 that has proceeded to step S326 prompts the user to input information about the discharge amount (S326). The user inputs the desired discharge amount. However, input of the discharge amount is not necessarily numerical input. For example, the information processing apparatus 16 may be configured so that the discharge amount is input by specifying a charging place that can at least be reached by the motor-driven movable body 1 or a charging place that can at least be reached by the motor-driven movable body 3 after the discharge.

The information processing apparatus 16 that has received the specified discharge amount calculates the post-discharge battery residual quantity of the motor-driven movable body 1 by using the function of the battery residual quantity calculation unit 162 (S327). The post-discharge battery residual quantity of the motor-driven movable body 1 can be obtained by subtracting the discharge amount from the pre-discharge battery residual quantity of the motor-driven movable body 1. The information processing apparatus 16 that has calculated the post-discharge battery residual quantity of the motor-driven movable body 1 calculates the post-discharge travelable distance of the motor-driven movable body 1 by using the function of the travelable distance calculation unit 163 (S328). The information processing apparatus 16 may also calculate the travelable time corresponding to the post-discharge travelable distance.

The information processing apparatus 16 that has calculated the post-discharge discharge travelable distance of the motor-driven movable body 1 searches for post-discharge reachable areas of the motor-driven movable body 1 by using the function of the area search unit 164 (S329). The information processing apparatus 16 that has detected post-discharge reachable areas of the motor-driven movable body 1 searches for charging places present in the post-discharge reachable areas of the motor-driven movable body 1 by using the function of the charging place search unit 165 (S330). The calculation method of the post-discharge travelable distance and the search method of post-discharge reachable areas and charging places inside the post-discharge reachable areas are the same as the calculation method of the pre-discharge travelable distance and the search method of pre-discharge reachable areas and charging places inside the pre-discharge reachable areas, respectively.

If a charging place is present inside the post-discharge reachable areas of the motor-driven movable body 1, the information processing apparatus 16 proceeds to step S332 (FIG. 27) (S331). On the other hand, if no charging place is present inside the post-discharge reachable areas of the motor-driven movable body 1, the information processing apparatus 16 returns to step S325 to perform processing in step S325 and thereafter again (S331).

If a determination is made in step S331 that no charging place is present, the user may be allowed to select the end of processing. Even though no charging place is present inside the post-discharge reachable areas of the motor-driven movable body 1, the information processing apparatus 16 may proceed to step S332 or receive user's instructions by issuing a predetermined warning message if the destination is set inside the post-discharge reachable areas of the motor-driven movable body 1.

The information processing apparatus 16 that has proceeded to step S332 (see FIG. 27) calculates the post-discharge battery residual quantity of the motor-driven movable body 3 by using the function of the battery residual quantity calculation unit 162 (S332). The post-discharge battery residual quantity of the motor-driven movable body 3 can be calculated by adding the discharge amount to the pre-discharge battery residual quantity of the motor-driven movable body 3.

The information processing apparatus 16 that has calculated the post-discharge battery residual quantity of the motor-driven movable body 3 calculates the post-discharge travelable distance of the motor-driven movable body 3 by using the function of the travelable distance calculation unit 163 (S333). The information processing apparatus 16 may also calculate the travelable time corresponding to the post-discharge travelable distance. The information processing apparatus 16 that has calculated the post-discharge travelable distance of the motor-driven movable body 3 searches for post-discharge reachable areas of the motor-driven movable body 3 by using the function of the area search unit 164 (S334). The information processing apparatus 16 that has detected post-discharge reachable areas of the motor-driven movable body 3 searches for charging places present in the post-discharge reachable areas of the motor-driven movable body 3 by using the function of the charging place search unit 165 (S335).

The calculation method of the post-discharge travelable distance and the search method of post-discharge reachable areas and charging places inside the post-discharge reachable areas are the same as the calculation method of the pre-discharge travelable distance and the search method of pre-discharge reachable areas and charging places inside the pre-discharge reachable areas, respectively. The information processing apparatus 16 that has detected charging places present in the post-discharge reachable areas of the motor-driven movable body 3 displays a map using the current location as a reference point, current location, post-discharge travelable distance (travelable time), post-discharge battery residual quantity, post-discharge reachable areas, and charging places present in the post-discharge reachable areas for the motor-driven movable bodies 1 and 3 in the display unit 167 (S336).

At this point, the map, current location, post-discharge travelable distance, post-discharge battery residual quantity, post-discharge reachable areas, and charging places are displayed in the display unit 167. In the display unit 167, the pre-discharge travelable distance, pre-discharge battery residual quantity, and pre-discharge reachable areas are also displayed. Thus, with pre-discharge information displayed together, the condition of the motor-driven movable body 1 before and after the discharge can easily be grasped. Moreover, pre-discharge information and post-discharge information are displayed together for both the motor-driven movable bodies 1 and 3 and thus, the discharge amount can be specified by considering the status of the motor-driven movable bodies 1 and 3 before and after the discharge.

Figure 27:
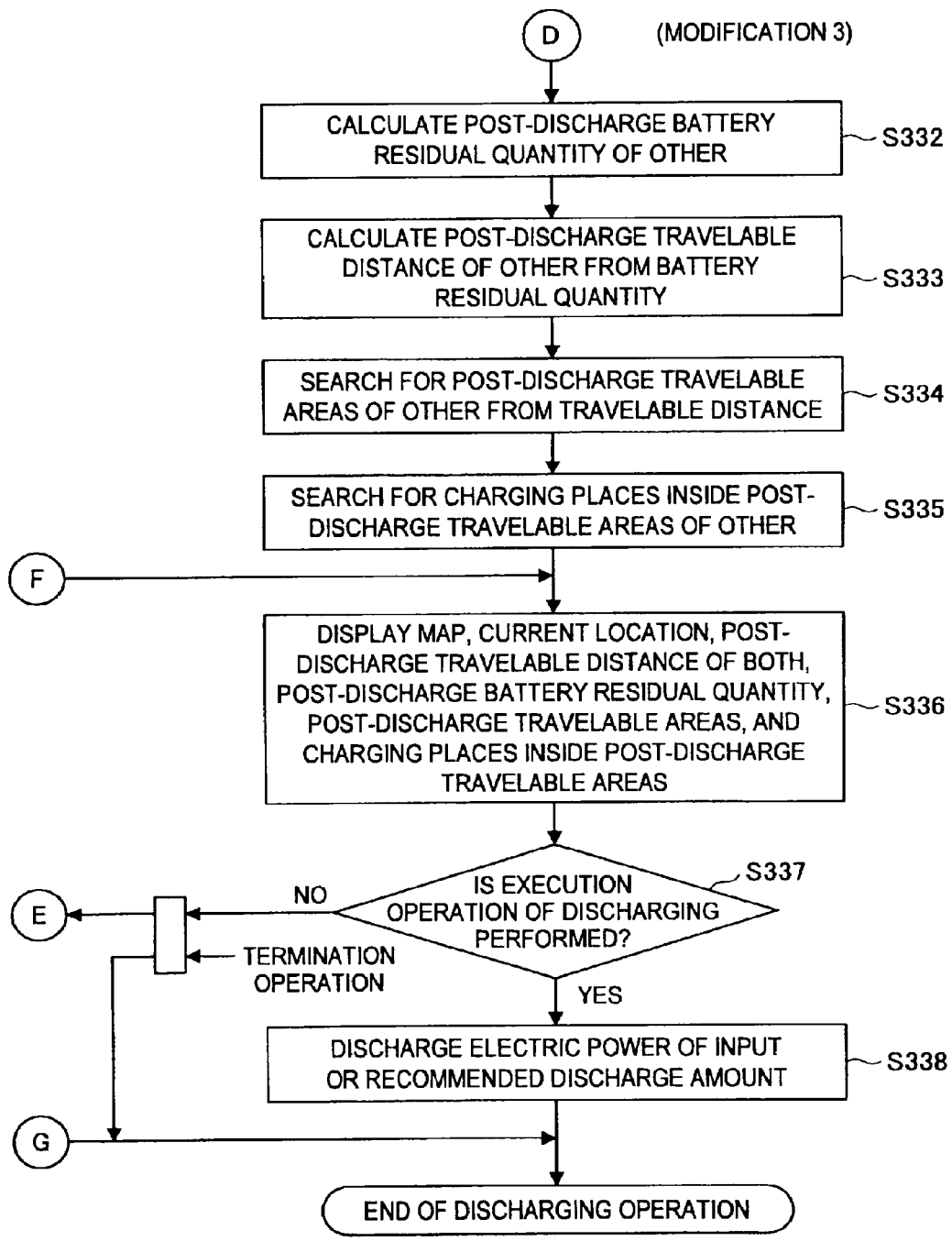
FIG. 27 is an explanatory view illustrating a configuration of a screen displayed in the operation flow (when discharging (recommendation of discharge amount)) of the information processing apparatus according to the modification (Modification 3) of the embodiment.

If no charging place is detected in step S335 in FIG. 27, discharging processing can be performed. This is because, though there is the possibility that the motor-driven movable body 3 may not be able to reach the nearest charging place after the motor-driven movable body 3 is charged with the maximum electric power that can be supplied from the motor-driven movable body 1, the motor-driven movable body 3 can come closer to the charging place to some extent by being charged and can reach the charging place in the end by receiving electric power again from another motor-driven movable body.

The information processing apparatus 16 that has proceeded to step S337 after completing the display processing in step S336 prompts the user to execute discharging (S337). If the user performs an execution operation of discharging, the information processing apparatus 16 proceeds to step S338. On the other hand, if the user does not perform an execution operation of discharging, the information processing apparatus 16 returns to step S325 (FIG. 26) to perform processing in step S325 and thereafter again. If the user performs a termination operation of discharging, a sequence of processing ends.

The information processing apparatus 16 that has proceeded to step S338 controls the charging/discharging control unit 14 to discharge electric power of the discharge amount decided in step S325 or the discharge amount specified in step S326 from the battery 11 (S338).

The electric power discharged in this manner is supplied to the motor-driven movable body 3 through the power line 2 to charge the battery 31 of the motor-driven movable body 3.

In the foregoing, the operation flow of the information processing apparatus 16 at the time of discharging has been described in detail. In the above description, the configuration has been described in which the information processing apparatus 16 on the discharging side specifies the discharge amount and performs an execution operation of discharging by assuming that the motor-driven movable body 1 is on the discharging side and the motor-driven movable body 3 on the charging side. However, modifications may be made such as displaying display content displayed in the display unit 167 on the charging side or specifying the discharge amount and performing an execution operation of discharging on the charging side. Moreover, modifications may be made so that operation processing and communication processing performed by the information processing apparatus 16 are performed by the information processing apparatus 36. Further, modifications may be made so that an external server connected to the wide area network 6 is caused to perform such operation processing and communication processing.

[2-7: Processing Flow for Mutual Authentication]

Figure 30:
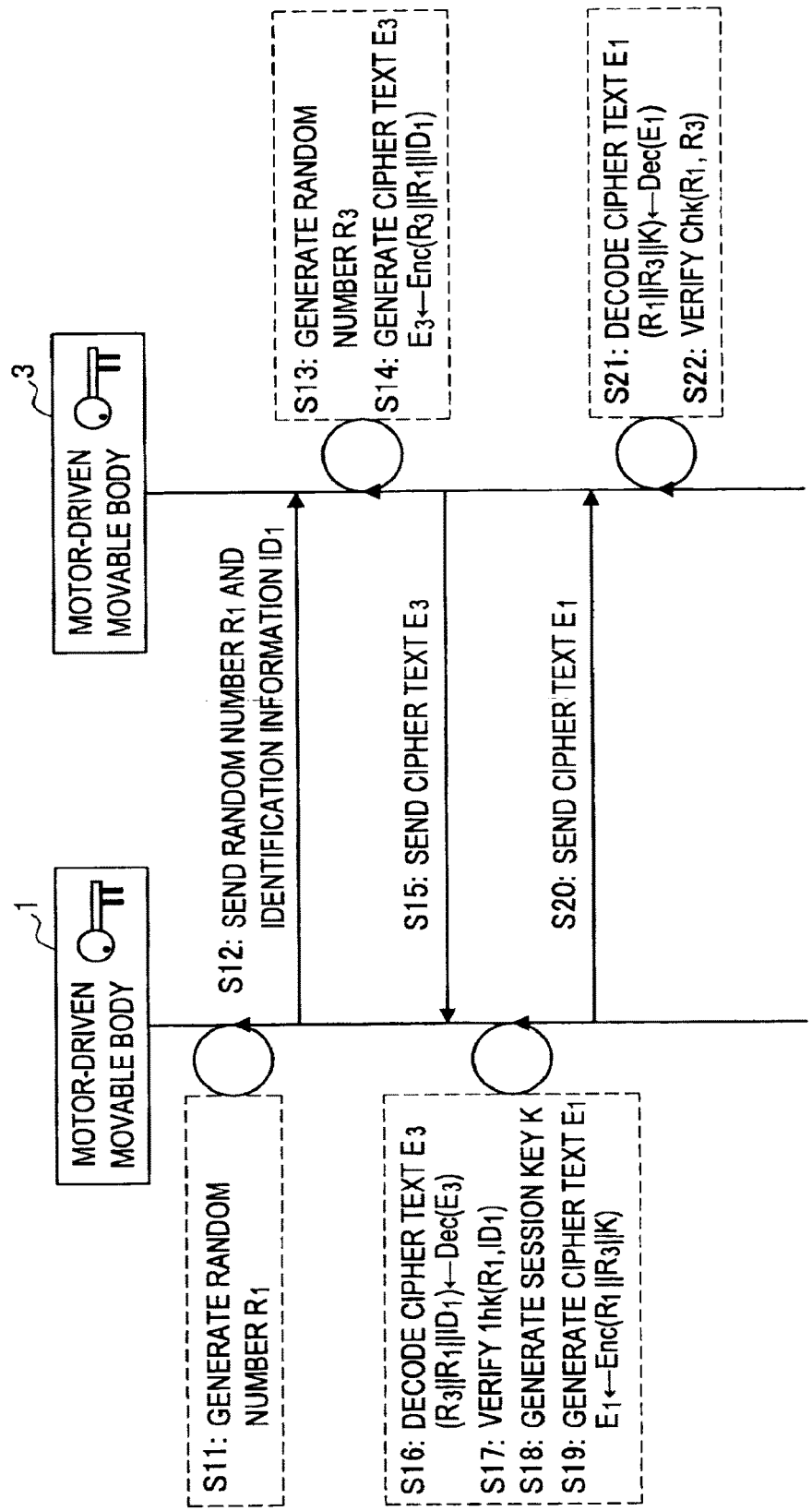
FIG. 30 is an explanatory view illustrating a processing flow for mutual authentication performed by the motor-driven movable bodies according to the embodiment.

The processing flow for mutual authentication performed between the motor-driven movable bodies 1 and 3 according to the present embodiment will be described with reference to FIG. 30. FIG. 30 is an explanatory view illustrating the processing flow for mutual authentication performed between the motor-driven movable bodies 1 and 3 according to the present embodiment. It is assumed that the motor-driven movable body 1 and the motor-driven movable body 3 hold a common key for authentication (authentication key). Mutual authentication between the motor-driven movable bodies 1 and 3 is actually performed between the charging/discharging control units 14 and 34 or between the information processing apparatuses 16 and 36.

First, the motor-driven movable body 1 generates a random number $R_1$ (S11). Next, the motor-driven movable body 1 sends the random number $R_1$ and identification information $ID_1$ of its own to the motor-driven movable body 3 (S12). The motor-driven movable body 3 that has received the random number $R_1$ and the identification information $ID_1$ generates a random number $R_3$ (S13). Next, the motor-driven movable body 3 generates a cipher text $E_3$ by using the random numbers $R_1$ and $R_3$ and the identification information $ID_1$ (S14). Then, the motor-driven movable body 3 sends the cipher text $E_3$ to the motor-driven movable body 1 (S15).

The motor-driven movable body 1 that has received the cipher text $E_3$ decrypts the cipher text $E_3$ (S16). Then, the motor-driven movable body 1 checks that the random number $R_1$ and the identification information $ID_1$ obtained by the decryption are the same as the random number $R_1$ and the identification information $ID_1$ held by the motor-driven movable body 1 (S17). If the check is successful, the motor-driven movable body 1 generates a session key K (S18). If the check fails, the motor-driven movable body 1 outputs an error before terminating a sequence of processing related to the mutual authentication.

The motor-driven movable body 1 that has generated the session key K after the successful check encrypts the random numbers $R_1$ and $R_3$ and the session key K to generate a cipher text $E_1$ (S19). Then, the motor-driven movable body 1 sends the cipher text $E_1$ to the motor-driven movable body 3 (S20). The motor-driven movable body 3 that has received the cipher text $E_1$ decrypts the cipher text $E_1$ (S21). Then, the motor-driven movable body 3 checks that the random numbers $R_1$ and $R_3$ obtained by decryption and the random numbers $R_1$ and $R_3$ held by the motor-driven movable body 3 are the same (S22).

If the check is successful, the mutual authentication between the motor-driven movable bodies 1 and 3 is successful. If the mutual authentication is successful in this manner, the session key K will be shared between the motor-driven movable bodies 1 and 3, establishing a secure communication path using the session key K. On the other hand, if the check fails, the motor-driven movable body 3 outputs an error before terminating a sequence of processing related to the mutual authentication. In the foregoing, the processing flow for mutual authentication performed between the motor-driven movable bodies 1 and 3 according to the present embodiment has been described.

[2-8: Hardware Configuration Example]

Figure 31:
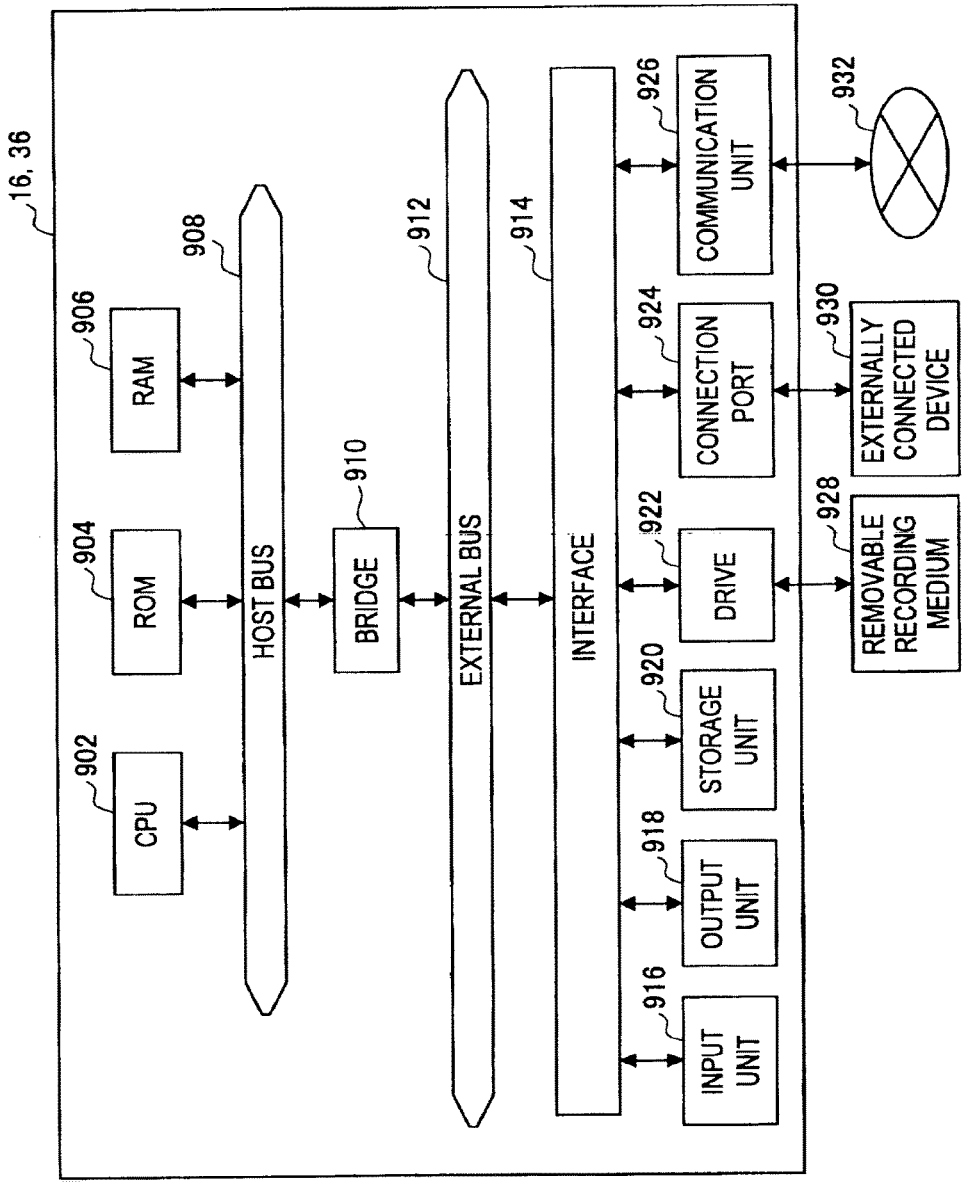
FIG. 31 is an explanatory view illustrating a hardware configuration capable of realizing functions of the information processing apparatus according to the embodiment.

The function of each structural element of the information processing apparatuses 16 and 36 described above can be realized by using the hardware configuration of an information processing apparatus shown in FIG. 31, for example. That is, the function of each structural element is realized by controlling the hardware shown in FIG. 31 by using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 31, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

3: CONCLUSION

Lastly, technical content according to embodiments of the present invention will briefly be summarized. Technical content described here can be applied to various information processing apparatuses such as PCs, mobile phones, mobile game machines, mobile information terminals, home information appliances, and car navigation systems.

The function configuration of the above information processing apparatuses can be expressed as follows. The relevant information processing apparatus includes a travelable information display unit that displays before a discharge, regarding motor-driven movable bodies of a discharge source and a discharge destination driven by using electric power of batteries, information about places to which the motor-driven movable body of the discharge source can move using electric power of the battery left after the discharge by assuming, when information about a discharge amount discharged from the battery of the motor-driven movable body of the discharge source toward the motor-driven movable body of the discharge destination that receives power supply is input, a case in which the discharge amount is discharged from the battery.

Thus, by presenting information to the user about places to which the motor-driven movable body after the discharge can travel before performing a discharging operation, the user can decide an appropriate discharge amount with reference to the information. Reachable places include, for example, charging stations where charging facilities are installed and the destination. The destination need not necessarily have charging facilities installed thereon. This is because the destination can play the same role as a charging station if another motor-driven movable body is awaited at the destination to receive electric power from the other motor-driven movable body there. By applying the configuration according to the present embodiment in this manner, troubles of the motor-driven movable body on the discharging side or both motor-driven movable bodies unable to travel after the discharge can be avoided.

The operation unit 160 and the display unit 167 are examples of a travelable information display unit or a range presentation unit. The operation unit 160 is an example of an operation processing unit or an attribute specifying unit.

It should be understood by those skilled in the art that various modifications, combinations, sub-combinations and alterations may occur depending on design requirements and other factors insofar as they are within the scope of the appended claims or the equivalents thereof.

Figure 32:
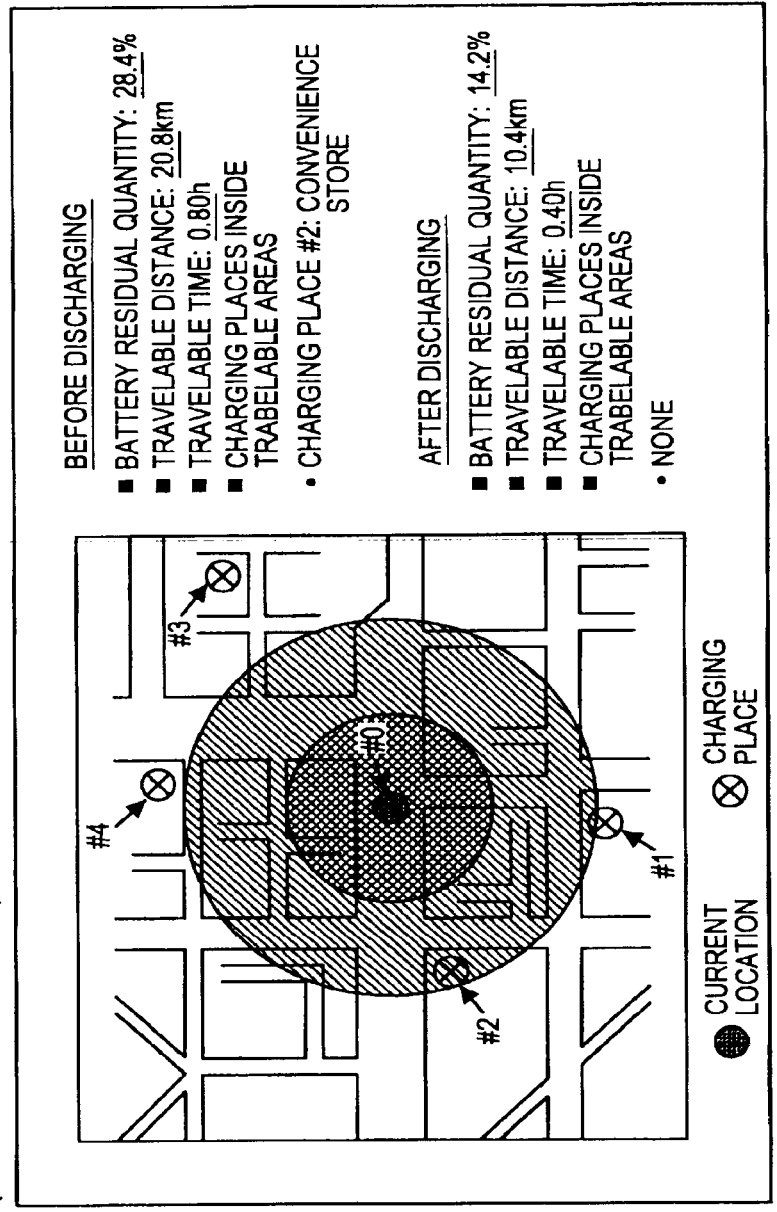
FIG. 32 is an explanatory view illustrating a modification of a screen configuration displayed in the operation flow of the information processing apparatus according to the embodiment.

In the description related to the above embodiments, for example, travelable areas displayed on a map are indicated by hatching (actually, color-coding, classification by pattern and the like) on roads, but as shown in FIG. 32, travelable areas may be displayed by a circle or ellipse using the current location as the center thereof. While the hatching display on roads can advantageously take road attributes (for example, suspension of traffic, one-way traffic, speed limit, school-commuting road, and no entry) into consideration, the display method in FIG. 32 has an advantage that the travelable distance is made easier to understand. Moreover, if the display method in FIG. 32 is used, the travelable areas can be calculated from travelable distance information only, contributing to speed enhancement of the display. Needless to say, it is desirable to allow the user to set which display method to use.

What is claimed is:

1. An information processing apparatus included in a discharge source, comprising:
a display; and
circuitry including a processor coupled to a memory and configured to
set a candidate discharge amount of at least one first battery that is discharged to at least one second battery of a discharge destination, the at least one first battery being included in the discharge source configured to be driven by using electric power of the at least one first battery,
calculate a remaining amount of electric power in the at least one first battery after discharging the at least one first battery by the candidate discharge amount, and calculate a distance travel range from a current location that the discharge source can move per unit of electric power, so that electric power remaining in the at least one first battery allows the discharge source to travel the distance travel range after discharge of the candidate discharge amount,
provide, to the display, information about the distance travel range that the discharge source can travel after the candidate discharge amount is discharged from the at least one first battery,
receive user input regarding the candidate discharge amount,
determine a discharge amount based on the candidate discharge amount and the user input after providing the information to the display, and
cause discharge of the discharge source by the discharge amount to the discharge destination based on the user input.

2. The information processing apparatus according to claim 1, wherein the information about the distance travel range that is provided to the display includes at least one of a plurality of travel distances, travel times when the travel distances are traveled at a predetermined speed, travel areas and destinations within the travel range.

3. The information processing apparatus according to claim 2, wherein the circuitry is further configured to determine a distance between the current location and at least one of the destinations, and cause the display to display information about the at least one of the destinations when the discharge source can travel to the at least one of the destinations after the at least one first battery is discharged by the candidate discharge amount.

4. The information processing apparatus according to claim 2, wherein the destinations include destinations where feeding facilities are installed.

5. The information processing apparatus according to claim 3, wherein the information about the at least one of the destinations includes a first destination reachable by the discharge source after discharge of the at least one first battery by the candidate discharge amount, a second destination that is reachable by the discharge destination, or both.

6. The information processing apparatus according to claim 3, wherein the circuitry is further configured to determine the discharge amount so that the electric power remaining in the at least one first battery allows the discharge source to reach the at least one of the destinations, and allows the discharge source to reach a destination nearest to the current location.

7. The information processing apparatus according to claim 6, wherein the circuitry is further configured to provide the display, in a distinguishable form on a map, areas to which the discharge source can move based on the discharge amount, and provide to the display, in a distinguishable form on a map, areas to which the discharge destination can move based on the discharge amount.

8. The information processing apparatus according to claim 7, wherein the circuitry is further configured to:
provide, to the display, destinations in a distinguishable form on the map included in the areas to which the discharge source can move based on the discharge amount, and
provide, to the display, destinations in a distinguishable form on the map included in the areas to which the discharge destination can move based on the discharge amount.

9. The information processing apparatus according to claim 5, wherein the circuitry is further configured to receive input information regarding the discharge amount, and restrict the input information so that a third destination not reachable by the discharge source or a fourth destination not reachable by the discharge destination before the discharge, is not selected.

10. The information processing apparatus according to claim 9, wherein the circuitry is further configured to calculate the discharge amount when the second destination is input as the information regarding the discharge amount, based on a distance from the current location to the second destination and on a distance that the discharge destination can move per unit of electric power, so that the discharge destination can reach at least the second destination.

11. The information processing apparatus according to claim 1, wherein the circuitry is further configured to:
provide to the display, in a distinguishable form on a map, the distance travel range corresponding to the candidate discharge amount so that at least one destination is included in areas to which the discharge source can move after the discharge of the at least one first battery, and
provide to the display, in a distinguishable form on a map, a range of the discharge destination based on the candidate discharge amount so that the at least one destination is included in areas to which the discharge destination can move after the discharge of the at least one first battery.

12. The information processing apparatus according to claim 11, wherein the circuitry is further configured to provide to the display the distance travel range based on the candidate discharge amount so that the discharge source can reach a destination nearest to the current location and the discharge destination can reach at least the destination nearest to the current location after discharge of the at least one first battery.

13. The information processing apparatus according to claim 2, wherein the circuitry is further configured to verify an identity of a user who has permission to perform an operation related to discharging, the verification being by at least one of a plurality of password authentications, fingerprint authentication, vein authentication, or iris authentication.

14. The information processing apparatus according to claim 2, wherein the circuitry is further configured to specify which battery of two connected batteries is the charge source or the charge destination.

15. The information processing apparatus according to claim 14, wherein the circuitry is further configured to compare remaining electric power in each of the two connected batteries and specify the battery of the two connected batteries with a greatest electric power as the charge source and the battery with a least electric power as the charge destination.

16. An information processing method, comprising:
setting, with circuitry of an information processing apparatus, a candidate discharge amount of at least one first battery that is discharged to at least one second battery of a discharge destination, the at least one first battery being included in a discharge source configured to be driven by using electric power of the at least one first battery, the information processing apparatus being included in the discharge source;
calculating, with the circuitry, a remaining amount of electric power in the at least one first battery after discharging the at least one first battery by the candidate discharge amount, and calculate a distance travel range from a current location that the discharge source can move per unit of electric power, so that electric power remaining in the at least one first battery allows the discharge source to travel the travel range after discharge of the candidate discharge amount;
providing, by the circuitry to a display of the information processing apparatus, information about the travel range that the discharge source can travel after the candidate discharge amount is discharged from the at least one first battery;
receiving, with the circuitry, user input regarding the candidate discharge amount;
determining, with the circuitry, a discharge amount based on the candidate discharge amount and the user input after providing the information to the display; and
cause discharge of the discharge source by the discharge amount to the discharge destination based on the user input.

17. A non-transitory computer-readable medium encoded with computer readable instructions that, when executed by a processor, cause the processor to perform a method comprising:
setting a candidate discharge amount of at least one first battery that is discharged to at least one second battery of a discharge destination, the at least one first battery being included in a discharge source configured to be driven by using electric power of the at least one first battery;
calculating a remaining amount of electric power in the at least one first battery after discharging the at least one first battery by the candidate discharge amount, and calculate a distance travel range from a current location that the discharge source can move per unit of electric power, so that electric power remaining in the at least one first battery allows the discharge source to travel the travel range after discharge of the candidate discharge amount;
providing, to a display of an information processing apparatus included in the discharge source, information about the travel range that the discharge source can travel after the candidate discharge amount is discharged from the at least one first battery;
receiving user input regarding the candidate discharge amount;
determining a discharge amount based on the candidate discharge amount after providing the information to the display; and
cause discharge of the discharge source by the discharge amount to the discharge destination.

* * * * *